(12) United States Patent
Shimomura et al.

(10) Patent No.: US 6,427,025 B1
(45) Date of Patent: *Jul. 30, 2002

(54) IMAGE PROCESSING WITH SELECTION BETWEEN REVERSIBLE AND IRREVERSIBLE COMPRESSION

(75) Inventors: Yukari Shimomura; Kazuhiro Saito, both of Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,504

(22) Filed: May 13, 1997

Related U.S. Application Data

(63) Continuation of application No. 08/491,100, filed on Jun. 16, 1995, now abandoned, which is a continuation of application No. 08/106,556, filed on Aug. 16, 1993, now abandoned.

(30) Foreign Application Priority Data

Aug. 14, 1992 (JP) .............................................. 4-217038
Sep. 30, 1992 (JP) .............................................. 4-261914
Jan. 22, 1993 (JP) .............................................. 5-009248

(51) Int. Cl.[7] .............................. G06K 9/46; G06K 9/36; G06K 9/00
(52) U.S. Cl. ........................ 382/232; 382/246; 382/166
(58) Field of Search ................................. 382/166, 284, 382/233, 296, 164, 168, 171, 172, 173, 176, 180, 232, 235, 239, 244, 245, 248, 249, 250, 251, 252, 253, 270, 275, 305, 306; 358/450, 453, 464, 539, 426, 433, 261.01, 427, 298, 429, 454, 459; 348/397

(56) References Cited

U.S. PATENT DOCUMENTS

| | | | | |
|---|---|---|---|---|
| 3,980,830 A | * | 9/1976 | Wendland et al. | 348/399 |
| 4,780,760 A | * | 10/1988 | Waldman et al. | 348/105 |
| 4,786,975 A | * | 11/1988 | Postl | 358/539 |
| 4,900,902 A | | 2/1990 | Sakakibara | 235/375 |
| 4,939,583 A | * | 7/1990 | Tsuboi et al. | 382/56 |
| 5,016,100 A | * | 5/1991 | Citta et al. | 348/399 |
| 5,089,884 A | * | 2/1992 | Suzuki et al. | 382/56 |
| 5,189,530 A | | 2/1993 | Fujii | 358/458 |
| 5,196,947 A | | 3/1993 | Takahashi | 358/441 |
| 5,216,518 A | | 6/1993 | Yamagami | 358/426 |
| 5,267,333 A | * | 11/1993 | Aono et al. | 382/56 |
| 5,301,040 A | | 4/1994 | Hoshi et al. | 358/465 |
| 5,361,147 A | | 11/1994 | Katayama et al. | 358/523 |
| 5,483,358 A | | 1/1996 | Sugiura et al. | 358/508 |
| 5,561,536 A | | 10/1996 | Sugiura et al. | 358/500 |
| 5,675,422 A | | 10/1997 | Hara et al. | 358/404 |
| 5,742,846 A | | 4/1998 | Furyua et al. | 710/20 |
| 5,818,970 A | | 10/1998 | Ishikawa et al. | 382/248 |
| 5,825,934 A | | 10/1998 | Ohsawa | 382/246 |
| 5,838,834 A | | 11/1998 | Saito | 382/25.1 |
| 5,930,386 A | | 7/1999 | Saito | 382/166 |
| 6,028,961 A | | 2/2000 | Shimomura | 382/239 |
| 6,198,848 B1 | | 3/2001 | Honma et al. | 382/232 |

\* cited by examiner

Primary Examiner—Leo Boudreau
Assistant Examiner—Duy M. Dang
(74) Attorney, Agent, or Firm—Fitzpatrick, Cella, Harper & Scinto

(57) ABSTRACT

An image processing apparatus compresses multi-level images created by a computer or the like at a high compression rate. To achieve this, the image processing apparatus includes an ADCT compression unit for compressing input multilevel image data for every block of data (the blocks having a predetermined size) by an irreversible compression method, and a reversible compression unit for compressing the input multilevel image data for every block by a reversible compression method. Selection between output data from the two compression units on the basis of data having a predetermined level and compressed by the reversible compression unit.

5 Claims, 53 Drawing Sheets

FIG. 2

|   |   |   |   |   |   |   |   |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 1 | 1 | 1 | 0 | 0 | 0 | 0 | 0 |
| 1 | 1 | 1 | 0 | 0 | 1 | 0 | 0 |
| 1 | 1 | 1 | 0 | 0 | 1 | 1 | 0 |
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |

FIG. 3A

|   |   |   |   |   |   |   |   |
|---|---|---|---|---|---|---|---|
| 1 | 1 | 1 | 0 | 0 | 0 | 0 | 0 |
| 1 | 1 | 1 | 0 | 0 | 0 | 0 | 0 |
| 1 | 1 | 1 | 0 | 0 | 0 | 0 | 0 |
| 1 | 1 | 1 | 0 | 0 | 1 | 0 | 0 |
| 1 | 1 | 1 | 0 | 0 | 1 | 1 | 0 |
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |

FIG. 3B

|   |   |   |   |   |   |   |   |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 6

|   |    |    |    |    |    |    |    |
|---|----|----|----|----|----|----|----|
| 0 | 15 | 16 | 31 | 32 | 47 | 48 | 63 |
| 1 | 14 | 17 | 30 | 33 | 46 | 49 | 62 |
| 2 | 13 | 18 | 29 | 34 | 45 | 50 | 61 |
| 3 | 12 | 19 | 28 | 35 | 44 | 51 | 60 |
| 4 | 11 | 20 | 27 | 36 | 43 | 52 | 59 |
| 5 | 10 | 21 | 26 | 37 | 42 | 53 | 58 |
| 6 | 9  | 22 | 25 | 38 | 41 | 54 | 57 |
| 7 | 8  | 23 | 24 | 39 | 40 | 55 | 56 |

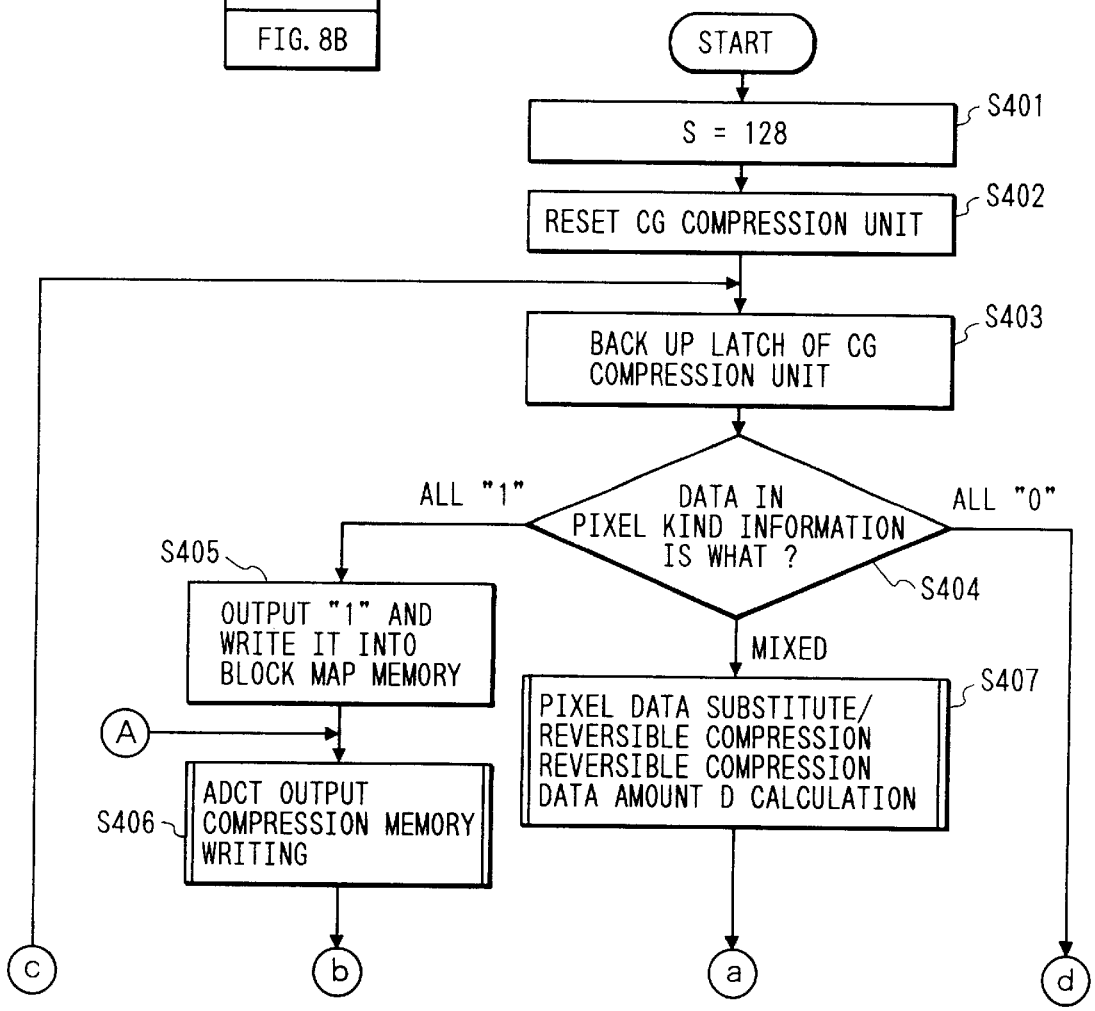

FIG. 18

| COLOR COMPONENT | NUMBER OF BITS |
|---|---|
| Y COMPONENT | 40 |
| U COMPONENT | 28 |
| V COMPONENT | 28 |

FIG. 19

| |
|---|
| SEGMENT S-1 (100KB) |
| SEGMENT S-2 (100KB) |
| SEGMENT S-3 (100KB) |
| SEGMENT S-4 (100KB) |
| ⋮ |
| SEGMENT S-N (100KB) |

FIG. 20

| NO. | 1 | 2 | 3 | 4 | 5 | 6 | 7 | 8 | 9 | 10 | 11 |
|---|---|---|---|---|---|---|---|---|---|---|---|
| STAGE (1) | 1 | S-1 | S-5 | S-8 | S-10 | S-14 | . | S-(N-1) | S-4 | S-15 | 11 |
| STAGE (2) | 1 | S-2 | S-6 | S-9 | S-13 | . | . | S-N | S-11 | END | END |
| STAGE (3) | 1 | S-3 | S-7 | S-12 | . | . | S-(N-2) | END | END | END | END |
| STAGE (4) | 0 | S-4 | S-11 | S-15 | . | . | | | | | |

(TOP OF IMAGE) → (END OF IMAGE)

{ 1: STAGE VALID
  0: STAGE INVALID }

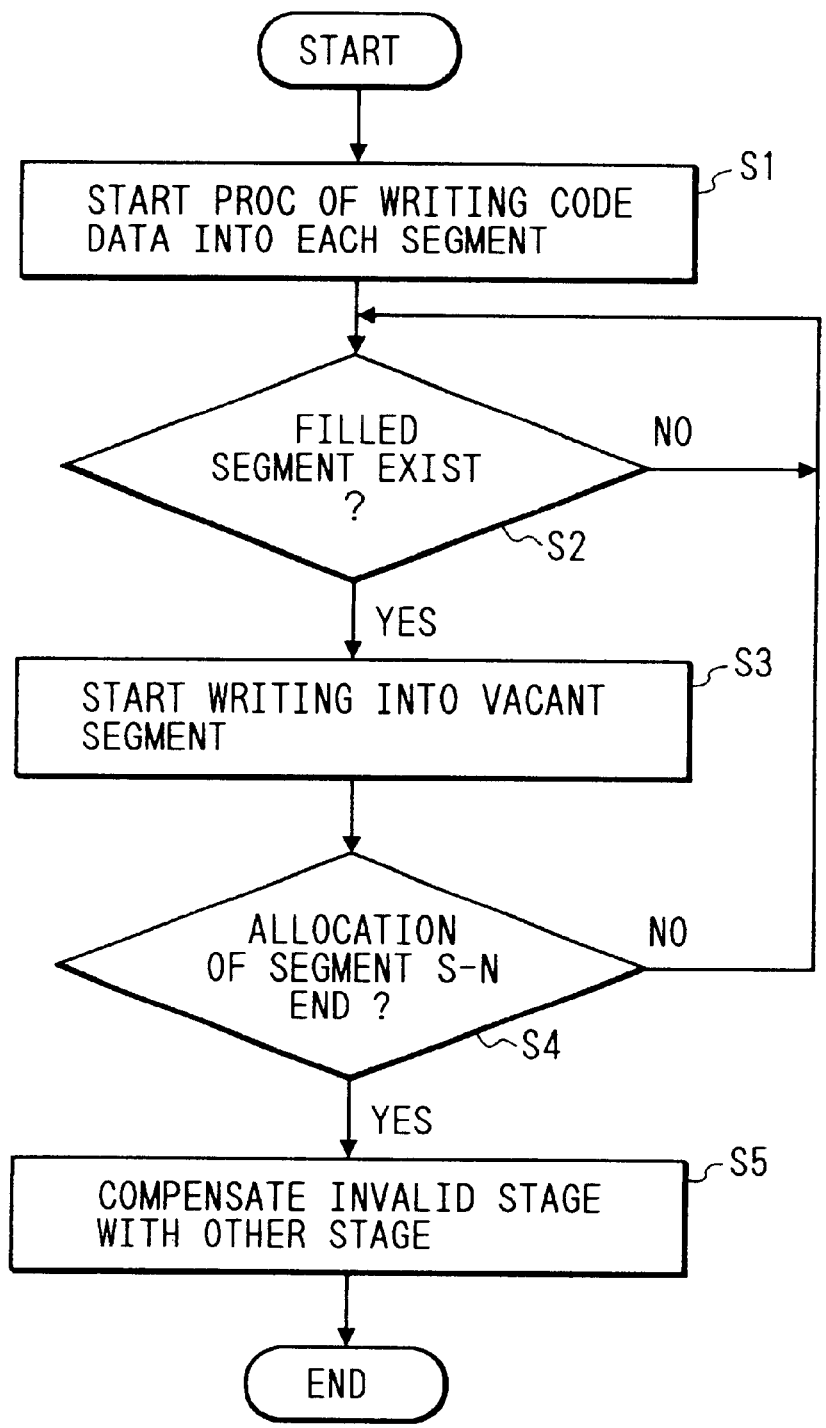

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 56 |
| 52 | 57 | 58 | 59 | 60 | 61 | 62 | 63 |

4001

| 32 | 22 | 20 | 32 | 48 | 80 | 102 | 122 |
|---|---|---|---|---|---|---|---|
| 24 | 24 | 28 | 38 | 52 | 116 | 120 | 110 |
| 28 | 26 | 32 | 48 | 80 | 114 | 138 | 112 |
| 28 | 34 | 44 | 58 | 102 | 174 | 160 | 124 |
| 36 | 44 | 74 | 116 | 136 | 218 | 206 | 154 |
| 48 | 70 | 110 | 128 | 162 | 208 | 226 | 184 |
| 98 | 128 | 156 | 174 | 206 | 242 | 240 | 202 |
| 144 | 184 | 190 | 196 | 224 | 200 | 206 | 198 |

4002

| 34 | 36 | 48 | 94 | 132 | 198 | 198 | 198 |
|---|---|---|---|---|---|---|---|
| 36 | 42 | 52 | 132 | 198 | 198 | 198 | 198 |
| 48 | 52 | 112 | 198 | 198 | 198 | 198 | 198 |
| 94 | 132 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |
| 198 | 198 | 198 | 198 | 198 | 198 | 198 | 198 |

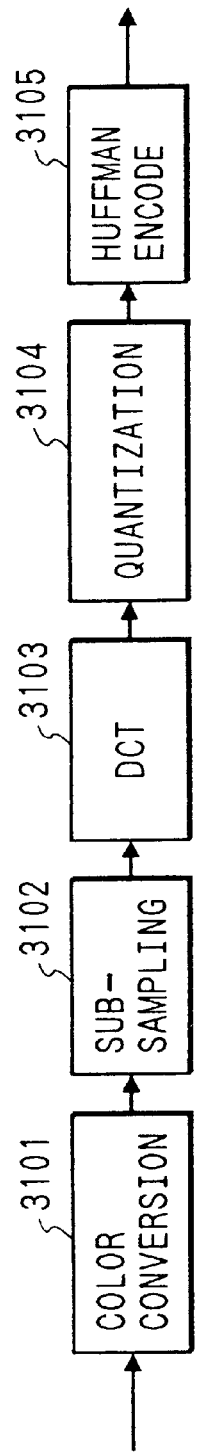
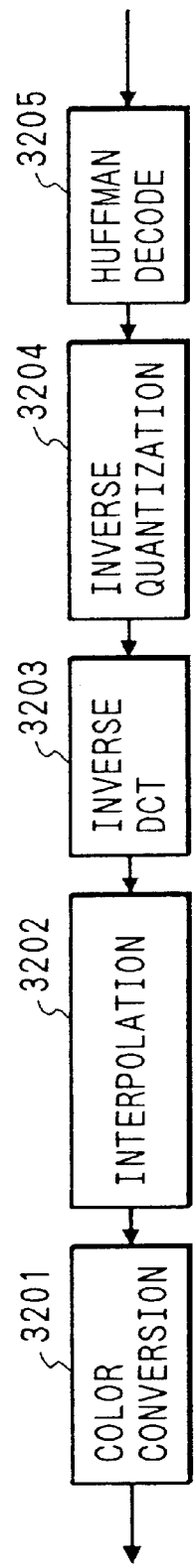

|  |  |  |  |  |  |  |  |  |  |  |  |  |  |  |  |
|---|---|---|---|---|---|---|---|---|---|---|---|---|---|---|---|
| 61 | 61 | 61 | 209 | 209 | 209 | 209 | 61 | 61 | 209 | 209 | 209 | 209 | 209 | 61 | 61 |
| 209 | 61 | 61 | 61 | 209 | 209 | 209 | 61 | 61 | 209 | 209 | 209 | 209 | 209 | 209 | 61 |
| 209 | 209 | 209 | 61 | 61 | 209 | 209 | 61 | 61 | 209 | 209 | 209 | 209 | 209 | 209 | 209 |
| 209 | 61 | 61 | 209 | 209 | 209 | 209 | 61 | 209 | 209 | 209 | 209 | 209 | 209 | 209 | 209 |
| 61 | 61 | 61 | 61 | 209 | 209 | 209 | 209 | 209 | 209 | 209 | 209 | 209 | 209 | 209 | 209 |
| 61 | 61 | 61 | 61 | 61 | 61 | 61 | 61 | 209 | 209 | 209 | 209 | 209 | 209 | 209 | 209 |
| 209 | 61 | 61 | 61 | 61 | 61 | 61 | 61 | 61 | 61 | 209 | 209 | 209 | 209 | 209 | 209 |
| 209 | 61 | 61 | 209 | 209 | 61 | 61 | 61 | 61 | 61 | 61 | 61 | 61 | 209 | 209 | 209 |
| 209 | 61 | 61 | 209 | 209 | 209 | 209 | 209 | 61 | 61 | 61 | 61 | 61 | 61 | 209 | 209 |
| 209 | 61 | 61 | 209 | 209 | 209 | 209 | 209 | 209 | 61 | 61 | 61 | 61 | 61 | 61 | 61 |
| 61 | 61 | 61 | 209 | 209 | 209 | 209 | 61 | 61 | 61 | 61 | 61 | 61 | 61 | 61 | 61 |
| 61 | 61 | 61 | 61 | 61 | 209 | 209 | 61 | 61 | 61 | 61 | 209 | 209 | 209 | 209 | 61 |
| 61 | 61 | 61 | 61 | 61 | 61 | 61 | 61 | 61 | 209 | 209 | 209 | 209 | 209 | 209 | 209 |
| 209 | 209 | 61 | 61 | 61 | 61 | 61 | 61 | 209 | 209 | 209 | 209 | 209 | 209 | 209 | 209 |
| 209 | 209 | 209 | 209 | 209 | 61 | 61 | 61 | 61 | 61 | 209 | 209 | 209 | 209 | 209 | 209 |
| 209 | 209 | 209 | 209 | 209 | 209 | 209 | 209 | 61 | 61 | 61 | 209 | 209 | 209 | 209 | 209 |

3401a, 3401b, 3401, 3401d, 3401c

|  |  |  |  |  |  |  |  |  |  |  |  |  |  |  |  |
|---|---|---|---|---|---|---|---|---|---|---|---|---|---|---|---|
| 114 | * | 121 | * | 128 | * | 121 | * | 121 | * | 128 | * | 128 | * | 114 | * |
| 121 | * | 114 | * | 128 | * | 121 | * | 121 | * | 128 | * | 128 | * | 121 | * |
| 128 | * | 121 | * | 121 | * | 121 | * | 121 | * | 128 | * | 128 | * | 128 | * |
| 121 | * | 121 | * | 128 | * | 121 | * | 128 | * | 128 | * | 128 | * | 128 | * |
| 114 | * | 114 | * | 128 | * | 128 | * | 128 | * | 128 | * | 128 | * | 128 | * |
| 114 | * | 114 | * | 114 | * | 114 | * | 128 | * | 128 | * | 128 | * | 128 | * |
| 121 | * | 114 | * | 114 | * | 114 | * | 114 | * | 128 | * | 128 | * | 128 | * |
| 121 | * | 121 | * | 121 | * | 114 | * | 114 | * | 114 | * | 121 | * | 128 | * |
| 121 | * | 121 | * | 128 | * | 128 | * | 114 | * | 114 | * | 114 | * | 128 | * |
| 121 | * | 121 | * | 128 | * | 128 | * | 121 | * | 114 | * | 114 | * | 114 | * |
| 114 | * | 121 | * | 128 | * | 121 | * | 114 | * | 114 | * | 114 | * | 114 | * |
| 114 | * | 114 | * | 121 | * | 121 | * | 114 | * | 121 | * | 128 | * | 121 | * |
| 114 | * | 114 | * | 114 | * | 114 | * | 121 | * | 128 | * | 128 | * | 128 | * |
| 128 | * | 114 | * | 114 | * | 114 | * | 128 | * | 128 | * | 128 | * | 128 | * |
| 128 | * | 128 | * | 121 | * | 114 | * | 114 | * | 128 | * | 128 | * | 128 | * |
| 128 | * | 128 | * | 128 | * | 128 | * | 114 | * | 121 | * | 128 | * | 128 | * |

3402, 3402a, 3402b

|  |  |  |  |  |  |  |  |  |  |  |  |  |  |  |  |
|---|---|---|---|---|---|---|---|---|---|---|---|---|---|---|---|
| 214 | * | 171 | * | 128 | * | 171 | * | 171 | * | 128 | * | 128 | * | 214 | * |
| 171 | * | 214 | * | 128 | * | 171 | * | 171 | * | 128 | * | 128 | * | 171 | * |
| 128 | * | 171 | * | 171 | * | 171 | * | 171 | * | 128 | * | 128 | * | 128 | * |
| 171 | * | 171 | * | 128 | * | 171 | * | 128 | * | 128 | * | 128 | * | 128 | * |
| 214 | * | 214 | * | 128 | * | 128 | * | 128 | * | 128 | * | 128 | * | 128 | * |
| 214 | * | 214 | * | 214 | * | 214 | * | 128 | * | 128 | * | 128 | * | 128 | * |
| 171 | * | 214 | * | 214 | * | 214 | * | 214 | * | 128 | * | 128 | * | 128 | * |
| 171 | * | 171 | * | 171 | * | 214 | * | 214 | * | 214 | * | 171 | * | 128 | * |
| 171 | * | 171 | * | 128 | * | 128 | * | 214 | * | 214 | * | 214 | * | 128 | * |
| 171 | * | 171 | * | 128 | * | 128 | * | 171 | * | 214 | * | 214 | * | 214 | * |
| 214 | * | 171 | * | 128 | * | 171 | * | 214 | * | 214 | * | 214 | * | 214 | * |
| 214 | * | 214 | * | 171 | * | 171 | * | 214 | * | 171 | * | 128 | * | 171 | * |
| 214 | * | 214 | * | 214 | * | 214 | * | 171 | * | 128 | * | 128 | * | 171 | * |
| 128 | * | 214 | * | 214 | * | 214 | * | 128 | * | 128 | * | 128 | * | 128 | * |
| 128 | * | 128 | * | 171 | * | 214 | * | 214 | * | 128 | * | 128 | * | 128 | * |
| 128 | * | 128 | * | 128 | * | 128 | * | 214 | * | 171 | * | 128 | * | 128 | * |

| | | | | | | | |
|---|---|---|---|---|---|---|---|
| -55.0 | -52.7 | -48.3 | 239.1 | 37.0 | 95.9 | -20.0 | 42.9 |
| 168.7 | -98.9 | -49.6 | 90.9 | -137.2 | 32.4 | -20.6 | 4.3 |
| -48.3 | 79.1 | -63.2 | 5.5 | 88.4 | 27.8 | -26.2 | -4.7 |
| -136.4 | -141.3 | -36.3 | -54.8 | 2.3 | -52.7 | -15.0 | -14.5 |
| 111.0 | -123.9 | -145.0 | 18.0 | 111.0 | 12.0 | -60.0 | -24.6 |
| -15.2 | 82.2 | -7.2 | -15.7 | -11.5 | 70.2 | -3.0 | -52.0 |
| -20.0 | 56.8 | -26.2 | -100.4 | -76.7 | -8.9 | -10.8 | -38.0 |
| 44.6 | -32.7 | 74.3 | -47.7 | -91.7 | -50.8 | 30.8 | 9.5 |
| 407.5 | -113.3 | -140.9 | -34.5 | -92.5 | -23.0 | -1.7 | -22.5 |
| 36.8 | 151.7 | -150.1 | -17.1 | -58.0 | -68.4 | -56.2 | -18.2 |
| -233.4 | -64.3 | -76.2 | 7.9 | -58.4 | -11.8 | 20.7 | -27.2 |
| 69.2 | 120.9 | -59.6 | 9.0 | 39.5 | -14.0 | 16.4 | 7.1 |
| -55.5 | 32.9 | 72.5 | 42.3 | 18.5 | -16.2 | 30.0 | -31.2 |
| 24.0 | -7.1 | -51.9 | -40.2 | 46.2 | -13.5 | 40.0 | 9.9 |
| -7.6 | 6.7 | 57.5 | -4.6 | 4.1 | -44.2 | 2.2 | -33.5 |
| -11.5 | -44.3 | -40.1 | -42.6 | 7.3 | -17.1 | 13.5 | 0.8 |
| 74.5 | -35.8 | -38.3 | 130.7 | 55.5 | 65.1 | -44.2 | -26.0 |
| 9.7 | -241.6 | -36.4 | 109.0 | 62.9 | 90.3 | 7.2 | -33.2 |
| 340.1 | 7.9 | -5.4 | -13.9 | 126.7 | 2.8 | 13.1 | 11.8 |
| -129.0 | 129.0 | 107.8 | -18.5 | 67.5 | -43.3 | 5.4 | -0.5 |
| -18.5 | -109.4 | 38.3 | -7.6 | -55.5 | 17.1 | 44.2 | -2.9 |
| -1.0 | 42.0 | -56.3 | 9.1 | -40.1 | 12.2 | -15.5 | 13.6 |
| -0.7 | -19.0 | 13.1 | 33.5 | -32.5 | -6.7 | -31.6 | -28.4 |
| -32.6 | 19.1 | -116.0 | -48.8 | 47.0 | -6.5 | -14.8 | 26.0 |
| 74.5 | -193.1 | -72.5 | 6.5 | 18.5 | 48.8 | -30.0 | -0.7 |
| -317.3 | 103.2 | 142.9 | 24.1 | 1.2 | 20.8 | -13.4 | 24.5 |
| -106.7 | -73.7 | 102.4 | -19.0 | 58.4 | 28.4 | 20.7 | 20.2 |
| 209.1 | 5.3 | 71.5 | -82.0 | -41.4 | -22.5 | 4.1 | 28.4 |
| 55.5 | -149.6 | -52.5 | -3.7 | -18.5 | -2.5 | -78.4 | -29.7 |
| -21.4 | -102.4 | -63.5 | -11.7 | -18.4 | 40.5 | -9.3 | 20.6 |
| -15.9 | 2.8 | 57.7 | -15.7 | -4.1 | -27.5 | -28.4 | -13.9 |
| -39.7 | -38.7 | 3.8 | -110.1 | -45.3 | -49.9 | 16.0 | 12.3 |
| -44.6 | -23.3 | 2.2 | 2.4 | -7.9 | 4.5 | 7.6 | 5.4 |
| 9.7 | 6.5 | -11.8 | 1.6 | -7.3 | 5.2 | 1.6 | 1.5 |
| -12.9 | 7.8 | 6.4 | -1.1 | -6.0 | 2.6 | -1.1 | -1.7 |
| -3.2 | -9.3 | -12.0 | 3.2 | -4.2 | -0.6 | -1.5 | 0.9 |
| 2.6 | 6.2 | -7.3 | -9.7 | -2.6 | -1.9 | -1.7 | 2.7 |
| 0.4 | -0.4 | 4.7 | 5.4 | -3.3 | -1.5 | -1.2 | -2.8 |
| -1.3 | 1.2 | 2.4 | 1.5 | 1.5 | -5.4 | -4.7 | 0.0 |
| 1.6 | 0.5 | 0.5 | -1.2 | 0.7 | 4.6 | 0.7 | -4.8 |
| -54.2 | -4.4 | 7.5 | -7.5 | -3.5 | 6.2 | 4.5 | -1.5 |
| -14.6 | 12.0 | -15.5 | -14.4 | 4.8 | 0.4 | 1.5 | 0.5 |
| 11.0 | 18.0 | 3.9 | -11.5 | 3.6 | 1.1 | 0.9 | -4.9 |
| 3.8 | -12.2 | 6.0 | 10.8 | 7.7 | -5.4 | 3.0 | 2.0 |
| 1.7 | -8.2 | 1.6 | -7.2 | -0.0 | 4.3 | -0.7 | -4.0 |
| -1.1 | -0.5 | 6.8 | -2.4 | -4.8 | 0.9 | 1.6 | -2.5 |
| -0.8 | 0.7 | -0.9 | -1.6 | 4.2 | -0.4 | 1.4 | 1.9 |
| -3.4 | 0.0 | 2.6 | -3.0 | -4.9 | -5.4 | 1.3 | -2.8 |
| 274.1 | 143.1 | -13.5 | -14.6 | 48.4 | -27.6 | -46.7 | -33.2 |
| -59.7 | -40.1 | 72.7 | -9.8 | 45.1 | -31.8 | -9.8 | -9.3 |
| 79.0 | -48.0 | -39.6 | 7.0 | 36.8 | -15.7 | 6.9 | 10.2 |
| 19.5 | 57.1 | 73.5 | -19.8 | 25.9 | 3.5 | 9.2 | -5.3 |
| -16.1 | -38.3 | 45.0 | 59.7 | 16.1 | 11.4 | 10.4 | -16.3 |
| -2.6 | 2.2 | -28.9 | -33.2 | 20.0 | 9.0 | 7.6 | 17.2 |
| 8.8 | -7.1 | -14.6 | -9.5 | -9.4 | 33.0 | 28.8 | -0.2 |
| -9.6 | -3.0 | -2.8 | 7.2 | -4.3 | -28.2 | -4.2 | 29.4 |
| 333.2 | 26.9 | -46.3 | 46.3 | 21.5 | -37.9 | -27.4 | 9.0 |
| 89.4 | -74.0 | 95.0 | 88.3 | -29.3 | -2.2 | -9.3 | -3.3 |
| -67.8 | -110.9 | -23.7 | 70.7 | -22.3 | -6.9 | -5.4 | 29.8 |
| -23.3 | 74.8 | -36.9 | -66.6 | -47.1 | 33.2 | -18.7 | -12.5 |
| -10.8 | 50.3 | -9.9 | 44.0 | 0.0 | -26.5 | 4.1 | 24.6 |
| 6.5 | 3.0 | -41.5 | 14.8 | 29.4 | -5.5 | -9.6 | 15.3 |
| 4.8 | -4.2 | 5.4 | 10.1 | -25.7 | 2.4 | -8.5 | -11.5 |
| 21.0 | -0.1 | -15.7 | 18.7 | 30.3 | 33.3 | -7.8 | 17.1 |

Labels: 3501a, 3501b, 3501, 3501c, 3501d, 3502a, 3502, 3502b, 3503a, 3503, 3503b

| | | | | | | | | | | | | | | | |
|---|---|---|---|---|---|---|---|---|---|---|---|---|---|---|---|
| 55 | 31 | 94 | 192 | 223 | 208 | 162 | 98 | 71 | 220 | 234 | 169 | 194 | 190 | 96 | 34 |
| 189 | 123 | 62 | 56 | 145 | 255 | 201 | 25 | 62 | 194 | 227 | 201 | 238 | 235 | 160 | 115 |
| 204 | 201 | 169 | 98 | 89 | 175 | 186 | 87 | 102 | 163 | 209 | 208 | 242 | 244 | 208 | 199 |
| 197 | 108 | 88 | 151 | 211 | 239 | 196 | 108 | 186 | 202 | 202 | 197 | 205 | 206 | 208 | 224 |
| 87 | 12 | 32 | 130 | 187 | 200 | 187 | 150 | 228 | 216 | 221 | 221 | 201 | 194 | 204 | 207 |
| 51 | 57 | 81 | 71 | 25 | 43 | 101 | 117 | 182 | 180 | 223 | 244 | 214 | 216 | 224 | 191 |
| 222 | 83 | 20 | 58 | 82 | 75 | 46 | 0 | 98 | 103 | 154 | 187 | 162 | 206 | 241 | 189 |
| 206 | 50 | 65 | 210 | 194 | 60 | 36 | 106 | 43 | 41 | 90 | 96 | 76 | 165 | 240 | 192 |
| 238 | 19 | 47 | 227 | 230 | 178 | 195 | 193 | 81 | 37 | 56 | 91 | 78 | 95 | 164 | 208 |
| 205 | 55 | 64 | 161 | 174 | 213 | 255 | 215 | 185 | 78 | 14 | 11 | 23 | 63 | 91 | 71 |
| 35 | 42 | 131 | 201 | 215 | 255 | 208 | 47 | 44 | 64 | 109 | 106 | 56 | 55 | 74 | 52 |
| 73 | 67 | 67 | 40 | 54 | 158 | 183 | 81 | 55 | 50 | 94 | 162 | 222 | 255 | 184 | 42 |
| 59 | 55 | 57 | 51 | 59 | 95 | 91 | 35 | 90 | 170 | 255 | 238 | 162 | 172 | 226 | 231 |
| 222 | 165 | 99 | 63 | 46 | 34 | 45 | 73 | 203 | 174 | 180 | 194 | 199 | 232 | 233 | 180 |
| 186 | 199 | 214 | 238 | 221 | 126 | 44 | 39 | 58 | 97 | 192 | 240 | 196 | 175 | 203 | 216 |
| 218 | 219 | 193 | 188 | 207 | 190 | 193 | 248 | 56 | 31 | 96 | 192 | 217 | 215 | 214 | 195 |

⎬ 3801

| | | | | | | | | | | | | | | | |
|---|---|---|---|---|---|---|---|---|---|---|---|---|---|---|---|
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 118 | * | 118 | * | 120 | * | 123 | * | 125 | * | 127 | * | 129 | * | 130 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |
| 120 | * | 120 | * | 120 | * | 120 | * | 120 | * | 120 | * | 120 | * | 120 | * |

⎬ 3802

| | | | | | | | | | | | | | | | |
|---|---|---|---|---|---|---|---|---|---|---|---|---|---|---|---|
| 180 | * | 173 | * | 152 | * | 154 | * | 153 | * | 159 | * | 167 | * | 174 | * |
| 179 | * | 172 | * | 160 | * | 150 | * | 146 | * | 147 | * | 152 | * | 156 | * |
| 179 | * | 172 | * | 159 | * | 147 | * | 137 | * | 132 | * | 131 | * | 131 | * |
| 181 | * | 174 | * | 163 | * | 148 | * | 135 | * | 123 | * | 115 | * | 111 | * |
| 185 | * | 181 | * | 172 | * | 159 | * | 143 | * | 128 | * | 115 | * | 108 | * |
| 191 | * | 190 | * | 185 | * | 176 | * | 162 | * | 145 | * | 130 | * | 120 | * |
| 198 | * | 199 | * | 199 | * | 195 | * | 183 | * | 157 | * | 151 | * | 140 | * |
| 202 | * | 205 | * | 208 | * | 207 | * | 197 | * | 182 | * | 166 | * | 155 | * |
| 207 | * | 166 | * | 131 | * | 139 | * | 180 | * | 206 | * | 197 | * | 175 | * |
| 186 | * | 155 | * | 131 | * | 145 | * | 185 | * | 215 | * | 211 | * | 194 | * |
| 174 | * | 156 | * | 145 | * | 160 | * | 191 | * | 212 | * | 210 | * | 198 | * |
| 191 | * | 185 | * | 180 | * | 182 | * | 186 | * | 184 | * | 174 | * | 165 | * |
| 210 | * | 216 | * | 217 | * | 202 | * | 175 | * | 145 | * | 125 | * | 117 | * |
| 189 | * | 212 | * | 227 | * | 210 | * | 166 | * | 124 | * | 104 | * | 102 | * |
| 126 | * | 167 | * | 206 | * | 204 | * | 165 | * | 130 | * | 123 | * | 132 | * |
| 68 | * | 123 | * | 181 | * | 195 | * | 168 | * | 145 | * | 151 | * | 170 | * |

| | INDEX | CODE DATA | BIT SIZE |
|---|---|---|---|
| DC COMPONENT → | 0 | 0×00001FF2 | 13 |
| AC COMPONENT | 1 | 0×0003FFA5 | 18 |
| | 2 | 0×0000007C | 7 |
| | 3 | 0×000035B3 | 14 |
| | 4 | 0×003FC59E | 21 |
| | 5 | 0×000001AC | 9 |
| | 6 | 0×000072EC | 15 |
| | . | . | . |
| | . | . | . |
| | . | . | . |
| | 18 | 0×0000001A | 5 |
| DC COMPONENT → | 0 | 0×000037E2 | 14 |
| AC COMPONENT | 1 | 0×003FA201 | 21 |
| | . | . | . |

FIG. 39

|  | FIRST STAGE | SECOND STAGE | THIRD STAGE |
|---|---|---|---|
| Y COMPONENT | 3 | 8 | 15 |
| U COMPONENT | 2 | 7 | 13 |
| V COMPONENT | 2 | 7 | 13 |

FIG. 41

| 0 | 8 | 16 | 24 | 32 | 40 | 48 | 56 |
|---|---|---|---|---|---|---|---|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |

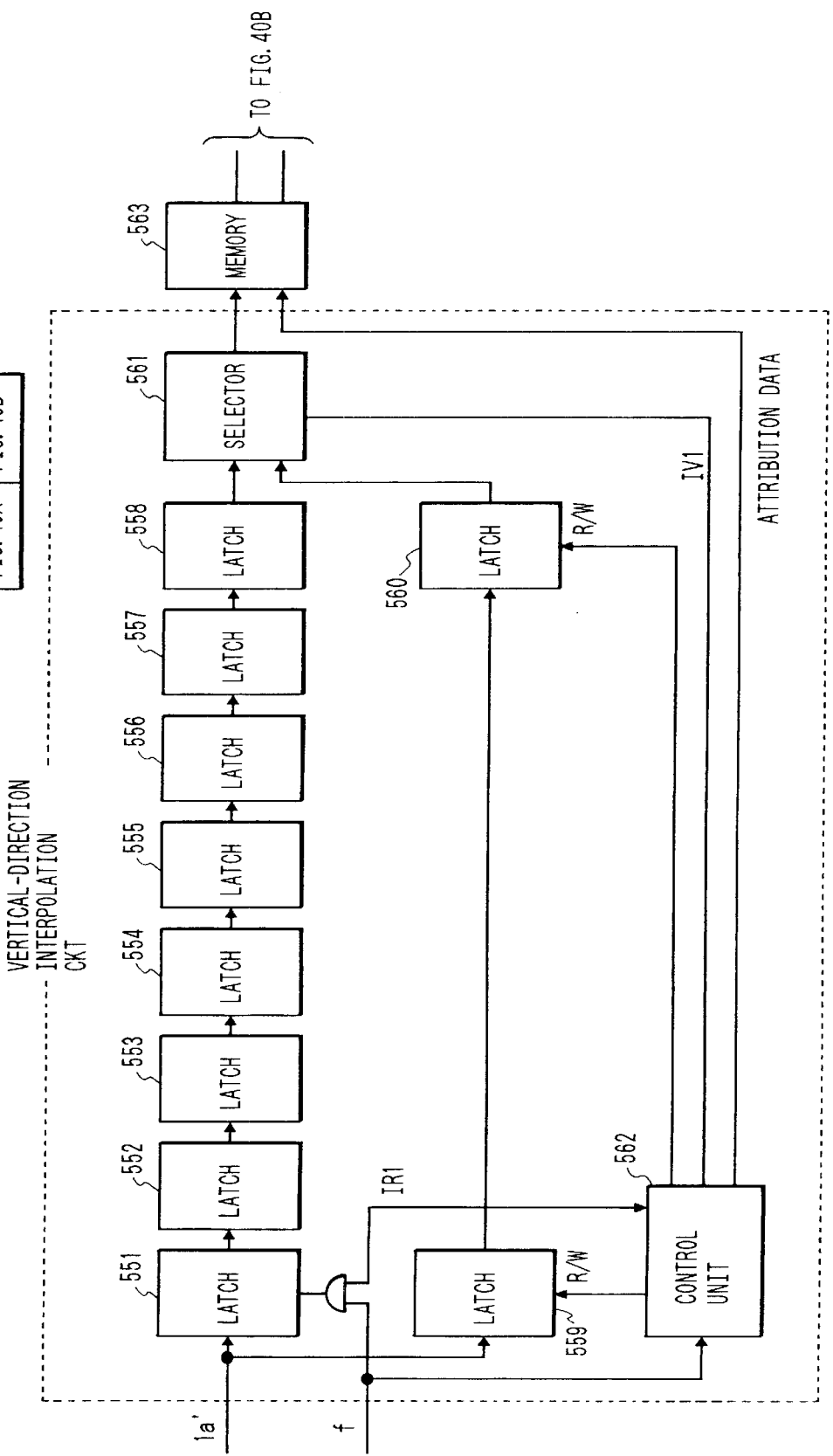

FIG. 42A
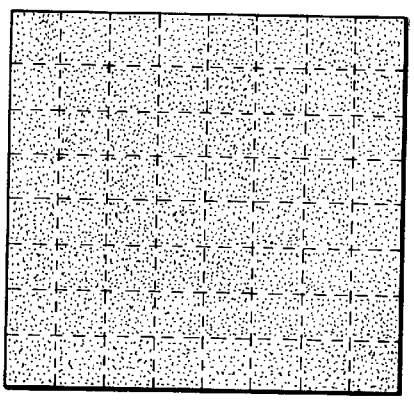
FIG. 42B
FIG. 43A
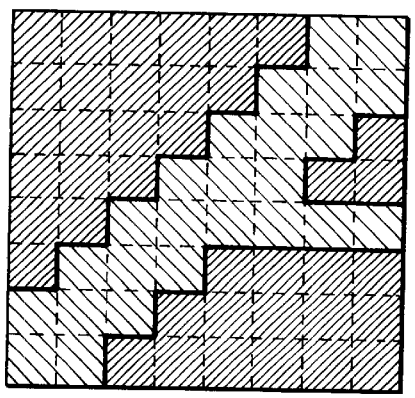
FIG. 43B
FIG. 44A
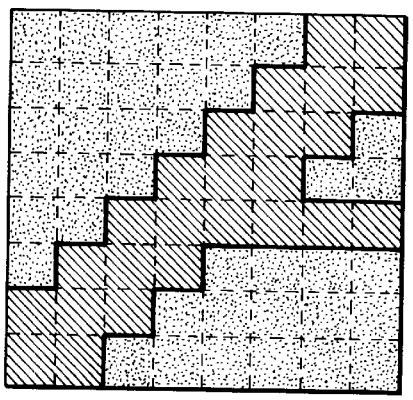
FIG. 44B

FIG. 45A

|  | ROW | | | | | | | |
|---|---|---|---|---|---|---|---|---|
|  | 0 | 1 | 2 | 3 | 4 | 5 | 6 | 7 |
| 0 | 120 | 130 | 140 | 30 | 30 | 30 | 30 | 30 |
| 1 | 130 | 130 | 30 | 30 | 30 | 30 | 30 | 30 |
| 2 | 140 | 30 | 30 | 30 | 30 | 30 | 30 | 30 |
| COLUMN 3 | 30 | 30 | 180 | 30 | 30 | 30 | 30 | 30 |
| 4 | 30 | 160 | 190 | 30 | 30 | 30 | 30 | 30 |
| 5 | 150 | 170 | 30 | 30 | 30 | 30 | 30 | 160 |
| 6 | 160 | 30 | 30 | 30 | 30 | 30 | 170 | 170 |
| 7 | 30 | 30 | 30 | 30 | 30 | 160 | 170 | 180 |

FIG. 45B

| 1 | 1 | 1 | 0 | 0 | 0 | 0 | 0 |
|---|---|---|---|---|---|---|---|
| 1 | 1 | 0 | 0 | 0 | 0 | 0 | 0 |
| 1 | 0 | 0 | 0 | 0 | 0 | 0 | 0 |
| 0 | 0 | 1 | 0 | 0 | 0 | 0 | 0 |
| 0 | 1 | 1 | 0 | 0 | 0 | 0 | 0 |
| 1 | 1 | 0 | 0 | 0 | 0 | 0 | 1 |
| 1 | 0 | 0 | 0 | 0 | 0 | 1 | 1 |
| 0 | 0 | 0 | 0 | 0 | 1 | 1 | 1 |

FIG. 46A

| 120 | 130 | 140 | 30 | 30 | 160 | 170 | 160 |
|---|---|---|---|---|---|---|---|
| 130 | 130 | 140 | 30 | 30 | 160 | 170 | 160 |
| 140 | 130 | 140 | 30 | 30 | 160 | 170 | 160 |
| 140 | 130 | 180 | 30 | 30 | 160 | 170 | 160 |
| 140 | 160 | 190 | 30 | 30 | 160 | 170 | 160 |
| 150 | 170 | 190 | 30 | 30 | 160 | 170 | 160 |
| 160 | 170 | 190 | 30 | 30 | 160 | 170 | 170 |
| 160 | 170 | 190 | 30 | 30 | 160 | 170 | 180 |

FIG. 46B

| 1 | 1 | 1 | 0 | 0 | 1 | 1 | 1 |
|---|---|---|---|---|---|---|---|
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |
| 1 | 1 | 1 | 0 | 0 | 1 | 1 | 1 |

FIG. 47A

| 120 | 130 | 140 | 140 | 140 | 160 | 170 | 160 |
|---|---|---|---|---|---|---|---|
| 130 | 130 | 140 | 140 | 140 | 160 | 170 | 160 |
| 140 | 130 | 140 | 140 | 140 | 160 | 170 | 160 |
| 140 | 130 | 180 | 180 | 180 | 160 | 170 | 160 |
| 140 | 160 | 190 | 190 | 190 | 160 | 170 | 160 |
| 150 | 170 | 190 | 190 | 190 | 160 | 170 | 160 |
| 160 | 170 | 190 | 190 | 190 | 160 | 170 | 170 |
| 160 | 170 | 190 | 190 | 190 | 160 | 170 | 180 |

FIG. 47B

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

FIG. 49
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |
FIG. 50
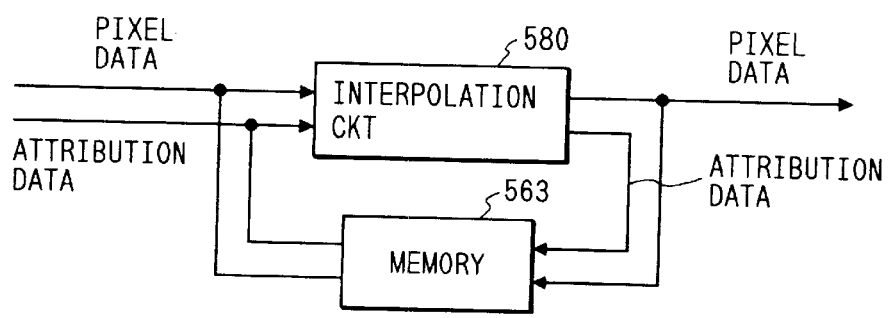
FIG. 51
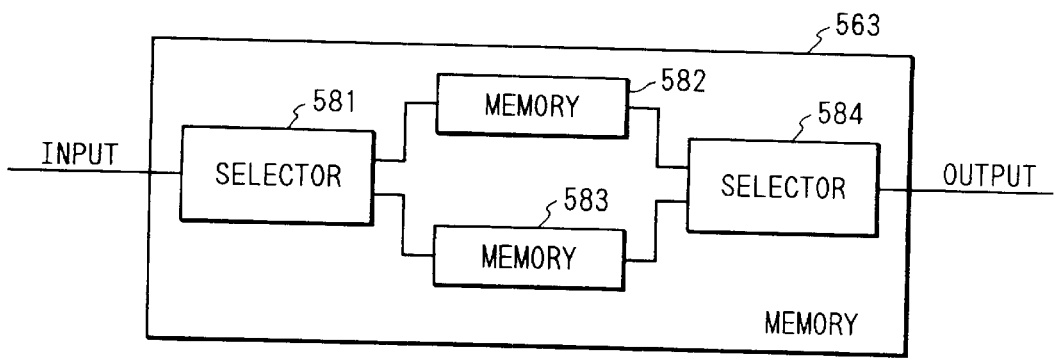

( 0, 200, 200)
(10, 200, 200)
(20, 200, 200)
(30, 200, 200)
(40, 200, 200)
(50, 200, 200)
(60, 200, 200)
(70, 200, 200)

IMAGE PROCESSING WITH SELECTION BETWEEN REVERSIBLE AND IRREVERSIBLE COMPRESSION

This application is a continuation of application Ser. No. 08/491,100 filed on Jun. 16, 1995, now abandoned, which is a continuation of application Ser. No. 08/106,556 filed on Aug. 16, 1993, now abandoned.

BACKGROUND OF THE INVENTION

1. Field of the Invention

The present invention relates to an image processing apparatus, such as an image data compressing or expanding apparatus, and an image processing method which is employed in such an apparatus.

2. Related Background Art

Regarding the images created on a computer by, for example, DTP, there is a demand for a higher image quality in recent years, and development of color or multi-level images has advanced. The quantity of data in such an image quality is about 88 M bytes in the case of an image having, for example, A4 size, 4000 dpi, and 256 "gray" levels (gradations) for each of three colors.

Handling image data as code data, such as in a page description language, can reduce the quantity of data. However, it takes time for code data to be transformed into image data. In addition, it may be impossible to reproduce original image data from the transformed code data.

Color multilevel images are generally compressed by the ADCT (adaptive discrete cosine transform) method recommended by JPEG (Joint Photographic Expent Group). This ADCT compression method will be described below in detail.

FIG. 26 is a block diagram illustrating a functional configuration of an ADCT compressing apparatus.

In the figure, reference numeral 3101 denotes a color space conversion unit for converting a color space (NTSC-RGB) by signals of respective colors (red (R), green (G) and blue (B)) of the NTSC method into a color space (YCrCb) represented by a luminance signal Y and two color difference signals Cr and Cb.

Reference numeral 3102 denotes a sub-sampling unit for reducing color difference data by utilizing the characteristics of human eyes in that they are sensitive to a luminance and insensitive to a color difference. In a practical operation, the sub-sampling unit 3102 reduces the quantity of color difference data to one half of the original quantity by obtaining the average value of adjacent two color difference data. Reference numeral 3103 denotes a DCT unit for dividing the image data input through the sub-sampling unit 3102 into blocks each having dimensions of 8×8 in the horizontal and vertical directions and for conducting DCT on each of the obtained blocks to transform the input image into a frequency space.

Reference numeral 3104 denotes a quantization unit for dividing 64 DCT coefficients by quantized values having different step widths. Reference numeral 3105 denotes a Huffman encoding unit for dividing the 64 quantized DCT coefficients into a single DC coefficient and 63 AC coefficients and for coding the respective coefficients according to the Huffman table recommended by JPEG. After a header, such as quantization table data or Huffman table data, is affixed to the coded data, the coded data is stored in a memory or transmitted to another apparatus.

FIG. 27 is a block diagram illustrating a function confirguration of an ADCT expanding apparatus.

In the figure, reference numeral 3205 denotes a Huffman decoding unit for decoding input coded data to generate quantized data. Reference numeral 3204 denotes an inverse quantization unit for transforming the quantized data generated by the Huffman decoding unit 3205 into DCT coefficient data. This is achieved by multiplying 64 coefficients by the quantized values using the quantization table data employed by the quantization unit 3104 for quantization.

Reference numeral 3203 denotes an inverse DCT unit for performing inverse DCT on the DCT coefficient data obtained by the inverse quantization unit 3204 to obtain actual image data. Reference numeral 3202 denotes an interpolation unit for interpolating the data Cr and Cb which have been removed by the sub sampling unit 3102 during data compression by the simple repeating method. Reference numeral 3201 denotes a color space editing unit for converting the data YCrCb into NTSC-RGB data or color space data suitable for that particular apparatus.

The flow of the process in a conventional data compressing or expanding apparatus will now be described.

Figure 28:
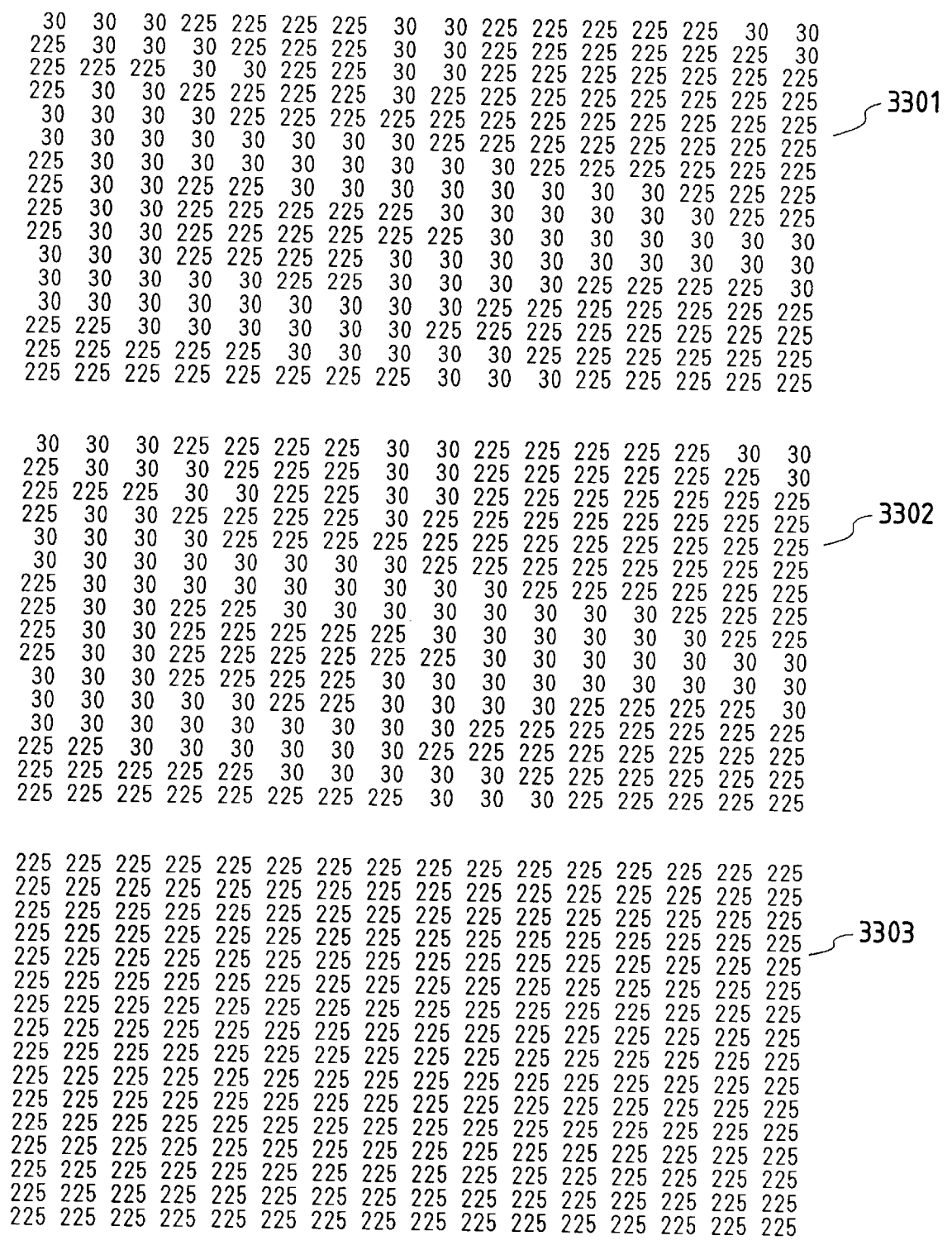

FIG. 28 illustrates part of image data of a color multilevel image created on a computer. The image data shown in FIG. 28 is NTSC-RGB data which shows the portion (16 pixels× 16 pixels) of the image data representing a character portion of a color multilevel image.

In FIG. 28, reference numeral 3301 denotes red (R) data, reference numeral 3302 denotes green (G) data, and reference numeral 3303 denotes blue (B) data. The data of each pixel is obtained by a 8-bit register (0 to 255). The data shown in FIG. 28 represents the portion of an image in which a character of blue (R, G, B)=(34, 30, 225) is written on a background of a slightly dark white (R, G, B)=(225, 225, 225).

The color space conversion unit 3101 performs conversion from NTSC-RGB to YCrCb by the following equations:

$$Y=0.299 \times R+0.587 \times G+0.114 \times B$$

$$Cr=0.713\ (R-Y)$$

$$Cb=0.564\ (B-Y)$$

In addition, in order to allow for overshoot or undershoot during the operations in the YCrCb color space, the color space conversion unit 3101 performs rounding of data in conformity with the recommendation of CCIR as follows:

$$Y=219.0 \times Y+16.5$$

$$Cr=224.0 \times Cr+128.5$$

$$Cb=224.0 \times Cb+128.5$$

The sub-sampling unit 3102 performs sub-sampling on the color difference data Cr and Cb in the data of YCrCb obtained by the above-described equations using the average value method as the sub-sampling method. In this method, the average value of the data of the adjacent two pixels is obtained to obtain single data.

FIG. 29 illustrates the data obtained through the color space conversion unit 3101 and the sub-sampling unit 3102. In FIG. 29, reference numeral 3401 denotes Y data (luminance data), reference numeral 3402 denotes Cr data (color difference data) and reference numeral 3403 denotes Cb data (color difference data). As can be seen in FIG. 29, the quantity of each of Cr and Cb data has been reduced to one half by the sub-sampling unit 3102.

Y data 3401, Cr data 3402 and Cb data 3403, shown in FIG. 29, are input to the DCT unit 3103. The DCT unit 3103 divides the data into blocks each of which contains data having dimensions of 8×8 in the horizontal and vertical directions. As a result, Y data 3401 is divided into four blocks 3401a through 3401d. Similarly, Cr data 3402 is divided into two blocks 3402a and 3402b. DCT is performed on each of these eight blocks.

FIG. 30 illustrates the data obtained by performing DCT conversion on the eight blocks shown in FIG. 29. In FIG. 30, reference numeral 3501 denotes data obtained by performing DCT on Y data 3401. The four blocks 3401a through 3401d respectively correspond to blocks 3501a through 3501d. Similarly, reference numeral 3502 denotes data obtained by performing DCT on Cr data 3402. Reference numeral 3503 denotes data obtained by performing DCT on Cb data 3403. 64 coefficients of each of the blocks obtained by DCT include a single DC component (in the left upper corner) and 63 AC components.

Next, the quantization unit 3104 quantizes the DCT data 3501 through 3503 shown in FIG. 30.

The quantization table recommended by JPEG is employed as the quantization table for quantization. FIG. 35 illustrates that quantization table. In FIG. 35, reference numeral 4001 denotes data for Y components, and reference numeral 4002 denotes data for Cr and Cb components. FIG. 31 illustrates data obtained by quantization. Reference numeral 3601 denotes data obtained by quantizing Y data. Reference numeral 3602 denotes data obtained by quantizing Cr data. Reference numeral 3603 denotes data obtained by quantizing Cb data.

The Huffman coding unit 3105 divides each of the quantized data 3601 through 3603 into a DC component and AC components. Regarding the DC component, the Huffman coding unit 3103 creates the optimum Huffman coding table by obtaining a histogram for a difference between the DC component of a previous block and the DC component of the present block, and performs coding according to that table.

The AC components are re-arranged zigzag, as shown in FIG. 36. The Huffman coding unit 3105 creates the optimum Huffman table by obtaining a histogram for a combination of a run length of "0" obtained before a value "X", other than "0", enters and the value "X", and performs coding according to the created optimum Huffman table.

By this time, the NTSC-RGB data of 16×16 pixels have been transformed to data having 796 bits. Since a single original pixel has 8 bits, 16×16×three colors=786 bytes= 6144 bits. Therefore, compression of 1/7.7 has been performed. In an actual operation, an image size, the quantization table and the coding table are affixed to the obtained coded data, and that coded data is stored in a memory or transmitted.

The flow of the process in a conventional data expanding apparatus will be described below.

The image data processed by the ADCT compression method enters and are decoded by the Huffman decoding unit 3205. The inverse quantization unit 3204 performs inverse quantization on the data decoded by the Huffman decoding unit 3205 by multiplying the obtained data by the coefficients in the quantization table shown in FIG. 35.

Thus, the data shown in FIG. 32 is obtained. The data shown in FIG. 32 is obtained by performing Huffman decoding and inverse quantization on the data obtained by the ADCT compression method. As is clear from FIG. 32, the data shown in FIG. 32 is completely different from the data shown in FIG. 30 which is not yet compressed.

The inverse DCT unit 3202 transforms the data shown in FIG. 32 into YCrCb data. FIG. 33 illustrates the obtained YCrCb data. The color space conversion unit 3201 converts the YCrCb data shown in FIG. 33 into NTSC-RGB data. FIG. 34 illustrates the data finally obtained by data expansion.

However, the above-described conventional ADCT compression method is an irreversible compression method in which data is lost during quantization in the sub-sampling unit 3102 and the quantization unit 3104. Thus, the expanded data differs from the data which is not yet subjected to compression. This is apparent from FIG. 34 which illustrates the NTSC-RGB data obtained by performing expansion. This means that degradation in the image quality has occurred.

Images created on a computer (computer created images), such as DTP data, have advantages in that they have sharp outlines and in that a single figure (or a single character) can be colored in a single color without noise being generated. However, the image data processed by the ADCT compression method suffers from disadvantages in that the outlines of a figure are not clear, in that a pseudo-edge (called mosquito noise) is generated, and in that colors change due to quantization, and thus loses the advantages inherent in the computer created image.

Particularly, since the above-described conventional compression is performed in the units of a block consisting of 8×8 pixels, colors greatly change in a boundary area. Also, an increase in the compression rate causes the AC components to be finally lost, generating a block deformation and thus producing an image whose resolution has been reduced to one eighth of that of the original image.

In order to improve the image quality, image data may be compressed by a reversible compression method, such as the Huffman coding method. However, in this method, since the quantity of compressed data is variable, the quantity of compressed data to be stored in a memory cannot be fixed. Particularly, the processing of a gradation image or an image fitted into a computer created image and read by a scanner (hereinafter referred to as a natural image) by the reversible compression method may increase the quantity of data. Hence, a memory having a large capacity must be provided to prepare for the worst case.

The gradation or natural images have low-frequency components, unlike the normal computer created images having high-frequency components which are essential to the clear outlines and single color. Therefore, reversibility of the compressed/expanded data is not important to the gradation or natural images, and changes in the data due to the ADCT compression/expansion process may not degrade the image quality.

Further, although the amount of compressed data can be adjusted in the ADCT compression method, adjustment is performed by trial-and-error, i.e., by performing compression as a pre-scanning and then by performing compression again after a parameter for compression has been re-set on the basis of the quantity of compressed data obtained by pre-scanning. Thus, it takes much time to complete compression.

In brief, when the gradation or natural images are compressed by the reversible compression method, the compression rate cannot be increased. In addition, even when the ADCT compression method is employed, different compression methods may be employed for the portion of an image where degradation in the image quality is not apparent and for the other portion.

However, in the method in which the area is divided into blocks for the ADCT processing, as described above, a problem occurs when a block which contains a computer created image and a natural image in a mixed state (i.e., mixed together) is processed. That is, reversible compression performed on such a block increases the quantity of data, while ADCT compression performed on such a block deteriorates the image quality.

Furthermore, there are two types of compression method for multilevel color images: the reversible coding method and the irreversible coding method. Although a high compression rate cannot be obtained in the reversible coding method, deterioration in the decoded image does not occur, and the same image as the original image can thus be obtained. More specifically, when this reversible coding method is applied to a natural image which contains a large amount of halftone portions, it is impossible to obtain a high compression rate, although deterioration in the reproduced image does not occur. When the reversible coding method is employed for CG images, such as characters or figures created by, for example, the DTP software, since the number of colors which forms the image is less than that of a natural image, a relatively high compression rate can be obtained.

Although a high compression rate can be obtained in the irreversible coding method, deterioration in the decoded image occurs. The ADCT coding method which employs the DCT transform as the orthogonal transform has recently been drawing attention as an irreversible coding method. In this method, processing is performed in the units of a block having a certain size, and the DCT transform is performed at the initial stage. Since the DCT transformed coefficients are a frequency space, they are focused on a low frequency space, although focusing depends on an objective image. The frequency space is quantized, and the quantized coefficients are coded to obtain run length codes. Thus, when this ADCT coding method is applied to a natural image, since the natural image is highly focused on a low frequency space, a high compression rate can be obtained. In addition, deterioration in the decoded image is less. On the contrary, since the CG images, such as characters or figures created, for example, the DTP software, contain much high-frequency components, the degree of focusing in the frequency space is low. Therefore, when this ADCT coding method is used for coding the CG images, a high compression rate cannot be readily obtained. An increase in the compression rate may greatly deteriorate the quality of a decoded image.

Thus, a suitable coding method differs depending on the type of an objective image. Consequently, if a single coding method is employed for an image which contains both types of images, a natural image and a CG image, the image portion which is not suited to that coding method greatly deteriorates or a high compression rate cannot be obtained. Hence, the present inventors have filed Japanese Patent Application No. 4-217038 which discloses the coding method employing a plurality of methods for a single image. In this coding method, a CG image is coded by a reversible coding method suited to that image, while a natural image is coded by an irreversible coding method suited to that image. For a block in which there are two types of images, the two methods are employed for coding.

However, when the reversible coding method is employed for a mixed block, since the contour portion of a character or figure contains a high-frequency component, the image quality of that portion greatly deteriorates. Therefore, the character or figure portion of an objective block must be interpolated by natural image pixels which surround that character or figure portion so as to delete the high-frequency component of that block.

In addition, since this interpolation is performed synchronously with the operation of the coding unit which operates at a high speed, it must be able to be performed at a high speed.

Furthermore, even when an image (a natural image) fitted into a computer created image or a gradation image is processed by the reversible compression method, a high compression rate cannot be obtained. In some cases, the quantity of data may increase. The natural or gradation image has a low-frequency component, unlike a normal computer created image having a high-frequency component which is essential to the sharp outlines or singularity of color. Therefore, reversibility of the compressed/expanded data is not very important, and changes in the irreversibly compressed/expanded data do not generate apparent deterioration.

Thus, when the reversible compression method is employed for the natural or gradation images, a high compression rate cannot be obtained. Even when an irreversible compression method is employed, different compression methods must be employed for the image portion which does not deteriorate greatly and for the other image portion.

SUMMARY OF THE INVENTION

In view of the aforementioned problems of the prior art, an object of the present invention is to provide an image data compression apparatus which is capable of efficiently compressing or expanding image data, and a method thereof.

To achieve the above-described object, the present invention provides an image data compression apparatus which comprises irreversible compression means for compressing input multilevel image data for every block having a predetermined size by an irreversible compression method, and reversible compression means for compressing the input multilevel image data by a reversible compression method. Selection between output data of the irreversible compression means and output data of the reversible compression means is made for every pixel on the basis of data having a predetermined level and compressed by the reversible compression means.

Another object of the present invention is to provide an image data compression apparatus which enables the efficiency with which an image is compressed to be improved by substitution of image data.

To achieve the above-described object, the present invention provides an image data compression apparatus which comprises irreversible compression means for compressing input multilevel image data for every block having a predetermined size by an irreversible compression method, and reversible compression means for compressing the input multilevel image data by a reversible compression method. The reversible compression means performs compression after the input multilevel image data has been substituted on the basis of a predetermined reference.

Still another object of the present invention is to provide an image processing apparatus which enables interpolation of image data to be processed at a low cost and at a high speed.

To achieve the above-described object, the present invention provides an image processing apparatus in which a compression means is provided for each pixel type classified for every pixel in a block having a predetermined size, which comprises interpolation means for interpolating image data of pixels having an image type other than a predetermined image type by image data of pixels having the predetermined image type and located around the pixels having the image type other than the predetermined image type.

Still another object of the present invention is to provide an image processing apparatus which is capable of performing efficient compression by selecting a compression method according to changes in colors in a block.

To achieve the above-described object, the present invention provides an image processing apparatus which comprises irreversible compression means for compressing input multilevel image data for every block having a predetermined size by an irreversible compression method, reversible compression means for compressing the input multilevel image data by a reversible compression method, judgement means for judging changes in colors in the block on the basis of the input multilevel image data, and selection means for selecting either the irreversible compression means or the reversible compression means according to the result of the judgement of the judgement means.

Other objects and advantages of the present invention will become apparent from the following description taken in connection with the accompanying drawings.

BRIEF DESCRIPTION OF THE DRAWINGS

FIG. 2 is an illustration of an example of data read from a block delay unit of the embodiment shown in FIG. 1;

FIGS. 3A and 3B are illustrations of examples of data after an interpolation performed by a pixel data interpolation unit of the embodiment shown in FIG. 1;

FIG. 6 is an illustration of an example of rearrangement of pixel data performed by a pixel data rearranging unit of the embodiment shown in FIG. 1;

FIG. 18 is an illustration of a threshold value table of the adaptive Huffman encode unit shown in FIG. 16;

FIG. 19 is an illustration of an example of the construction of a compression memory incorporated in the embodiment shown in FIG. 11;

FIG. 20 is an illustration of a segment information table in the embodiment shown in FIG. 11;

FIG. 21 is a flow chart illustrative of the operation for storing compressed data in the compression processing;

FIG. 26 is an illustration of the construction of a conventional ADCT compression apparatus;

FIG. 27 is an illustration of the construction of a conventional ADCT expansion apparatus;

FIG. 28 is an illustration of RGB data as an example of image data;

FIG. 29 is an illustration of YCrCb data after a sampling, the YCrCb data has been obtained through conversion of the RGB data shown in FIG. 28;

FIG. 30 is an illustration of DCT data obtained through DCT conversion of the data shown in FIG. 29;

Figure 31:
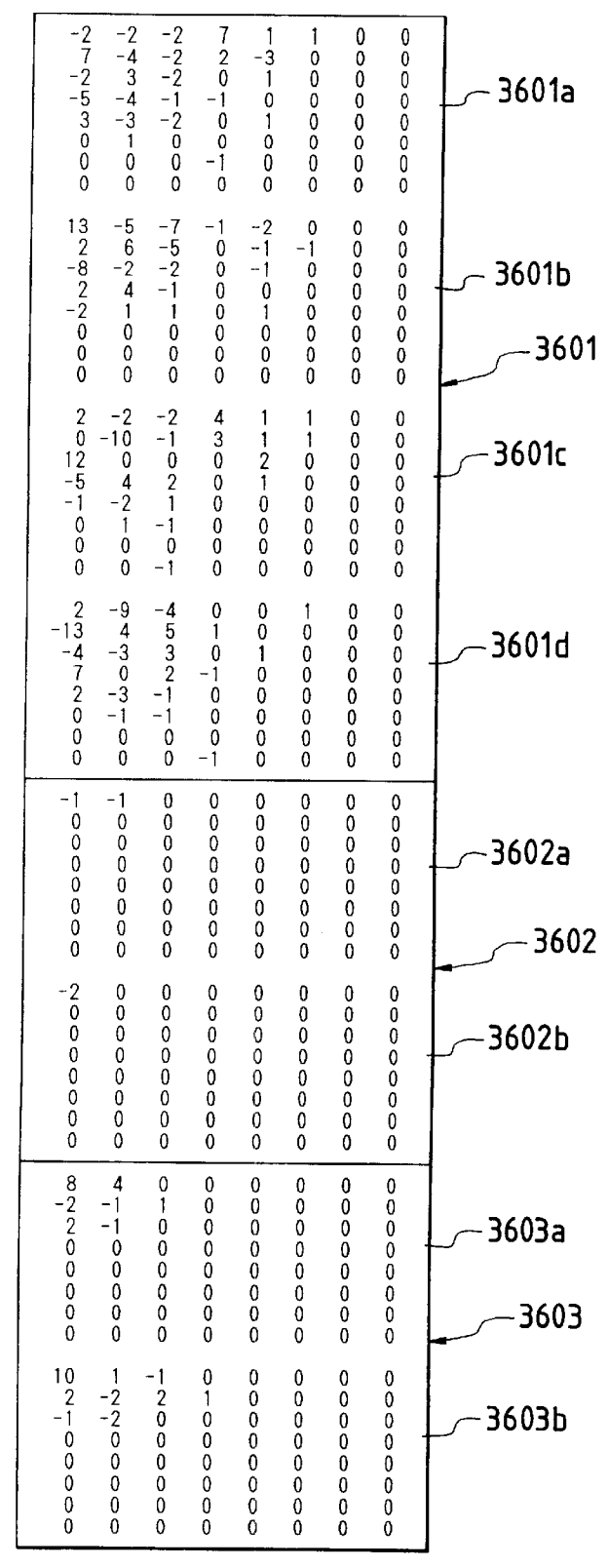

FIG. 31 is an illustration of quantized data obtained by quantizing the data shown in FIG. 30;

Figure 32:
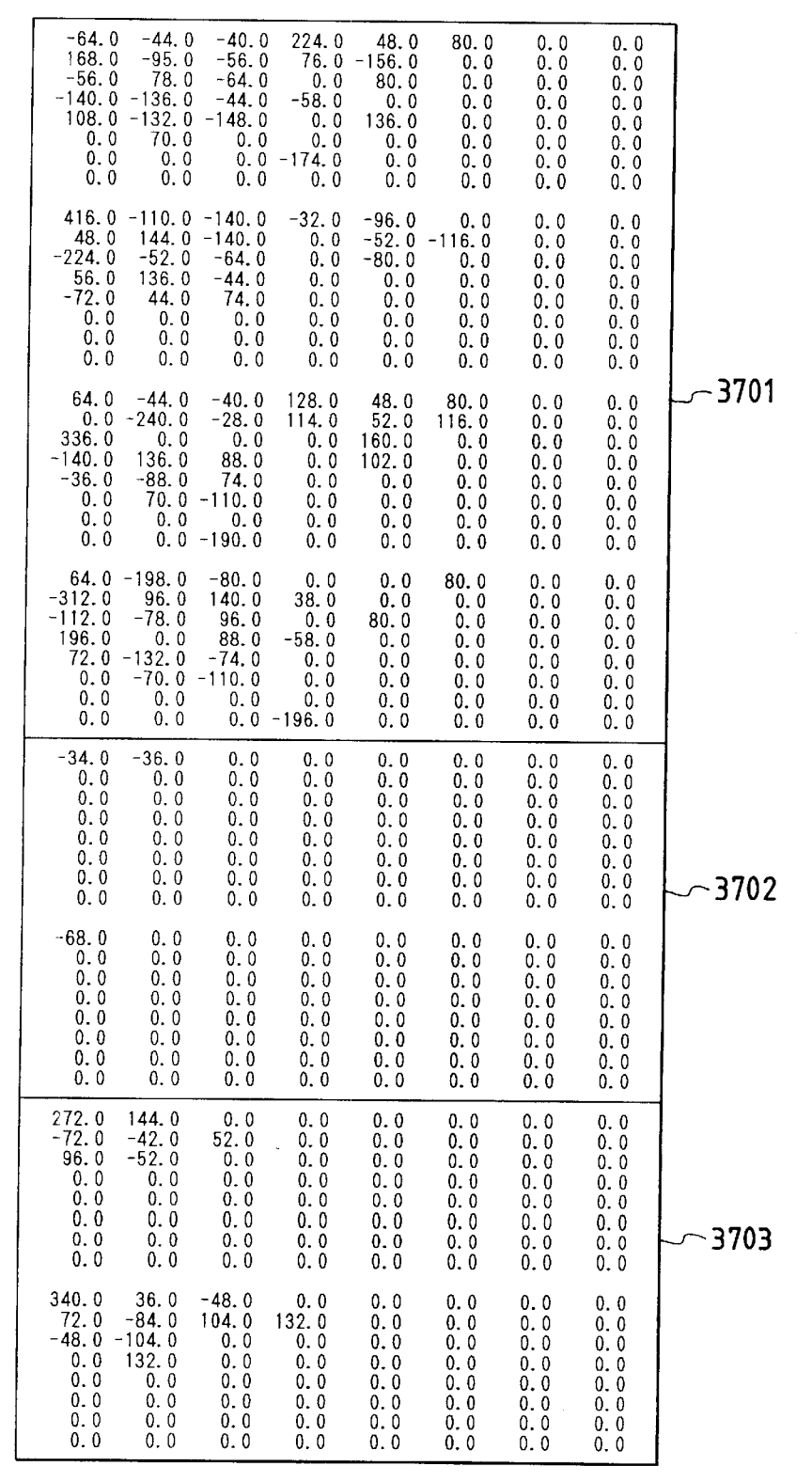

FIG. 32 is an illustration of the DCT data obtained by inverse quantization of the data shown in FIG. 31;

FIG. 33 is an illustration of YCrCb data obtained through inverse DCT conversion of the data shown in FIG. 32;

Figure 34:
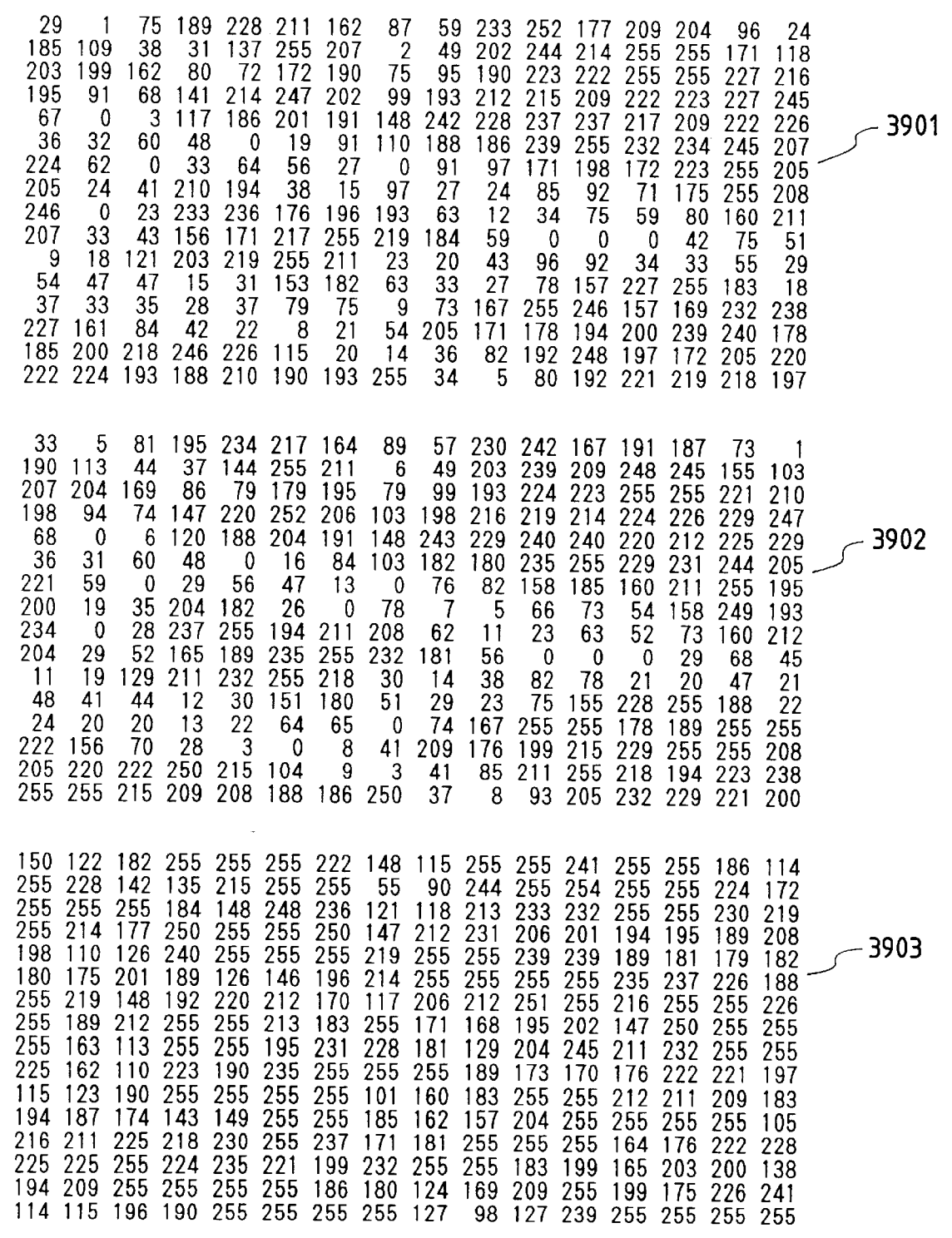

FIG. 34 is an illustration of a process in which the data shown in FIG. 33 is interpolated and converted into RGB data;

FIG. 37 is an illustration of an example of data stored in the buffer memory shown in FIG. 25;

FIG. 39 is an illustration of an index table shown in FIG. 38;

FIG. 41 is an illustration of the order of entry of image data into a vertical-direction interpolation circuit;

FIGS. 42A and 42B are illustrations of pixel data and attribute data of a natural image;

FIGS. 43A and 43B are illustrations of pixel data and attribute data of a CG image;

FIGS. 44A and 44B are illustrations of pixel data and attribute data of a mixed image including a natural image and a CG image;

FIGS. 45A and 45B are illustrations of pixel data and attribute data of a mixed image including a natural image and a CG image;

FIGS. 46A and 46B are illustrations of pixel data of natural-CG mixed image after a vertical-direction interpolation and attribute data of the natural-CG mixed image after a horizontal-direction interpolation;

FIGS. 47A and 47B are illustrations of pixel data of natural-CG mixed image after a horizontal-direction interpolation and attribute data of the natural-CG mixed image after a vertical-direction interpolation;

FIG. 49 is an illustration of the order of entry of image data into horizontal-direction interpolation circuit;

FIG. 50 is an illustration of another arrangement for realizing the interpolation processing performed in the thirteenth embodiment;

FIG. 51 is an illustration of an arrangement which uses a double memory of memory 563;

DETAILED DESCRIPTION OF THE PREFERRED EMBODIMENTS

<First Embodiment>

Figure 1:
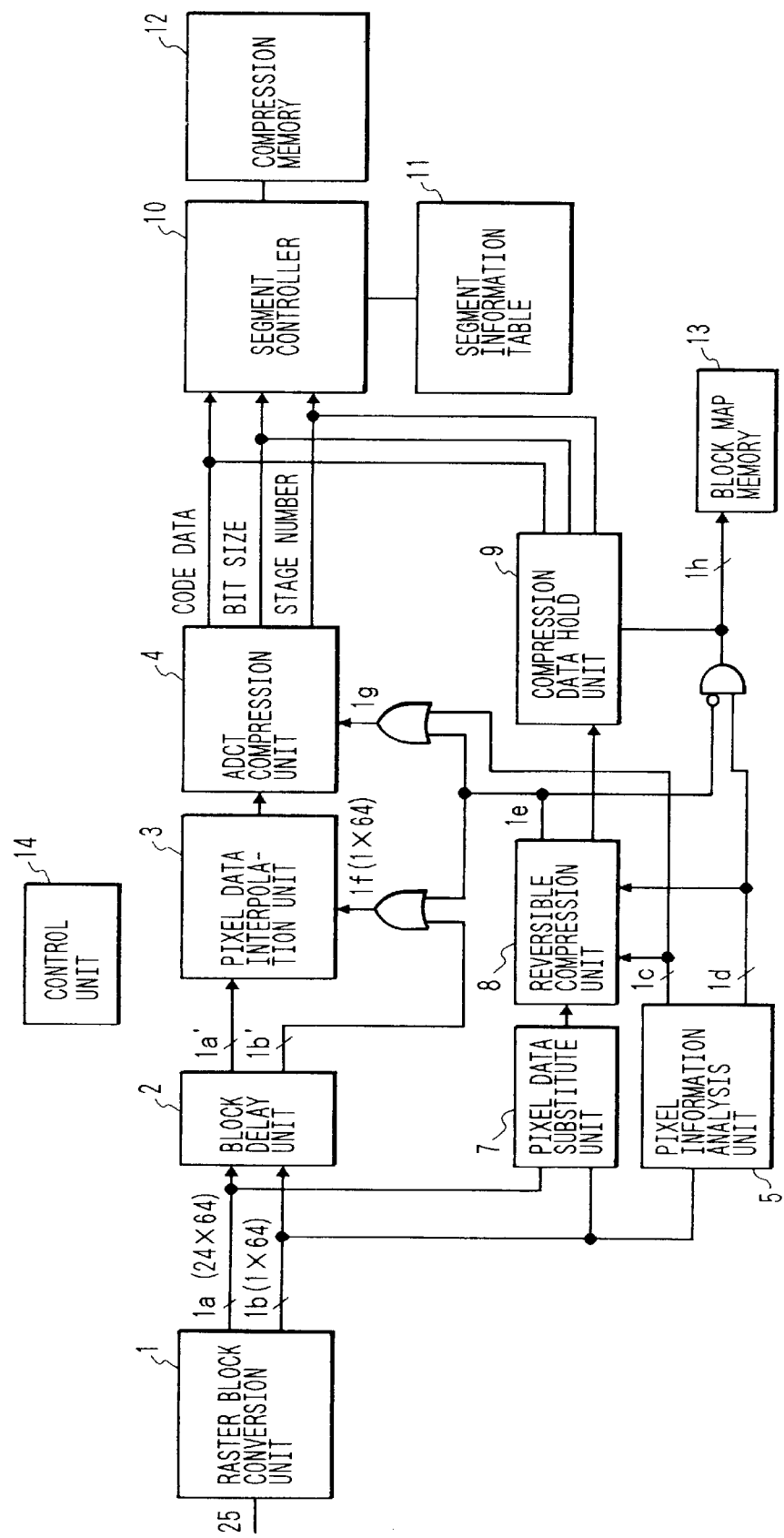
FIG. 1 is an illustration of the construction of an embodiment of the data compression apparatus in accordance with the present invention.

An embodiment of the present invention will be described below with reference to the accompanying drawings.

In the following description, a reversible compression method employed in this embodiment is called CG compression. First, the image processing operation performed in this embodiment will be outlined.

<Compression>

The embodiment includes a raster/block converting unit which holds, as input pixel data, a pixel data group consisting of pixels of m×n pixels in the horizontal and vertical directions (hereinafter referred to as a block), as well as a pixel type data group which indicates a single pixel type for a single pixel (there are two types of pixel type data: one, "pixel A", for a natural image pixel, and the other, "pixel B", for the other pixels).

For a block where all the pixel of type data are pixel A, the ADCT compressed data is output.

For a block where all the pixel type data are pixel B, a quality D of CG compressed data is compared with a given limited value L.

When $D \leq L$, the CG compressed data is output.

When $D > L$, the ADCT compressed data is output.

Furthermore, for a block where pixels A and B are present in a mixed state, pixel data (A) are substituted for the pixel data whose pixel type data are pixel A, while pixel data (B) are substituted for the pixel data whose pixel type data are pixel B and whose pixel data are (A). Thereafter, the quantity D of CG compressed data obtained at that time is compared with the given limited value L.

When $D \leq L$, the CG compressed data of the substituted pixel data group are output, and the ADCT compressed data of the pixel data group from which the pixel data having pixel type B have been removed and interpolated are output.

When $D > L$, the ADCT compressed data is output.

The first embodiment further includes a compression memory for storing the ADCT compressed data and the CG compressed data obtained in each of the compression processes, and a block map memory for storing a signal having 1 bit per block, e.g., a signal having "0" for a block from which reversible compressed data has been output or having "1" for the other blocks.

The ADCT compressed data is stored in the compressed memory together with the reversible compression data in a state wherein they are divided into p Huffman codes, q Huffman codes, r Huffman codes, . . . Control of the compression memory is performed by a segment controller.

The addresses where the compressed data have been stored are stored in a segment information table.

Where the capacity of the memory is in short during the above-described compression process, new compressed data is written on the divided ADCT compressed data starting with the data which is not important by referring to the segment information. In this way, control which will be described later can be conducted using a memory having a fixed capacity.

<Expansion>

A 1-bit block map is read out from a block map memory. When the block map is "1", the ADCT compressed data read out from the compression memory is expanded, and the expanded data is written in a block raster converting unit.

When the block map is "0", the CG compressed data read out from the compression memory is expanded, and the pixel type data is analyzed to create a pixel type data bit map.

When even a single pixel type A is present in the bit map, the ADCT compressed data read out from the compression memory is expanded. For the pixels whose bit map shows pixel type A, the ADCT expanded data thereof are written in the block raster converting unit. For the pixels whose bit map shows pixel type B, the CG expanded data thereof are written in the block raster converting unit.

When all the pixels in the bit map show pixel type B, the CG expanded data are written in the block raster converting unit.

In the above-described compression/expansion process, since the pixel data is substituted and CG compressed or interpolated and ADCT compressed for a mixture block where pixel types A and B are present in a mixed state, the problems involving the image quality and the quantity of compressed data can be solved.

The use of two types of compressed data allows the pixel type data required for every pixel to be buried in the CG compressed data, and the need for an additional bit map memory can thus not eliminated. Further, since the compression method is switched to the ADCT compression method when the quantity D of CG image data exceeds the limited value L, the capacity of the memory employed for expansion can be restricted to a fixed value.

The raster block converting unit and the block raster converting unit are made of a buffer. The same buffer may be used for both.

The data compression apparatus of this embodiment will now be described in detail.

In this embodiment, the dimensions of a block, on which processing is performed, are m=8 and n=8. However, the block size is not limited to the above-described one, and any desired block size can be employed (for example, a block size of m=16 and n=8 may be employed for sub sampling color difference components by ADCT).

The above-mentioned limited value L is obtained by adding a memory capacity S (hereinafter referred to as a "saving S") which has been permitted for the processed blocks but has not been used to a constant value C which is allowed for the processed block.

FIG. 1 illustrates the structure of the data compression apparatus of this embodiment. In the figure, a raster block conversion unit 1 holds NTSC-RGB pixel data having one bit per pixel, as well as the pixel type data on these pixels ("1" for a natural image pixel as pixel type A and "0" for the other pixels as pixel type B) for eight lines. The raster block conversion unit 1 parallel outputs pixel data 1a for a single block and pixel type data 1b. The pixel type data is generated when data is converted by a page description language conversion unit which is not shown.

A block delay unit 2 delays and holds the data 1a and 1b for a single block from the raster block conversion unit 1 because the necessity of the ADCT compressed data is determined by the result of CG compression.

A pixel data interpolation unit 3 interpolates data 1a' read out from the block delay unit 2 under the control of a signal 1f. Signal 1f is data having one bit per pixel. Signal 1f is generated by ORing signals 1b' and 1e. When signal 1b' has data shown in FIG. 2, signal 1f is arranged in the manner shown in FIG. 3A, if signal 1e has "0". If signal 1e has "1", signal 1f has a configuration shown in FIG. 3B.

The pixel data interpolation unit 3 removes the data corresponding to "0" in signal If and interpolates the removed data such that no steep edge is present in the block. This interpolation may be performed by calculating the average value of the pixel data where signal if has "1" and then by replacing the value of the pixel data where signal if is "0" with that average value.

When a signal 1g has "1", an ADCT compression unit 4 performs ADCT compression on the data input from the pixel data interpolation unit 3, divides the compressed data in many stages and outputs the divided data. Signal 1g is data having one bit per block. Signal 1g has "1" when signal 1e has "1" (which means that the quantity D of CG compressed data>L or that D=64) or when a signal 1c has "1" (which means that there is at least one pixel type A in the pixel type signal 1b).

A pixel type information analysis unit 5 generates signal 1c which has "1" when there is at least one pixel type A in the pixel type data 1b of a block and has "0" for the other occasions, and a signal 1d which has "1" when at least one pixel type B is present in the pixel type data 1b of that block and has "0" for the other occasions. Both signals 1c and 1d have one bit per block.

A pixel data substitute unit 7 inputs pixel data 1a and pixel type data 1b from the raster block conversion unit 1, and substitutes pixel data (A) for the pixel data whose pixel type data is pixel A and substitutes pixel data (B) for the pixel data whose pixel type data is pixel B and whose pixel data is (A).

A reversible compression unit 8 (CG compression unit) inputs the substituted data from the pixel data substitute unit 7, performs CG compression on the input data by referring to signals 1c and 1d, and outputs the compressed data and the area judgement result 1e. The judgement result 1e has "1" when D>L or D=64, and has "0" for the other occasions. The signal 1e is 1-bit data per block.

A compression data hold unit 9 temporarily holds the CG compressed data, and outputs the compressed data when a signal 1h has "1". Signal 1h has "1" when signal 1e has "0" and signal 1d has "1", and has "0" for the other occasions. Signal 1h is data having one bit per block.

A segment controller 10 inputs the compressed data which has been divided into many stages by the compression data hold unit 9 and the compressed data of the ADCT compression unit 4, and controls memory addresses required to store the compressed data in a compression memory. A segment information table 11 stores the addresses at which data has been written.

A compression memory 12 is made up of a plurality of small segments. It stores the data output from the segment controller 10 at a designated address.

A block map memory 13 stores signal 1h which is data having one bit per block.

A control unit 14 controls the operation timing of the respective components.

In the above-described arrangement, the divided ADCT compressed data and the CG compressed data are stored in the compression memory 12. When the capacity of the memory falls short during compression, new compressed data is written on the divided ADCT compressed data in sequence starting with the data which is less important by referring to the segment information so as to make the capacity of the memory a fixed value.

Figure 4:
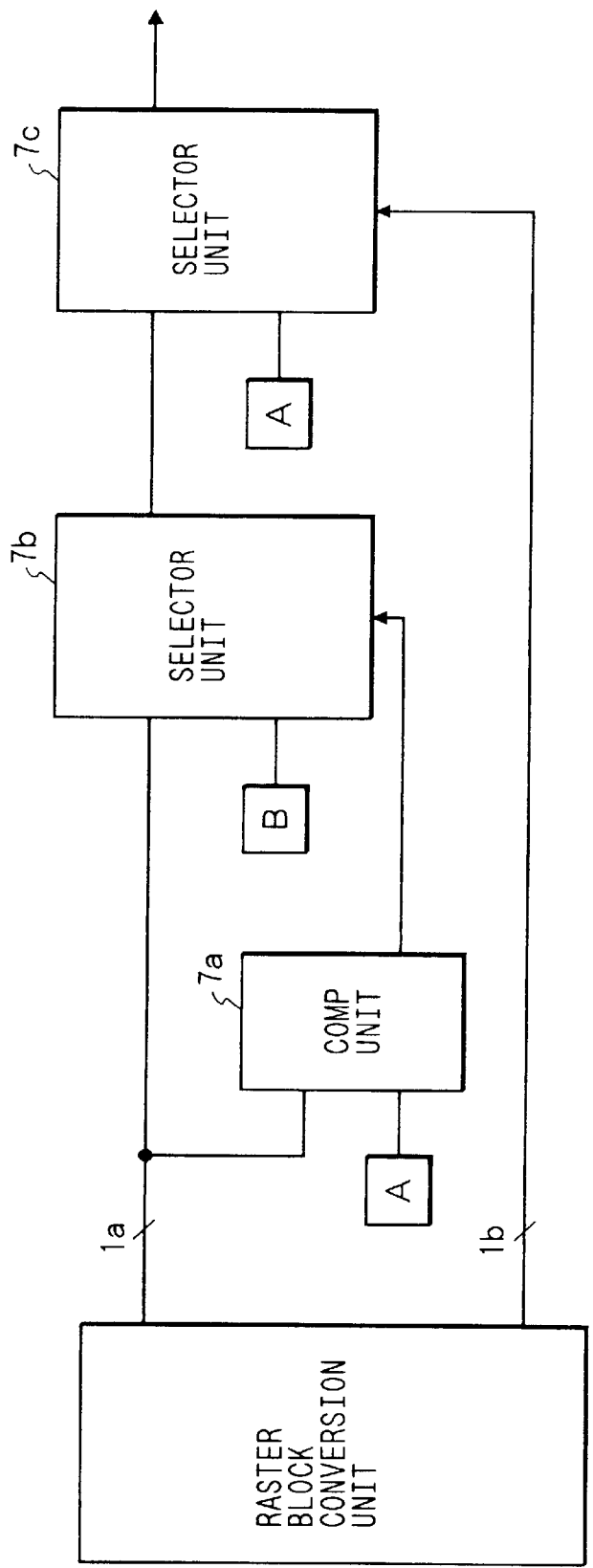
FIG. 4 is a block diagram showing the detail of a pixel data substitute unit of the embodiment shown in FIG. 1.

FIG. 4 is a block diagram of the pixel data substitute unit 7.

In the pixel data substitute unit 7, a comparator unit 7a compares the pixel data group 1a input from the raster block conversion unit 1 with pixel data (A). When the pixel data group 1a coincides with pixel data (A), a selector unit 7b substitutes pixel data (B) for each of the pixels in the pixel data group 1a, as shown in FIG. 4. A selector unit 7c substitutes pixel data (A) for each of the pixels whose pixel type signal has "1". Since the pixels whose pixel type information has "1" (which means that that pixel is a natural image pixel) are all substituted for pixel data (A), an increase in the quantity of CG compressed data in an image where pixel types A and B are present in a mixed state can be prevented and burial of the pixel type data in the compressed data is enabled. Consequently, the data having a value of pixel data (A) and having pixel type B has a value of pixel data (B). However, such small errors do not adversely affect the image quality. In this embodiment, (A)={127, 127, 127}, and (B)={128, 128, 128}. However, the threshold values of the pixel data are not limited to the above-described values, and any desired values may be employed.

Figure 5:
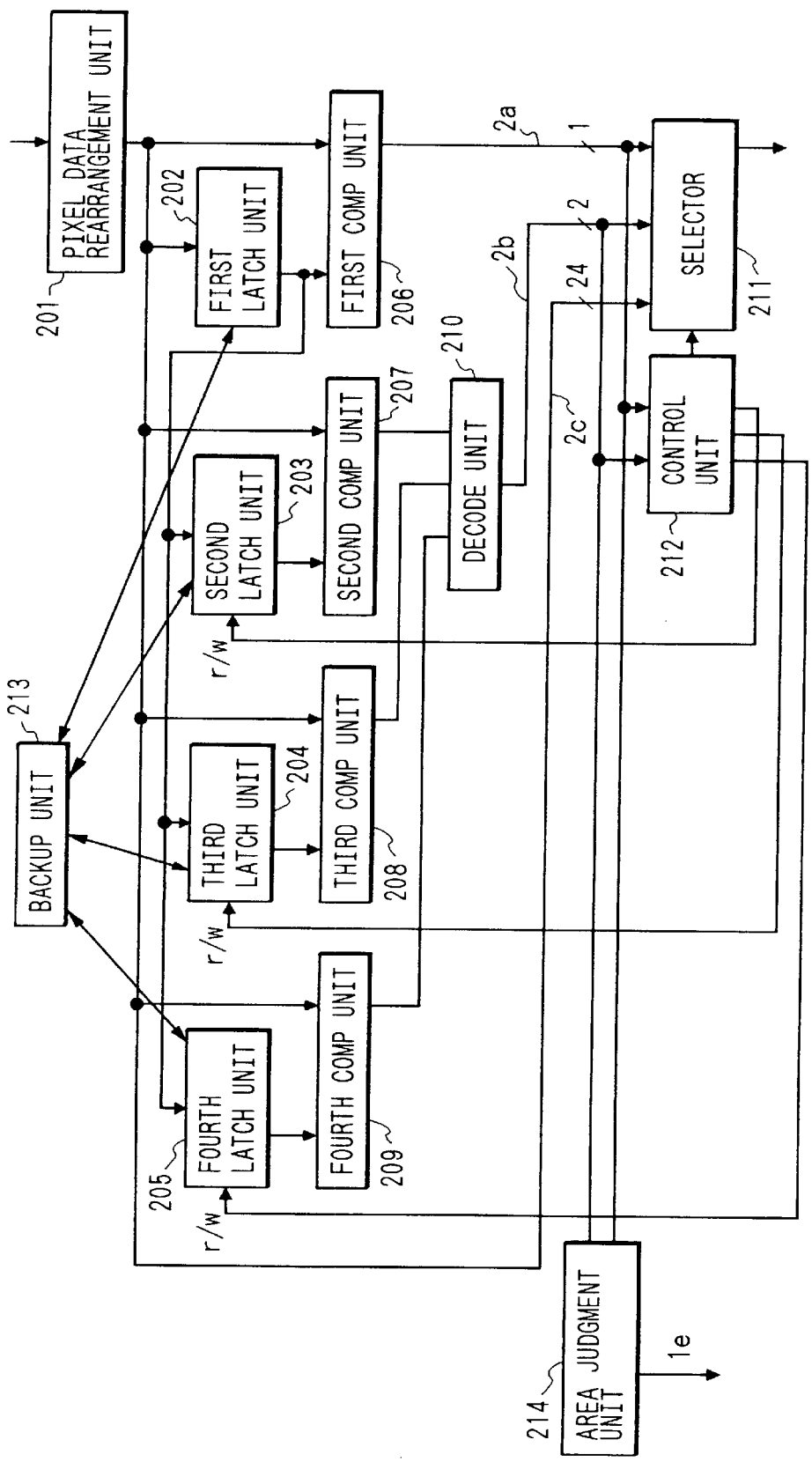
FIG. 5 is a block diagram showing the detail of the construction of a reversible compression unit (CG compression unit) of the embodiment shown in FIG. 1.

FIG. 5 is a block diagram of the reversible compression unit 8 (CG compression unit).

In FIG. 5, a pixel data rearrangement unit 210 rearranges the pixel data from the pixel data substitute unit 7 in an order shown in, for example, FIG. 6.

A first latch unit 202 holds the pixel data (24 bits) from the pixel data rearrangement unit 201. Second to fourth latch units 203 through 205 hold the pixel data (24 bits) output from the first latch unit 202.

A first comparator unit 206 compares pixel data 2c from the pixel data rearrangement unit 201 with the pixel data held in the first latch unit 202, and outputs a signal 2a which has "0" when the two pixel data are equal and has "1" when the two pixel data differ from each other.

Second through fourth comparator units 207 through 209 compare pixel data 2c from the pixel data rearrangement unit 201 with the pixel data held in the second through fourth latch units 203 through 205, respectively, and output "0" when the corresponding pixel data are equal and output "1" when the corresponding pixel data differ from each other. A decode unit 210 inputs the comparison results of the second through fourth comparator units 207 through 209, and outputs a 2-bit signal 2b (00: the comparison result of the second comparator unit is coincident, 01: the comparison result of the third comparator unit is coincident, 10: the comparison result of the fourth comparator unit is coincident, 11: the comparison results of the second through fourth comparison units are not coincident).

A selector unit 211 selectively outputs either the comparison result 2a of the first comparator unit 206, the signal 2b of the decode unit 210, or the pixel data 2c output from the pixel data rearrangement unit 201. A control unit 212 inputs signals 2a and 2b, and outputs a write signal for the second, third and fourth latch units 203, 204 and 205 to control the selector unit 211.

Assuming that the latch signal <input (2a, 2e, 2f)>, the control unit 212 performs control in such a manner that it rewrites no latch unit when <0, **: 0, 0, 0>signal 2a="0", that it raises a write signal 2d for the second latch unit when <1, 00: 1, 0, 0>2a=1 and when 2b=00, that it raises a write signal 2e of the third latch unit when <1, 01: 0, 1, 0>2a=1 and when 2b=01, that it raises a write signal 2f of the fourth latch unit when <1, 10 :0, 0, 1>2a=1 and when 2b=10, and that <1, 11: raises a write signal for the latch unit where the oldest data is held>.

A back up unit 213 backs up the contents of each of the first, second, third and fourth latch units 202, 203, 204 and 205 prior to the process. The back up unit 213 returns the contents of each of the first through fourth latch units 202 through 204 to its original contents when the judgement result has an area 2 after the process has been completed. An area judgement unit 214 inputs signals 2a and 2b, and outputs an area judgement signal 1e (0: area 1, 1: area 2).

When the pixel data is compressed by the CG compression unit 8 arranged in the manner described above, the compressed data will be able to be expanded without even 1 bit data being changed.

Figure 7:
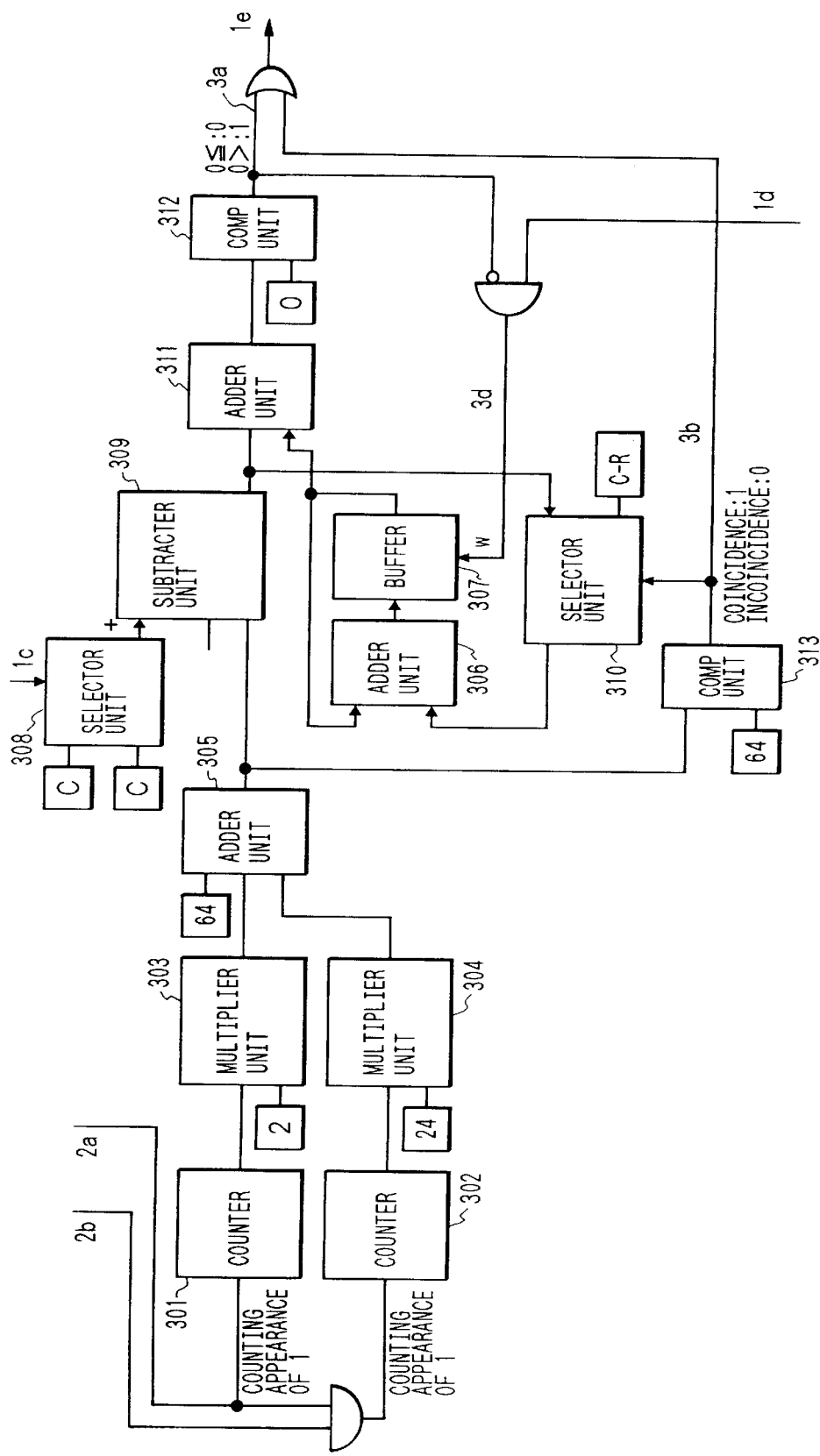
FIG. 7 is an illustration of the detail of an area judgment unit in the reversible compression unit shown in FIG. 5.

FIG. 7 is a block diagram of the area judgement unit 214 shown in FIG. 5.

In FIG. 7, a counter 301 counts the number of times signal 2a has "1" (that is, the number of points where the color has changed). A counter 302 counts the number of times signal 2a has "11" and signal 2b has "1" (that is, the number of times the color stored in no latch has appeared). A multiplier unit 303 outputs the results obtained by multiplying the output of the counter 301 by a number of bits 2 of signal 2a. A multiplier unit 304 outputs the result obtained by multiplying the output of the counter 302 by a number of bits 24 of signal 2c.

An adder unit 305 adds the output 64 bits of the color changing point data, the output of the multiplier unit 303 and the output of the multiplier unit 304, and outputs a number of bits (quantity of compressed data) D finally required for that block.

An adder unit 306 adds an output of a buffer 307 and the capacity of the memory unused for that block (that is, saving S which is the capacity of the memory unused for the processed block), and outputs the addition result. A buffer 307 is updated by the output from the adder unit 306 when a signal 3d has "1". Signal 3d has "1" when a signal 3a has "0" (i.e., when D≧L) and signal 1d has "1" (i.e., when there is at least one pixel type B in the pixel type data in that block).

A selector 308 outputs a constant value C when signal 1c from the pixel type judgement unit 5 has "0", and outputs C' when signal 1c has "1". A subtracter unit 309 subtracts the quantity D of compressed data which is the output of the adder unit 305 from the output of the selector unit 308. A selector unit 310 outputs the output of the subtracter unit 309 when signal 3b has "0", and outputs a constant (C−R) when signal 3b has "1".

An adder unit 311 adds the output of the subtracter unit 309 to the output of the buffer 307 which is saving S. A comparator unit 312 compares the output of the adder unit 311 with 0, and outputs either a signal 3a having "0" as area 1 when the comparison result is 1 or above or a signal 3a having "1" as area 2 when the comparison result is less than 1.

A comparator unit 313 compares the quantity D of compressed data from the adder 305 with 64, and outputs either "1" when they coincide with each other or "0" when they do not coincide. The area judgment signal 1e is created by ORing signal 3a from the comparator unit 312 with signal 3b from the comparator unit 313.

The limited value L (saving S+the limited value C or C' of that block) given to that block is compared with the quantity D of compressed data. When D>L, signal 1e has "1" and the compression method is thereby switched to ADCT compression. In this way, overuse of the memory capacity can be avoided.

When D=64 (which means a flat image in which 64 pixel data have the same value), signal 1e has "1", as in the above-described case. This is because application of ADCT compression to a flat image assures a high compression rate and does not cause deterioration, although it slightly changes color data.

When all the pixel types of a flat image are pixel type A, a value (C−R) obtained by subtracting the quantity of compressed data obtained from experience when the flat image has been ADCT compressed from constant value C is added to saving S. For another cases, signal 1e has "0", and a value obtained by subtracting the quantity D of compressed data from constant C or C' is added. The constant is C when all the pixel types in a block has pixel type B, and is C' for another cases.

The flow of the process in the data compression method employed in this embodiment arranged in the manner described above will now be described with reference to the flowcharts of FIGS. 8A through 10.

Figure 8B:
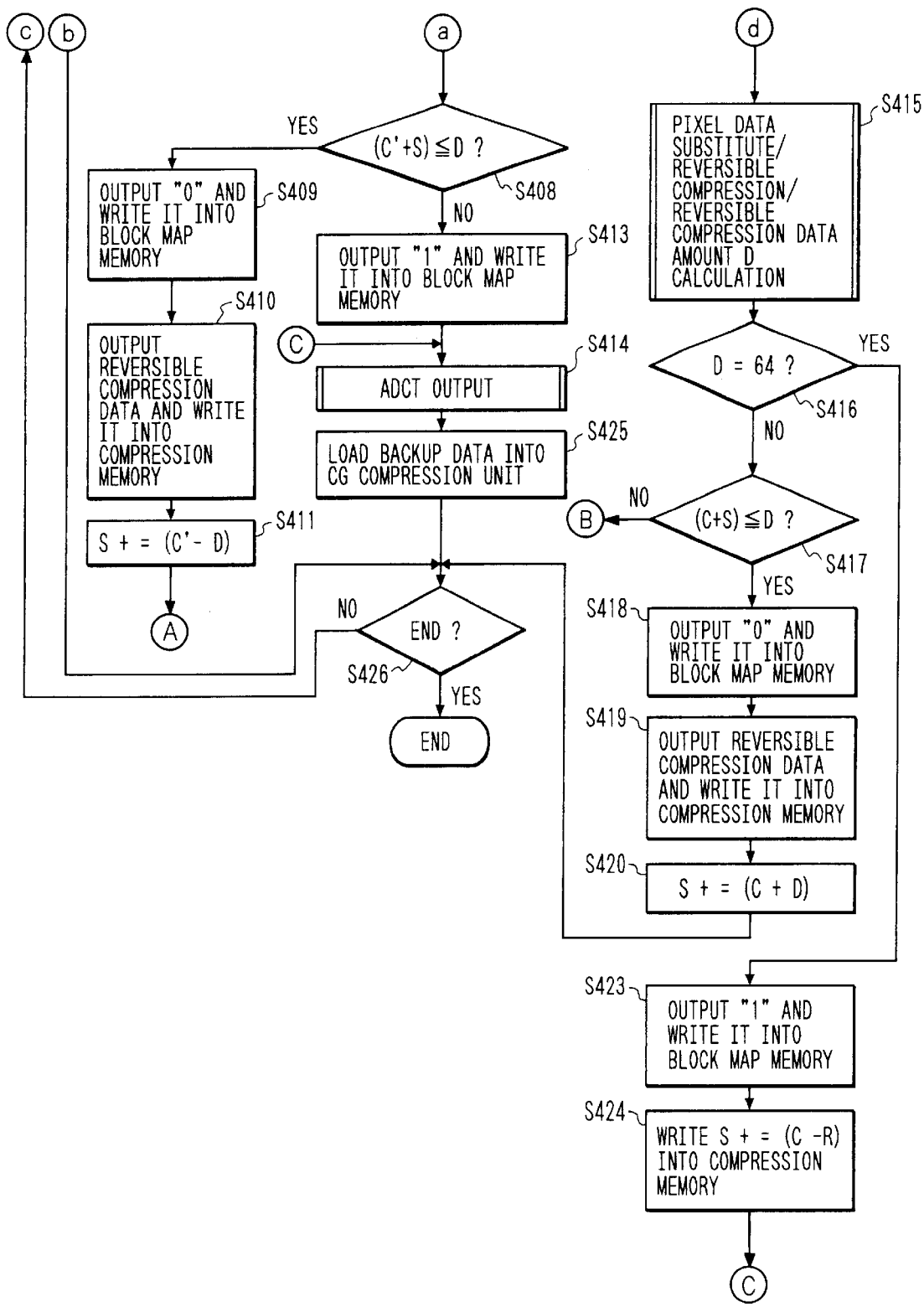
FIG. 8, consisting of FIGS. 8A and 8B are flow charts showing the flow of an embodiment of the data compression process in accordance with the present invention.

FIGS. 8A and 8B are flowcharts showing the compression procedures of the data compression apparatus shown in FIG.

1. In the following description, the newest updated color data held in the first latch unit 202 is referred to as post-data, and the newest non-updated color data held in the second through fourth latch units 203 through 205 are respectively referred to as pre-data [0], pre-data [1] and pre-data [2]. The pixel data output from the pixel data rearrangement unit 201 is referred to as objective data. The post-data, the pre-data [0 through 2] and the objective data are NTSC-RGB data each having R, G and B data.

In this embodiment, the objective compression rate is 1/10, and fixed value C given to a single block is (64×24)/10=153 bits. Fixed value C' employed for a block in which pixel types A and B are present in a mixed state is "100". This is because such a block is compressed by both CG and ADCT compression methods and the memory area for the ADCT compressed data must therefore be taken into consideration.

The quantity of compressed data set from experience for a block (flat block) in which all the 64 pixels have the same value and which is hence ADCT compressed is R.

First, saving S is reset to 128 in step S401. The initial value of saving S is not "0" because of an insurance against appearance of a plurality of new colors in a first block. That is, in the CG compression method of this embodiment, 64 bits per block are required as the data representing the color changing point (in steps S506 and S601 which will be described later), 2 bits are necessary as the latch data (in steps S606, S608, S610 and S612 which will be described later) at the color changing point, and 24 bits are required in order to output color data without change when a new color which has not been latched appears (in step S613 which will be described later). Consequently, when C for a single block=153, (C-64)/24, the number of new colors which appear in that block is limited to three colors. Therefore, saving of the memory area is required at the initial stage of the process.

In step S402, the four latch units of the CG compression unit 8 are reset. In this embodiment, it is assumed that a normal image has most probably black on a white background, and the post data={255, 255, 255}, and the pre-data [0]={0, 0, 0}. It is also assumed that the normal image has second most probably red and blue, and the pre-data [1]={255, 0, 0}, and the pre-data [2]={0, 0, 255}. In addition, in order to rewrite the latch which stores the oldest color data when the color of the objective data does not coincide with the color data in any latch, color data rewriting data, turn, turn_p and turn_pp are reset to 0, 1 and 2, respectively.

In step S403, the four latched values (the post-data and the pre-data [0 through 2]) of the CG compression unit 8 and the color data rewriting data (turn, turn_p, and turn_pp) are backed up.

In step S404, the data of 64 bits in the bit map memory are referred to. When all the 64 bits have 1 (i.e., when all the pixels are natural image pixels), the process goes to step S405. When all the pixels have 0 (i.e., when all the pixels are pixels other than the natural image pixels), the process goes to step S415. When the pixels have 0 and 1, the process advances to step S407.

In step S405, signal having "1", signifying area 2, is output to the block map memory to indicate that the present block is a natural image area. Subsequently, in step S406, the data of the single block held in the block delay unit 2 is interpolated by the pixel interpolation unit 3, and the compressed data on which ADCT compression is performed is output. Thereafter, the process proceeds to step S426.

In step S426, it is determined whether all the processes have been completed. If all the processes have not been completed, the process returns to step S403 to repeat the above-described steps. If all the processes have been completed, the compression process is completed.

In step S407, CG compression is performed on the data obtained by substituting for data 1*a* of the single block held in the raster block conversion unit 1 by referring to pixel type signal 1*b*, the obtained compressed data is stored in the compression data holding unit 9, and the quantity D of compressed data obtained at that time is calculated. In step S408, it is determined whether the quantity D of compressed data is equal to or less than the limited value L (=saving S+fixed value C' for a mixture block). If (C'+S)>=D, it is determined that that block is area 1, and the process goes to step S409. If (C'+S)<D, it is determined that that block is area 2, and the process advances to step S413.

In step S409, a signal having "0" signifying area 1 is output to the block map memory. Subsequently, in step S410, the compressed data is output from the compressed data holding unit 9. In step S411, (C'–D) is added to saving S. Thereafter, the process goes to step S406.

In step S413, a signal having "1" signifying area 2 is output to the block map memory to indicate that the present block is a natural image area, as in the case of step S405. In step S414, the data of the single block held in the block delaying unit 2 is interpolated by the pixel data interpolation unit 3, and the compression data on which ADCT compression is performed is output. Next, in step S425, the back up data are loaded in the four latches (the post-data, the pre-data [0], the pre-data [1], the pre-data [2] of the CG compression unit 4 and the latch rewriting data (turn, turn_p, turn_pp). In other words, the data which have been rewritten when the quantity D of compressed data of that block has been calculated are returned to the original values.

If the process goes to step S404 to step S415, CG compression is performed on the data obtained by substituting for data 1*a* of the single block held in the raster block conversion unit 1 by referring to the pixel type signal 1*b*, the compressed data is stored in the compressed data holding unit 9, and the quantity D of compressed data obtained at that time is calculated. Next, in step S416, the quantity D of compressed data is compared with 64. If they coincide with each other, it is determined that that block is a flat image and the process goes to step S423 because such an image is more effectively compressed by ADCT. If the quantity D of compressed data is not coincident with 64, the process goes to step S417.

In step S417, it is determined whether the quantity D of compressed data is equal to or less than the limited value L (=saving S+fixed value C). If (C+S)≧D, it is determined that the block is area 1, and the process goes to step S418. If (C'+S)<D, it is determined that that block is area 2, and the process goes to step S413.

In step S418, a signal having "0" signifying area 1 is output to the block map memory. Thereafter, in step S419, the compressed data is output from the compression data holding unit 9. Subsequently, in step S420, (C–D) is added to saving S, and the process goes to step S426.

If the process goes from step S415 to step S423, a signal having "0" signifying area 1 is output to the block map memory. Next, in step S424, (C–R) is added to saving S, and then the process goes to step S414.

The CG compression process executed in steps S407 and S415 will be described below in detail with reference to the flowcharts of FIGS. 9 and 10.

In the CG compression unit 8, the counter 2 for counting the number of color changing points and the counter 3 for counting the number of times the objective data is not present in any of four latches are reset to "0" first in step S501. Next, in step S502, a counter i for counting the number of pixels, which is 64, in a block is reset to "0".

Next, in step S503, it is determined whether the type of the pixel located at a position indicated by the counter i (hereinafter referred to as "an objective pixel") in the pixel type data 1*b* is "0" (i.e., a computer graphic pixel). If the pixel type is "0", the process goes to step S540. If the pixel type is "1" (i.e., a natural image pixel), the process goes to step S507.

In step S504, it is determined whether the pixel located at a position corresponding to the objective pixel in the raster block conversion unit 1 coincides with color data (A)={127, 127, 127} indicating the natural image pixel. If they coincide with each other, color data (B)={128, 128, 128} is substituted for the objective pixel data indicating the present color data in step S505. If they do not coincide with each other, the pixel value at the objective pixel position in the raster block conversion unit 1 is substituted for the objective pixel data in step S506, and then the process goes to step S508.

In step S507, it is determined that the objective pixel is a natural image pixel, and color data (A)={127, 127, 127} is set as the present pixel, and then the process goes to step S508.

In step S508, it is determined whether the present color data coincides with the previous color data. If the color data coincide, the process goes to step S509. If the color data do not coincide, the process goes to step S601. In step S509, "0" is output to the buffer 212 to indicate that there is no change in color, and then the process goes to step S510.

In step S510, the objective pixel data is set as the post-data. In step S511, the counter i is incremented to set a subsequent pixel as the objective pixel. Thereafter, in step S512, it is determined whether i≦64, i.e., if there is a non-processed pixel. If there is a non-processed pixel, the process returns to step S503. If i>64, i.e., if compression has been conducted on all the pixels, the process goes to step S513. In step S513, the quantity D of compressed data for the present block is calculated, thereby completing this sub routine. The quantity D of compressed data is given by:

$$D=64+(2\times[counter\ 2])+(24\times[counter\ 3])$$

Figure 10:
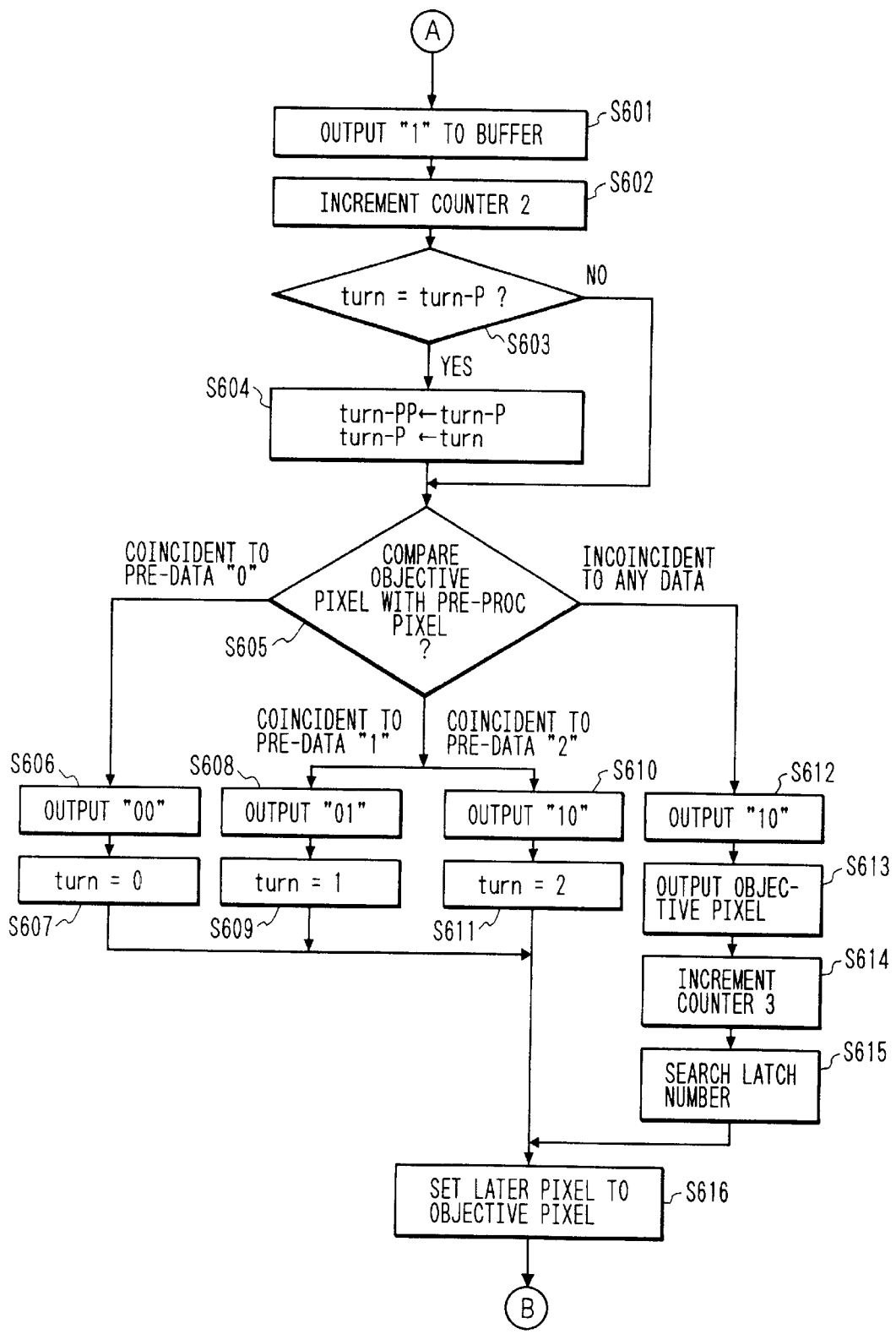
FIG. 10 is a flow chart showing the detail of the CG compression operation performed in Steps S407 and S415 in the flow shown in FIGS. 8A and 8B.

If it is determined in step S508 that the objective pixel data does not coincide with the post-data, i.e., if it is determined that there is a color changing point, the process goes to step S601 shown in FIG. 10. In step S601, "1" is output to the buffer 212 to indicate there is a change in the color. Thereafter, in step S602, the counter 2 is incremented. Next, in step S603, it is determined whether the most newly rewritten latch number, turn, coincides with the second newly rewritten latch number turn_p. If they coincide, the process goes to step S605. If they do not coincide, the process goes to step S604.

In step S604, turn_p is assigned to turn_pp, and turn is assigned to turn_p in order to avoid the case where turn and turn_p have the same value. Subsequently, in step S605, the present objective data is compared with the data in the second through fourth latch units (the pre-data [0], the pre-data [1], the pre-data [2]).

If (objective pixel data)=(the pre-data [0]), the process goes to step S606. If (objective pixel data)=(the pre-data [1]), the process goes to step S608. If (objective pixel data)=(the pre-data [2]), the process goes to step S610. In none of the cases, the process goes to step S612.

In step S606, "00" is output to the buffer 212 because the objective pixel data coincides with the data in the second latch unit. In step S607, the second latch number 0 is set to 'turn' as the rewritten latch number. Thereafter, the process proceeds to step S616.

In step S608, "01" is output to the buffer 212 because the objective pixel data coincides with the data in the third latch unit. In step S609, the third latch number 1 is set to 'turn' as the rewritten latch number. Thereafter, the process goes to step S616.

In step S610, "10" is output to the buffer 212 because the objective pixel data coincides with the data in the fourth latch unit. In step S611, the fourth latch number 2 is set to 'turn' as the rewritten latch number. Thereafter, the process goes to step S616.

In step S612, "11" is output to the buffer 212 because the objective pixel data does not coincide with the data in any latch. In step S613, the present objective pixel data is output, and then the counter 3 for counting the number of times the objective pixel data does not coincide with the data in any of the first through fourth latches is incremented in step S614. Next, in step S615, a latch number j (in this embodiment, either of the latch numbers, 0, 1 and 2) which differs from both turn_p and turn_pp is retrieved in order to avoid the case where the same number is present in turn_p and turn_p in steps S603 and S604. j is set to turn.

Figure 9:
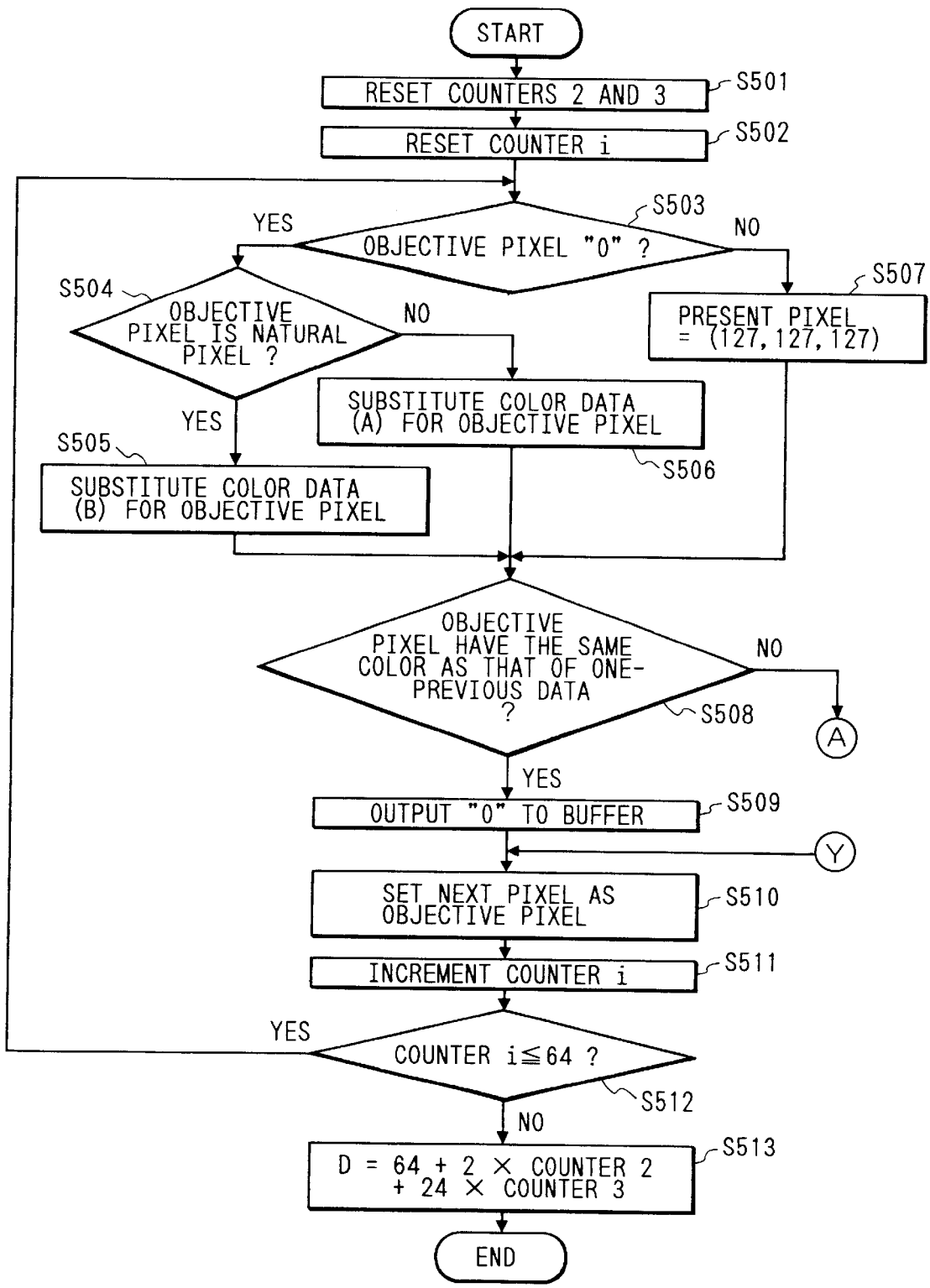
FIG. 9 is a flow chart showing the detail of the CG compression operation performed in Steps S407 and S415 in the flow shown in FIGS. 8A and 8B.

In step S616, the post-data is set to the pre-data [turn], and then the process goes to step S506 shown in FIG. 9.

Figure 11:
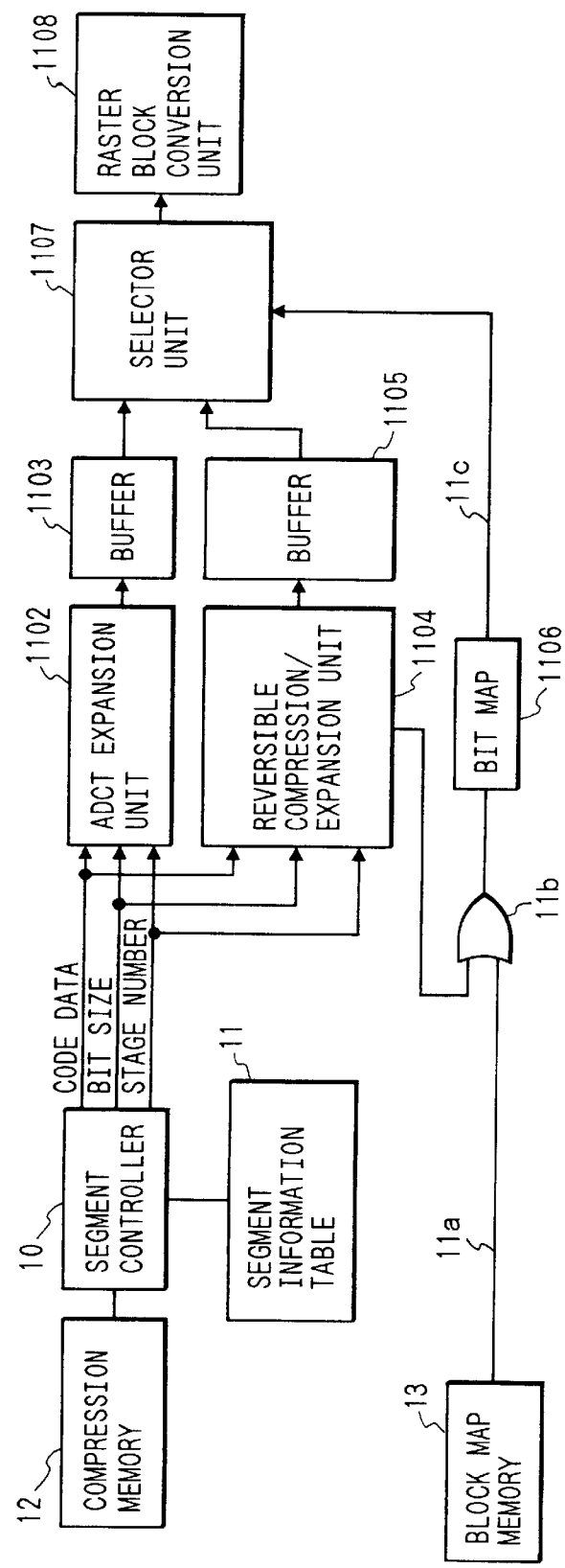
FIG. 11 is an illustration of the construction of a compressed data expansion apparatus embodying the present invention.

FIG. 11 is a block diagram of the apparatus for expanding the compressed data compressed by the above-described process.

In FIG. 11, the segment controller 10 distributes the compressed data stored in the compression memory 12 to either an ADCT expansion unit 1102 or to a CG compression/expansion unit 1104 by referring to the segment information table 11. The ADCT expansion unit 1102 expands the ADCT compressed data. A buffer 1102 temporarily stores the image data which has been expanded by the ADCT expansion unit 1102.

The CG compression/expansion unit 1104 temporarily stores the CG compressed image data. A buffer 1105 temporarily stores the image data which has been expanded by the CG compression/expansion unit 1104. A bit map memory 1106 stores the data obtained by ORing 1-bit data 11*a* from the block map memory 13 with pixel type data 11*b* analyzed by the CG compression/expansion unit 1104.

A selector unit 1107 selectively outputs either the output of the buffer 1103 or the output of the buffer 1105 under the control of the bit map memory 1106. A block raster conversion unit 1108 stores the image data selected by the selector unit 1107 to create a synthesized image.

Figure 12:
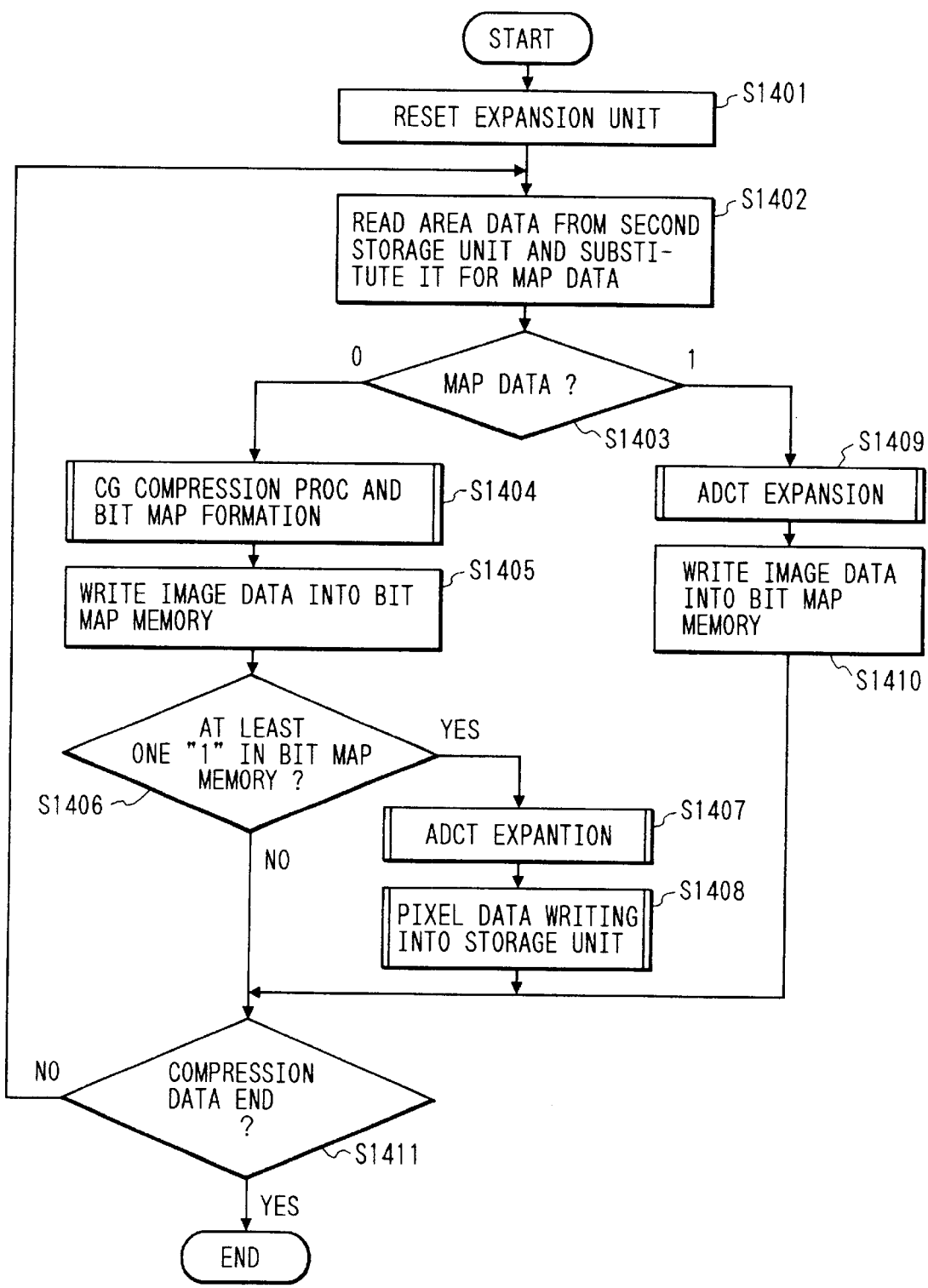
FIG. 12 is a flow chart showing the data expansion operation performed in the embodiment shown in FIG. 11.

The expansion process executed in this embodiment will now be described with reference to FIG. 12.

In step S1401, each of the post-data and the pre-data [0, 1, 2] (the first through fourth latch units) is reset to the same value as that set during compression. Concurrently with this, color data rewriting latch number is reset to the same value as that set during compression, and "0" is set to a bit map [−1] as the bit map information of the final pixel of the previously processed block.

In step S1402, the area data of the present block is read out from the block map memory 13, and the read area data is substituted for the map data. In step S1403, it is determined whether the map data has "0" (indicating area 1) or "1" (indicating area 2). If the map data indicates area 1, the process goes to step S1404. If the map data indicates area 2, the process goes to step S1409.

In step S1404, expansion of the CG compression method is performed on the CG compressed data received from the compression memory 12 under the control of the segment controller 10, and the expanded image data is output. In addition, the pixel type data 11b is analyzed, and the result of the analysis is written in the bit map memory 1106 in step S1405. Next, in step S1406, it is determined whether there is at least one "1" in the bit map memory. If there is at least one "1". the process goes to step S1407. If there is no "1", the process goes to step S1411.

In step S1407, since the present block is made up of CG compression of the substituted pixel data and ADCT compression of the interpolated pixel data, ADCT expansion is performed on the ADCT compressed data received from the compression memory 12 under the control of the segment controller 10. In step S1408, in the thus-obtained pixel data expanded by the CG compression method (CG expanded data) and the pixel data expanded by ADCT (ADCT expanded data), the ADCT expanded data is written in the block raster conversion unit for the pixels whose bit map memory has "1", and the CG expanded data is written in the block raster conversion unit for the pixels whose bit map memory has "0". Thereafter, the process goes to step S1411.

In step S1409, the ADCT compressed data is received from the compression memory 12 under the control of the segment controller 10. Thereafter, in step S1410, ADCT expansion is performed on the received data and the obtained image data is written in the block raster conversion unit. Subsequently, the process goes to step S1411.

In step S1411, it is determined whether all the compressed data has been processed. If there is non-processed compression data, the process returns to step S1402. If all the compressed data has been processed, the process is completed.

Figure 13:
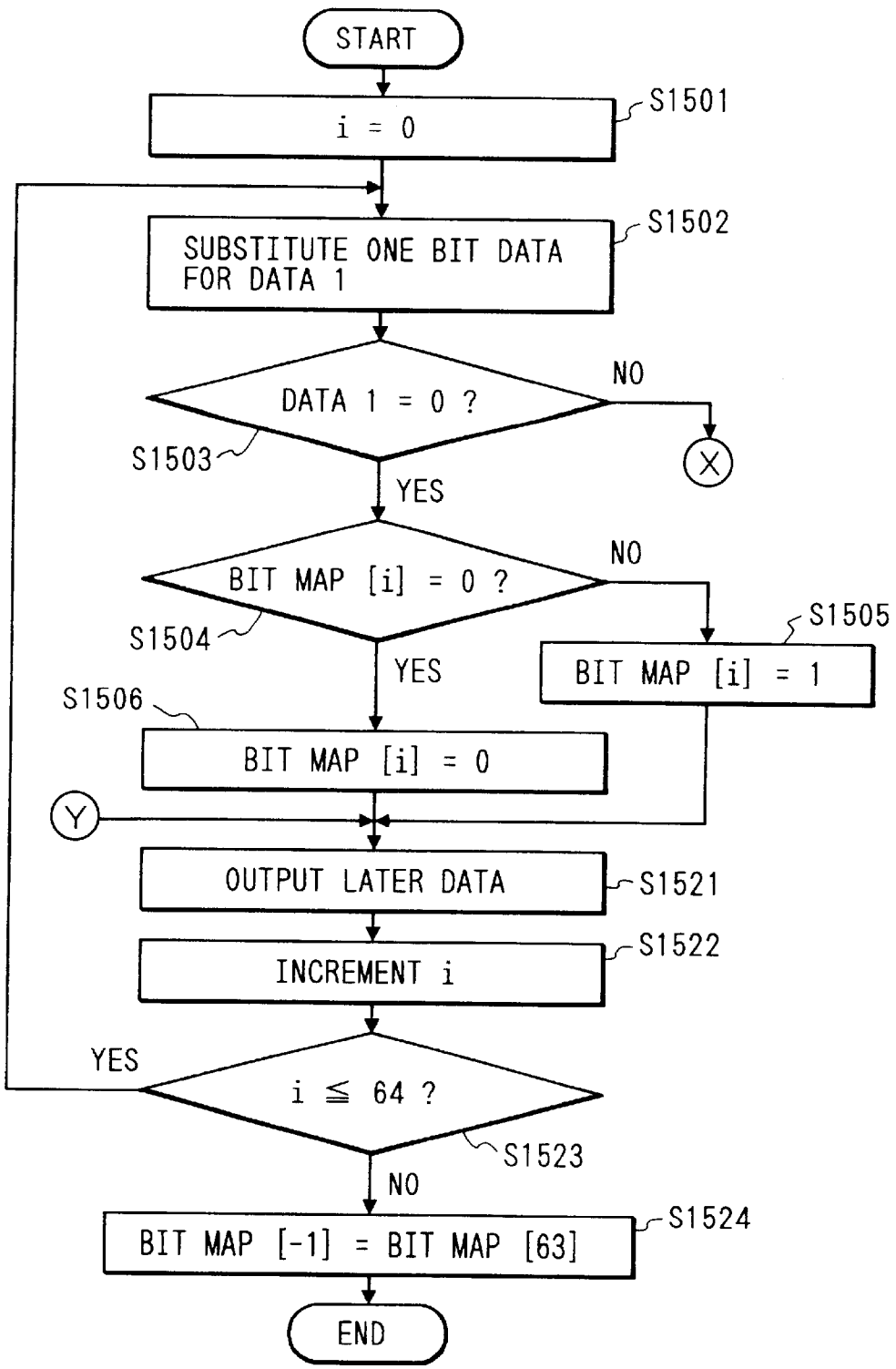
FIG. 13 is a flow chart showing the detail of the process performed in Step S1404 of the flow shown in FIG. 12.

The process executed by the CG compression/expansion unit 1104 in step S1404 will now be described with reference to FIGS. 13 and 14.

First, the counter i for counting the number of pixels is reset to "0" in step S1501. In step S1502, 1-bit data is received from the compression memory 12 and the received data is substituted for data 1. Thereafter, in step S1503, it is determined whether data 1 has "0". If data 1 has "0", the process goes to step S1504. If data 1 has "1", the process goes to step S1507 shown in FIG. 14.

In step S1504, it is determined whether a bit map [i−1], which is the bit map data on the previous pixel (i−1), is "0". If bit map [i−1] has "1", the process goes to step S1505. In step S1505, "1" is substituted for a bit map [i], which is the bit map data on the pixel which is being processed, and then the process goes to step S1521. If bit map [i−1] has "0", "0" is substituted for bit map [i] in step S1506. Thereafter, the process goes to step S1521.

In other words, bit map [i−1], which is the bit map data on the previous pixel (i−1), is substituted for bit map [i], which is the bit map data on the pixel which is being processed, by series of the aforementioned processes.

Figure 14:
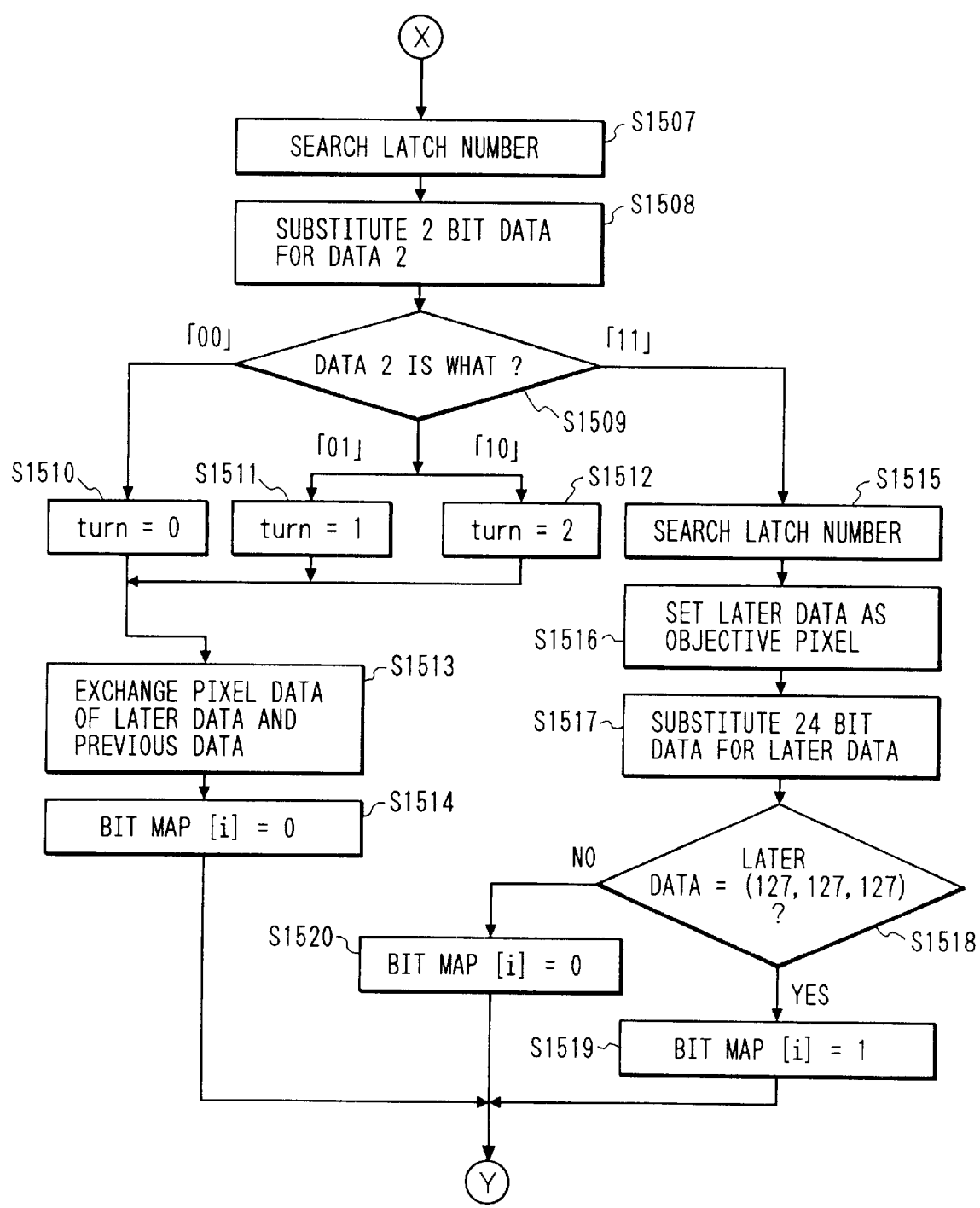
FIG. 14 is a flow chart showing the detail of the process performed in Step S1404 of the flow shown in FIG. 12.

In step S1507 shown in FIG. 14, it is determined whether the most newly rewritten latch number, turn, is the same as the previously rewritten latch number, turn_p. If they coincide, the process goes to step S1508. If they do not coincide, turn_p is substituted for turn_pp, and turn is substituted for turn_p. This process is conducted in order to avoid the case where turn and turn_p have the same value. This is executed also during compression. Thereafter, the process goes to step S1508.

In step S1508, 2-bit data is received from the compression memory 12, and data 2 is substituted for the received data. In step S1509, data 2 is analyzed, and when data 2 has "00", the process goes to step S1510. If data 2 has "01", the process goes to step S1511. If data 2 has "10", the process goes to step S1512. If data 2 has "11", the process goes to step S1515.

In step S1510, the number 0 of the pre-data [0] is substituted for the rewriting latch number, turn, so that the pixel stored in the second latch unit 203 can be output. Thereafter, the process goes to step S1513.

In step S1511, the number 1 of the pre-data [1] is substitued for the rewriting latch number, turn, so that the pixel stored in the third latch unit 204 can be output. Thereafter, the process goes to step S1513.

In step S1512, the number 2 of the pre-data [2] is substituted for the rewriting latch number, turn, so that the pixel stored in the fourth latch unit 205 can be output. Thereafter, the process goes to step S1513.

In step S1513, the pixel data is exchanged between the later data (stored in the first latch unit 202) with the previous data [turn]. Thereafter, in step S1514, 0 is set to bit map [i], and then the process goes to step S1521 shown in FIG. 13.

If none of the later data and the previous data [0, 1, 2] is to be output, a latch number j, which is different from those for turn_p and turn_pp, is retrieved in step S1515, and j is set to turn so that turn_p and turn_pp do not have the same number in the process in step S1506. Latch numbers 0, 1 and 2 are relevant to this process.

Thereafter, in step S1516, the later data is set to the previous data [turn]. In step S1517, 24-bit pixel data is received from the compression memory 12 and the received pixel data is substituted for the later data. In step S1518, it is determined whether the later data for which the pixel data received from the compression memory has been substituted has value (A)={127, 127, 127}. If the value (A)={127, 127, 127}, [1] is set to bit map [i] in step S1519, and then the process goes to step S1521. For other occasions, [0] is set to bit map [i] in step S1520, and then the process goes to step S1521.

In step S1521, the later data is output because the pixel data stored in the later data is output in any of the above-described processes (steps S1102 through step S1113). In step S1522, i is incremented. In step S1523, it is determined whether all the 64 pixels have been processed. If the process has not been completed, the process returns to step S1502. If the process has been completed, bit map [63] is set to bit map [−1] in step S1524 to prepare for a subsequent block.

The ADCT 4, the ADCT expansion unit 1102, the segment controller 10, the segment information table 11 and the compression memory 12 will now be described in detail.

Figure 15:
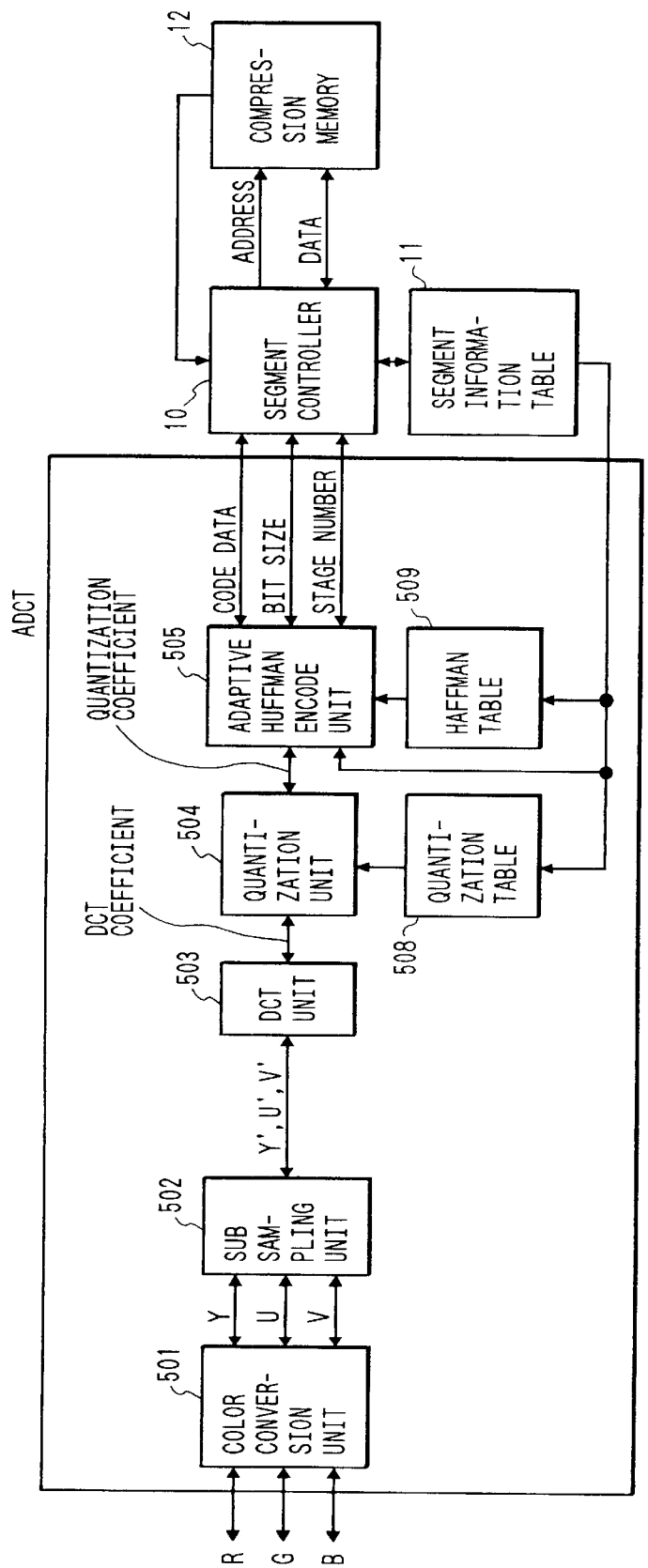
FIG. 15 is an illustration showing the detail of the construction of ADCT in the embodiment shown in FIG. 11.

FIG. 15 illustrates the structure of the ADCT 4.

Compression of image data will be described with reference to FIG. 15.

A color conversion unit 501 converts the RGB input image data into Y, U. V components by 3×3 linear matrix transformation expressed by equation (1):

$$\begin{vmatrix} Y \\ U \\ V \end{vmatrix} = \begin{vmatrix} a11 & a12 & a13 \\ a12 & a22 & a23 \\ a31 & a32 & a33 \end{vmatrix} \begin{vmatrix} R \\ G \\ B \end{vmatrix} \quad (1)$$

where Y is the luminance component, and U and V are the chromaticity components. A sub-sampling unit 502 performs sub-sampling by utilizing the characteristics of the human eyes in that the human eyes are more sensitive to the luminance component (Y) than to the chromaticity components (U, V), and thereby performs conversion of either Y:U:V=4:4:4 (no sub sampling is performed), Y:U:V=4 2:2 or Y:U:V=4:1:1. The data is output in blocks each having a size of 8×8. In the case of Y:U:V=4:4:4, the data is output in the order of Y1, U1, V1, Y2, U2, V2, . . . In the case of Y:U:V=4:2:2, the data is output in the order of Y1, Y2, U1, V1, Y3, Y4, U2, V2, . . . In the case of Y:U:V=4:1:1, the data is output in the order of Y1, Y2, Y3, U2, V1, Y5, Y6, Y7, Y8, U2, V2, . . . A DCT 503 performs DCT (discrete cosine transform) on the data in blocks each having a size of 8×8 to obtain DCT coefficients.

A quantization unit 504 performs quantization on the DCT coefficients in blocks each having a size of 8×8 using a quantization table to obtain quantization coefficients. The obtained two-dimensional quantization coefficients of 8×8 are rearranged by zigzag scanning shown in FIG. 36 so that they have a one-dimensional configuration in which they are aligned from the low-frequency components to the high-frequency components. The obtained one-dimensional quantization coefficients are sent to an adaptive Huffman encode unit 505. The adaptive Huffman encode unit 505 performs conversion on 64 one-dimensional data by the method shown in FIG. 16 to obtain code data, bit size data and stage number. In this embodiment, the number of stages is 4.

The segment controller 10 writes the code data, the bit size and stage number in the compression memory 12 divided into segments for every stage. The segment data is written in the segment information table 11 so that they can be used for expansion. Fixed length compression is achieved by controlling the segments in which data are stored in stages by means of the segment controller 10.

In brief, a desired amount of data can be obtained by selecting the stages to be employed, like only the first and second stages, the first, second and third stages or all the compressed data in the first, second, third and fourth stages, according to the capacity of the compression memory 12 or the total amount of compressed data of an objective image.

Assuming that the first stage stores 2.5 MB, that the second stage stores 1.5 MB, that the third stage stores 0.8 MB, that the fourth stage stores 0.5 MB, and that the desired amount of data is 5.0 MB, where the first, second and third stages are employed, the total amount of compressed data is 4.8 MB, which is less than the desired amount of data. Therefore, the method of dividing all the code data into stages affects the fixed length compression accuracy. The segment controller 10, the compression memory 12 and the segment information table 11 will be described in detail later.

The adaptive Huffman code unit shown in FIG. 16 will be described in detail. Assuming that the desired bit rate of the entire image (bit rate is the unit of compression rate, and the number of bits per pixel [bits/pixel]) is 2.4 [bits/pixel], the Huffman code unit outputs the code data, bit size and stage number such that 1.5 [bits/pixel] is assigned to the first stage as the desired number of bits and such that the remaining number of bits are equally assigned to the second, third and fourth stages.

Figure 16:
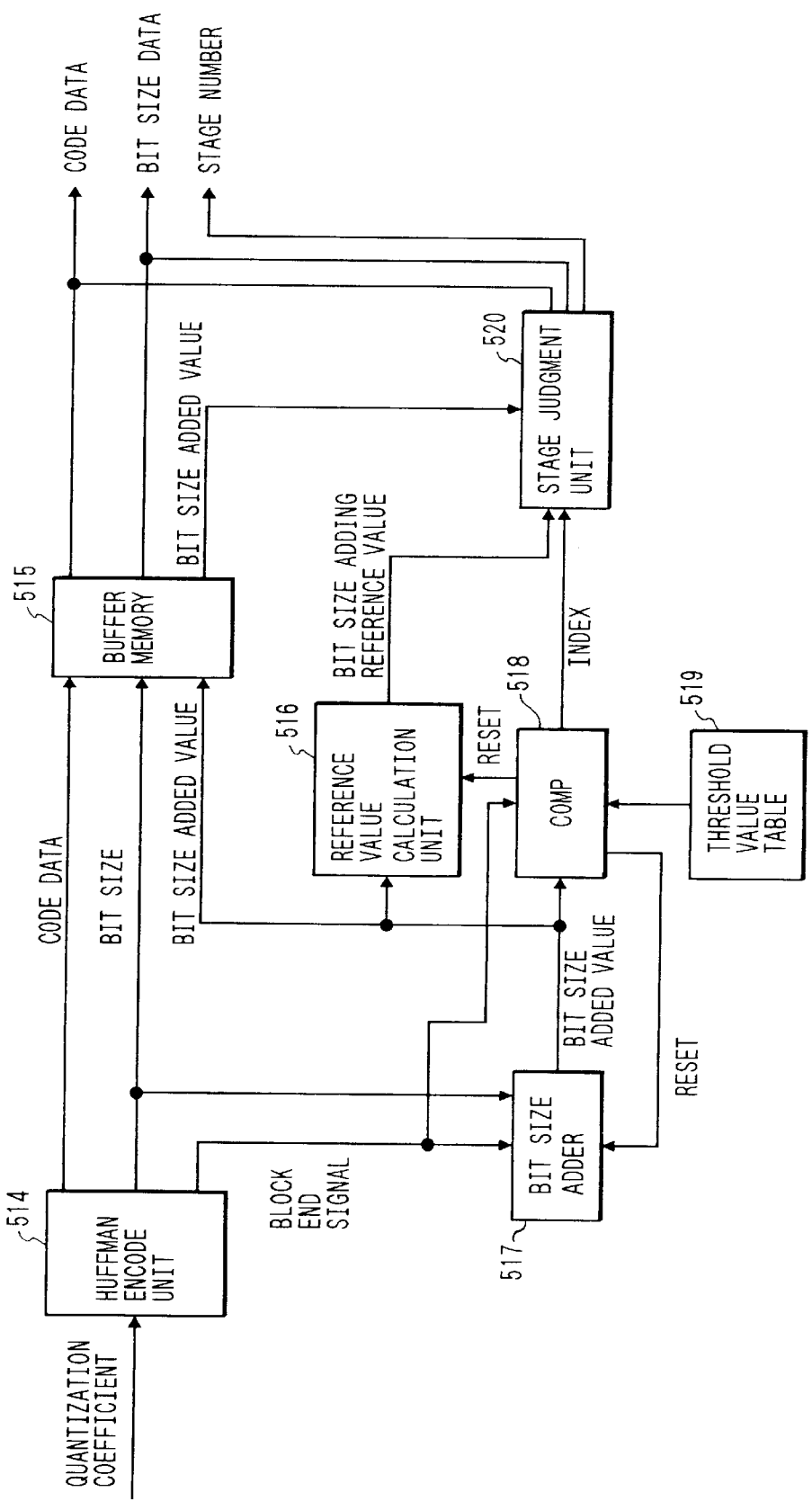
FIG. 16 is an illustration showing the detail of the construction of an adaptive Huffman encode unit.

In FIG. 16, a Huffman code unit 514 performs Huffman coding on the one-dimensionally arranged quantization coefficients for every pixel of 64 pixels (for each of Y, U and V components of a block of 8×8), and outputs coded data, bit size and a block end signal indicating the end of a block.

Figure 17:
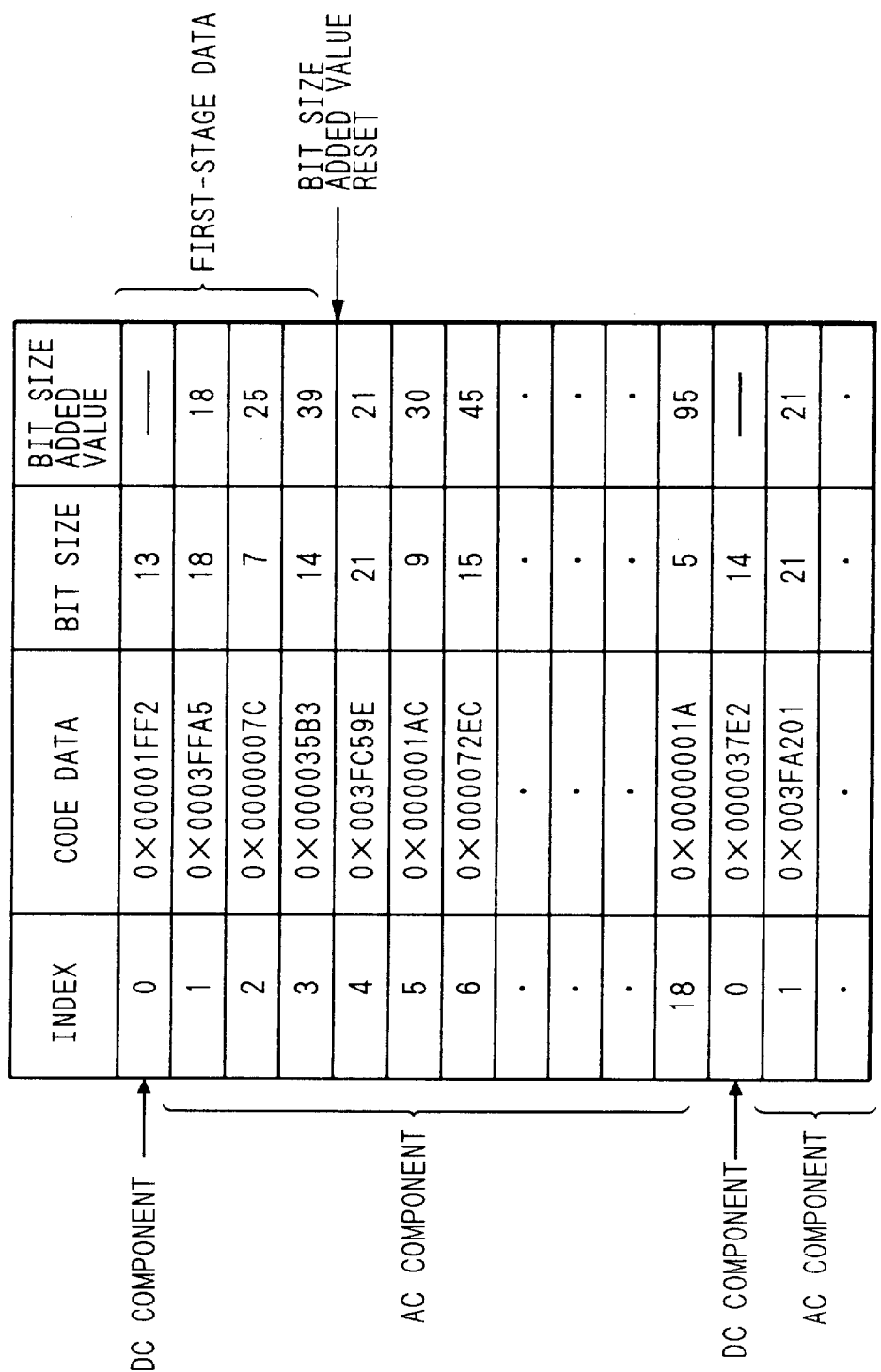
FIG. 17 is an illustration of an example of data storage in a buffer memory of the adaptive Huffman encode unit.

A buffer memory 515 stores the data output from the Huffman code unit 514 in the manner shown in FIG. 17. In FIG. 17, index indicates a code data number which is output in a single block. The effective bit number in the code data is designated by the bit size. A bit size added value is obtained by a bit size adder 517.

The bit size adder 517 adds the bit sizes of the AC components for every block by the block end signal, and outputs the added value to a comparator unit 518. The comparator unit 518 compares the added value with a threshold value table 519 prepared for each of Y, U, and V, such as that shown in FIG. 18, and outputs the index obtained immediately before the added value exceeds the threshold value when the added value exceeds the threshold value. In addition, the comparator unit 518 resets the bit size adder 517 so that it can start addition again starting with the value at which the added value has exceeded the threshold value.

When the end of a block is detected by the block end signal, the final bit size added value is sent to a reference value calculation unit 516. The reference value calculation unit 516 calculates a plurality of bit size addition reference values from that final bit size added value.

The above-described operation will be described concretely with reference to FIG. 17 and FIG. 18 which shows a table of threshold values.

In FIG. 18, since the desired bit rate for the first stage is 1.5 [bits/pixel], the numbers of bits for Y, U and V are set to 40, 25 and 25 [bits], respectively. FIG. 17 shows the code data, the bit size and the bit size added value for Y component of a 8×8 block. The bit size added value of index 0 is not used for addition because index 0 is a DC component. The bit size addition starts from the value 18 of index 1, the first value of the AC components. At index 2 whose bit size is 7, the bit size added value is 18+7=25. Similarly, the bit size added value for index 3 is 39.

The bit size of index 4 is 21, and thus the bit size added value for index 4 may have been 60. However, since 60 exceeds the value 40 [bits] listed in the threshold value table 19 for Y component when they are compared by the comparator unit 518, index 3 immediately before index 4 is sent to a stage judgment unit 520. At the same time, the bit size adder unit 517 is reset, and the bit size 21 of index 4 is thus written as the bit size added value. At index 5 whose bit size is 9, the bit size added value increases to 21+9=30.

Similarly, the bit size added value increases until that block is completed. The final bit size added value 95 is transferred to the reference value calculation unit 516. The reference value calculation unit 516 divides 95 by 3 which is the number of remaining stages, and sends 30 and 60, which is two times of 30, to the stage judgment unit 520 as the bit size addition reference values.

The stage judgment unit 520 determines the stage into which each code data and bit size is sorted on the basis of the index received by the comparator unit 518 and the bit size addition reference values received from the reference 5. value calculation unit 516. As described above, the received data are index 3 and the bit size reference values, 30 and 60. At that time, the stage judgment unit 520 counts the bit size added values input from the buffer memory 515, and outputs stage number 1 for the data of up to index 3.

For subsequent data, the stage judgment unit 520 compares the bit size added value with the bit size addition reference value 30, and outputs stage number 2 if the bit size added value is between 0 and 30. The stage judgment unit 520 outputs stage number 3 when the bit size added value is between 30 and 60, and outputs stage number 4 for subsequent bit size added values. At the end of each of the stages, EOS (end of stage) code, indicating the end of that stage, is inserted.

Thus, about 1.5 [bits/pixel] in the quantity of coded data, which differs for every 8×8 block, can be allotted to the first stage, while the remaining data can be equally divided into 3 portions.

In the above-described example, the bit size added value of 8×8 block has exceeded 40. However, when the bit size added value does not exceed 40, EOB (end of block) code is inserted, which means that all the code data for that 8×8 block are written in the segment of the first stage.

Next, expansion of the compressed data obtained by the above-described compression process will be described. In that case, the DCT unit 503 is replaced by an inverse DCT unit 503, the quantization unit 504 is replaced by an inverse quantization unit 504, and the adaptive Huffman code unit 505 is replaced by an adaptive Huffman decode unit 505. The quantization table 508 and the Huffman table 509 are respectively replaced by an inverse quantization table and a Huffman decode table. The flow of data is the reverse of that for compression.

Since the code data, which constitutes a single block of 8×8, are stored in the compression memory 12 in such a manner that they are divided into a plurality of stages, the adaptive Huffman decode unit 505 inputs the code data from the plurality of stages, and decodes them to re-construct the single block of 8×8. Hence, the adaptive Huffman decode unit 505 requests the segment controller 10 for the code data of the stage number 1.

The segment controller 10 reads out the code data of the first stage from the compression memory 12 by referring to the segment information table 11, and transfers them to the adaptive Huffman decode unit 505. The adaptive Huffman decode unit 505 sequentially decodes the obtained code data, and transfers the results to the inverse quantization unit 504. This is continued until EOS (end of stage) is detected. When EOS has been detected, the adaptive Huffman decode unit 505 requests the code data of the subsequent stage number 2.

Similarly, the segment controller 10 reads out the code data of the second stage from the compression memory 12 by referring to the segment information table 11, and transfers them to the adaptive Huffman decode unit 505.

The adaptive Huffman decode unit 505 continues decoding similarly until EOS code is detected.

Similarly, decoding of the third and fourth stages is performed to complete decoding of a single block of 8×8. In that case, if EOB (end of block) is detected, the code data of a subsequent stage is not requested, and decoding of a subsequent block of 8×8 is initiated. When the compressed memory of up to the final stage has not been stored in the compression memory due to the quantity of compressed data of an image or the capacity of the compression memory, expansion is conducted on the data stored in the compression memory.

The thus-obtained quantization coefficients are inverse quantized by the inverse quantization unit 504 using the inverse quantization table 508. The inverse quantized coefficients are sent to the inverse DCT unit 503. The inverse DCT unit 503 performs inverse DCT on the DCT coefficients to obtain Y' U' V' data. The sub sampling unit 502 performs expansion according to the sub sampling ratio (Y:U:V=4:4:4, 4:2:2 or 4:1:1). The color conversion unit 501 performs inverse conversion according to equation (2) to restore an original image:

$$\begin{vmatrix} R \\ G \\ B \end{vmatrix} = \begin{vmatrix} a11' & a12' & a13' \\ a21' & a22' & a23' \\ a31' & a32' & a33' \end{vmatrix} \begin{vmatrix} Y \\ U \\ V \end{vmatrix} \quad (2)$$

The compression data divided into a plurality of stages in the compression/expansion process of image data, the storage of the compressed data obtained by the reversible compression unit 8 into the compression memory constituted by a plurality of segments, and storage of the selected segment data into the segment information table 11 will now be described in detail. It is, however, noted that the compression data by the reversible compression unit 8 is the single portion of the plurality of compressed data portions divided into a plurality of stages.

The compression memory 12 is divided into segments S-1 through S-N (for example, a single segment=100 kB), as shown in FIG. 19.

The segment information table 11 has a structure shown in, for example, FIG. 20. The first through fourth lines of the segment information table 11 store the data on the stages 1 through 4, respectively. Each of the rows stores the selected segment numbers (S-1 through S-N) of the compression memory 12 in which the code data of the respective stages are written. The image proceeds from the left to the right in the table. END indicates that the code data in each stage ends.

The procedures of writing the code data in the compression memory 12 for each stage will be described below.

FIG. 21 is a flowchart showing the storage process of the compressed data in the compression process.

In the compressed data divided into a plurality of stages, the amount of code in each stage differs, although it depends on the compression method with which the compressed data has been divided into a plurality of stages or the characteristics of the original image data. In this example, the amount of code in stage 1 is larger than that in stage 4.

As shown in the second row (the column of No. 2) of the table shown in FIG. 20, the code data output in respective stages are written in segments S-1, S-2, S-3 and S-4, respectively. Since the code data of stage 1 fills segment 6 4 S-1 faster than the code data of the other stages fill the corresponding segments, writing of the code data of stage 1 in segment S-5 is started. Next, writing of the code data of the stages 2 and 3 in segments S-2 and S-3 is completed, and writing in segments S-6 and S-7 is initiated (step S1).

Subsequently, writing of the code data of stage 1 in segment S-5 is completed before writing of the code data of stage 4 in segment S-4 is completed, and segment S-8 is thus allocated not for stage 4 but for stage 1. This is because the amount of code generated in stage 1 is larger than that in stage 4. Thereafter, when the segment is filled with the code data of a stage, a blank segment is selected and the code data is similarly written in the selected segment (steps S2, S3 and S4).

In this embodiment, the original image is divided into a plurality of stages for coding. Hence, the amount of code data of respective stages is smaller than the capacity of the compression memory, no invalid stage is generated. However, when the amount of code data has reached the capacity of the compression memory during compression, the designed stage is made invalid (stage 4 in the case shown in FIG. 20), and the code data of stages 1, 2 and 3 are written in segments S-4, S-11, S-15, . . . which have been allocated to stage 4. This is illustrated in the 8th through 11th rows (No. 8 through No. 1) in the table shown in FIG. 20. Allocation of segment S-N to the code data of stage 2 in the 8th row means that all the capacity of the compression memory 12 has been used up. In order to compensate for the shortage of the compression memory 12, stage 4 is made invalid ("0"), and segment S-4 which has been used for stage 4 is used for stage 1 while segment S-11 is used for stage 2. Since writing of the code data of stage 2 is completed when writing of the code data of stage 2 in segment S-11 is completed, END is written in subsequent rows, as shown in FIG. 20. As shown in the 10th row, segment S-15 which has been used for stage 4 is allocated to stage 1. Since writing of the code data of stage 1 is completed when writing of stage 1 in segment S-15 is completed, END is written in a subsequent row (step S5).

Regarding expansion of the compressed data stored in the compression memory 12, only the data of the valid stages 1 through 3 are used for decoding image data.

In the above-described compression/expansion process, compression can be performed in the CG compression unit without data being lost. When the amount of CG data exceeds the memory amount L=(C+S) given to that block, ADCT compression is performed. In this way, the final memory amount can be maintained to less than a fixed value, and the image quality can be maintained.

On a mixture block which conventionally causes problems involving the image quality and compression rate, both ADCT and CG compressions are performed. In the ADCT compression process, the image quality is maintained by inputting the interpolated data. In the CG compression process, the compression rate is maintained by inputting the substituted data. Further, since the pixel type data for each pixel in the mixture block can be buried in the compressed data obtained in CG compression, another bit map memory is not required.

<Second Embodiment>

In a second embodiment of the present invention, the signals 2a, 2b and 2c mentioned in the description of the first embodiment are stored at different addresses, by the operation of the segment controller 10.

<Third Embodiment>

In the first embodiment of the present invention as described, the compression data (signals 2a, 2b) of the CG compression processing, stored in the compression data hold unit 5, is formed by a flag system which is composed of ON and OFF states (1 and 0). This, however, is only illustrative. In a third embodiment of the present invention, the above-mentioned compression data is formed by a trigger system.

Figures 22A, 22B:
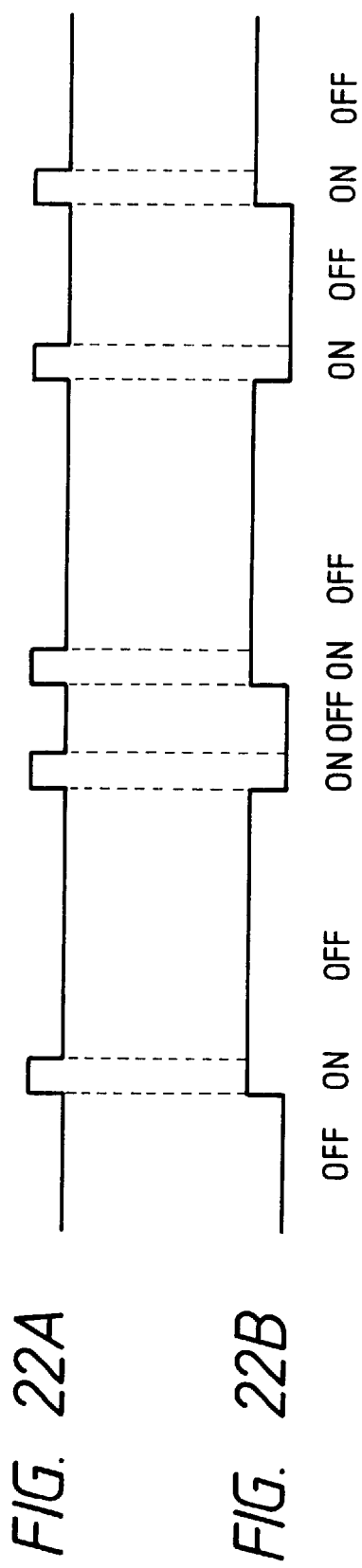
FIGS. 22A and 22B are illustrations explanatory of the difference between a flag system and a trigger system in a compression data hold unit.

The difference between the flag system and the trigger system will be described with reference to FIGS. 22A and 22B. FIG. 22A illustrates the flag system, while FIG. 22B illustrates the trigger system. As will be understood from a comparison between these Figures, there is a tendency that data lasts longer in the trigger system than in the flag system. By making use of this tendency, it is possible to achieve further reduction in the data amount by effecting a run-length compression such as, for example, MH. It is also possible to effect a further data compression by effecting, for example, Huffman encoding or Lempel-Ziv coding on the compression data, thereby achieving a further compression of the data. It is also effective to apply Huffman encoding or Lempel-Ziv encoding on the signal 2c.

<Fourth Embodiment>

In a fourth embodiment of the present invention, the values outputted from the reversible compression unit in Step 613, i.e., the objective pixel, may be formed into a look-up table. Images formed by computers such as DTPs usually features fewer number of colors. Thus, 256 colors are enough for the images handled in such computers. Limitation on the number of colors available for presentation is substantially eliminated by arranging such that 8-bit (256 colors) memory is used as the table and that 24-bit color data is output as in the conventional technique after appearance of the 256th color. In such a case, the number of bits is reduced to 8 from 24 which has been required conventionally, thus enhancing the compression ratio. Consequently, the number of blocks which are subjected to compression processing is increased to improve the image quality as compared with the first embodiment.

<Fifth Embodiment>

In each of the embodiments described hereinbefore, three latches are used in the reversible compression unit for storing the past pixel data. These latches, however, may be united into one, as in a fifth embodiment. In the fifth embodiment, therefore, only a 1-bit signal is derived through Steps S606, S608, S610 and S612, so that rewriting (substitution of past data) is conducted on only one latch. Consequently, troublesome processings such as "turn" for indicating the order of latches for rewriting can be eliminated. In this case, the compression data amount is calculated as follows:

$$D=64+(1\times counter\ 2)+(24\times counter\ 3)$$

Figure 23:
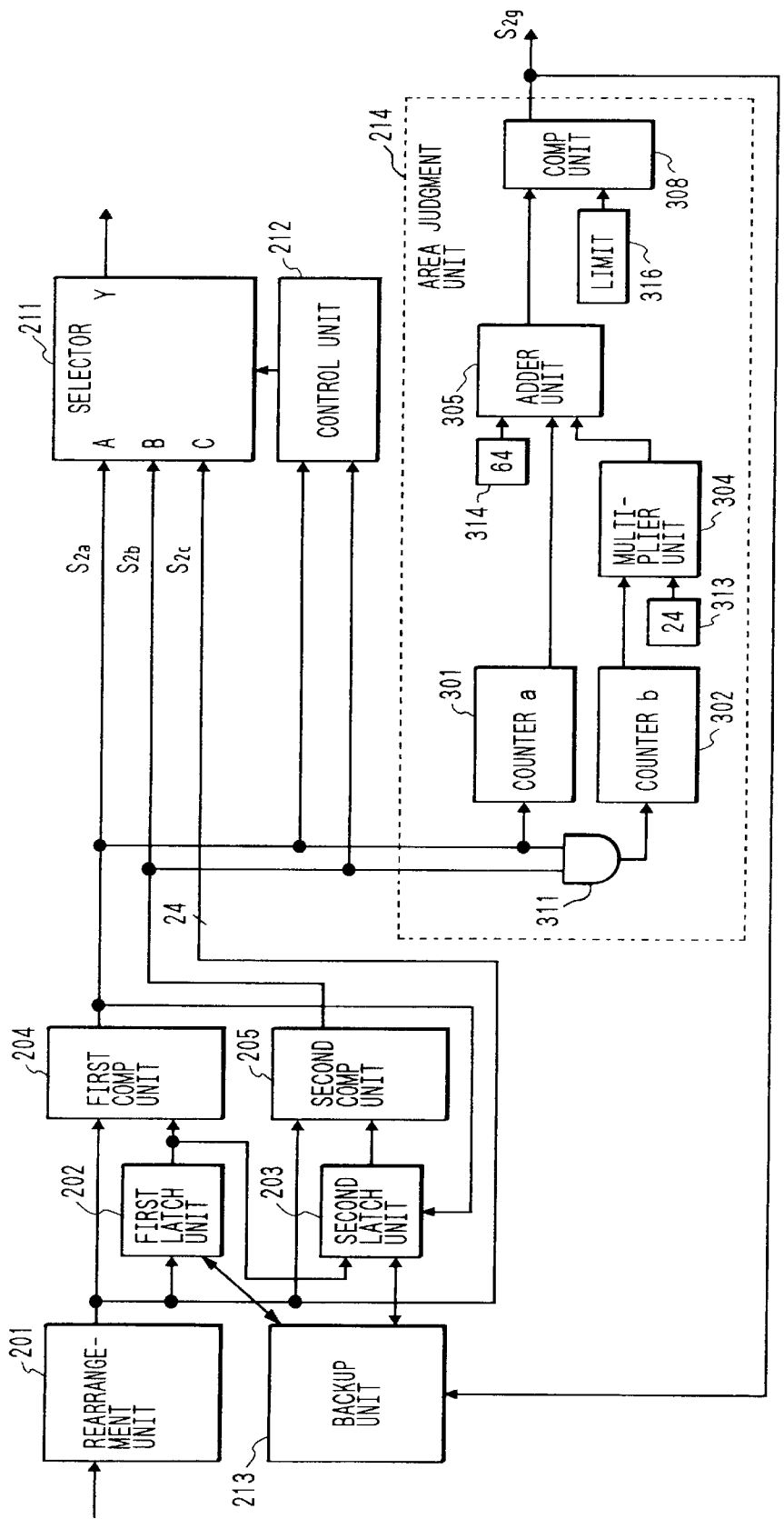
FIG. 23 is an illustration showing the detail of the construction of an adaptive Huffman decide unit based on index.

FIG. 23 shows the construction of the reversible compression unit which is used when there is no saving S in the arrangement in which only one latch is used for storing the past pixel data.

<Sixth Embodiment>

In a sixth embodiment, the number of bits of the present value which is outputted from the above-mentioned reversible compression unit in Step S613 is changed from 24 to 18.

In this case, the ADTC expansion data has values different from the original image. In this case, therefore, the compression is not reversible. In case of a high-frequency image such as that formed by a computer, requirement for gradation for recognition by human eyes is not critical, so that degradation of image quality is not noticeable, while the compression data amount is reduced to a value shown below:

$$D=64+(2\times counter\ 2)+(18\times counter\ 3)$$

<Seventh Embodiment>

In the reversible compression unit used in the first embodiment described before, rewriting may be effected only on a preselected latch, provided that the same color exists in none of the latches while there is no latch rewriting information (turn, turn_p, turn_pp). For instance, in a seventh embodiment, the latch on which the rewriting is to be executed is fixed to the second latch portion 203, when the signal 2a is "1" while the signal 2b is "11". In this embodiment, the scale of the hardware can be advantageously reduced, although the compression efficiency is slightly impaired.

<Eighth Embodiment>

In each of the preceding embodiments, the reversible compression unit has a buffer for storing the saving S, and the limit value L of the processing block is set to L=(C+S). This, however, is only illustrative and, in an eighth embodiment, the limit value L is set to L=C.

<Ninth Embodiment>

In each of the preceding embodiments, a segment controller is used for the purpose of memory control so as to conduct the compression in real time. In a ninth embodiment of the present invention, however, the compression is conducted after determination of the δ factor of ADCT compression, through a pr-scan (pre-development). In such a case, the control of the memory is further simplified.

Although the compression process is performed by hardwares in the preceding embodiments, it is also possible to execute such compression by softwares.

Figures 24, 35, 36:
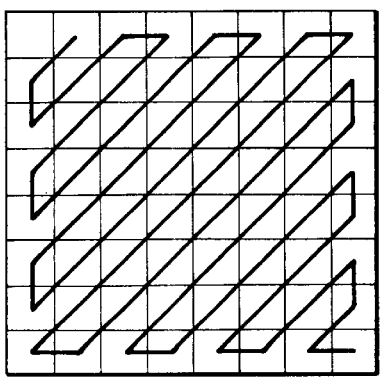
FIG. 24 is an illustration of the data stored in a buffer memory of the Huffman encode unit.
FIG. 35 is an illustration of an example of a quantizing table.
FIG. 36 is an illustration of a zig-zag scan.

Furthermore, although the pixel data rearrangement unit 201 of the reversible compression unit of each of the described embodiments employs a zig-zag sequence as shown in FIG. 36, such a zig-zag sequence is not exclusive.

For instance, the function of the pixel data rearrangement unit is not required when the rearrangement sequence is made to conform with the sequence in which pixel data is sent from the raster block conversion unit.

<Tenth Embodiment>

In the first embodiment described before, the pixel data substitute unit performs substitution of pixel data of the pixel type A, thereby reducing the amount of data compression and filling of the bit map data. According to the invention, however, the arrangement may be such that a predetermined code representing the pixel type A is used as the reversible compression code, and this code is outputted when the pixel type is "A".

For instance, while the first embodiment employs four latches, the number of the latches is reduced to 3 and, at the same time, the code corresponding to the pixel type A is set to "110" which is the code obtained when coincidence to the fourth latch is obtained in the first embodiment, whereby a thirteenth embodiment is realized.

Subsequently, "0" is outputted as long as pixels of the type "A" appears successively, whereas, when a pixel of the type "B" has appeared, "1" is outputted. Then, codes are outputted upon comparison of the input data with the contents of the second and third latches. Updating processing by the update means is not conducted when coincidence to the contents of the second and third latches could not be obtained, i.e., when "111" is outputted. The reason why the updating is not conducted is as follows. At the time of the switching from the pixel type "A" to the pixel type "B", the code "0", which indicates that the input data coincides with the data of the first latch, undesirably serves as a code indicative of the type "A". If the content of either one of the second and third latches is rewritten with the data of the first latch due to incoincidence to the contents of the second and third latches, there is a risk that the three latches contain the same data when the input pixel data coincides with the content of the first latch.

Although the embodiments described hereinbefore realize the compression by hardware, it is possible to realize it by software.

<Eleventh Embodiment>

Figure 25:
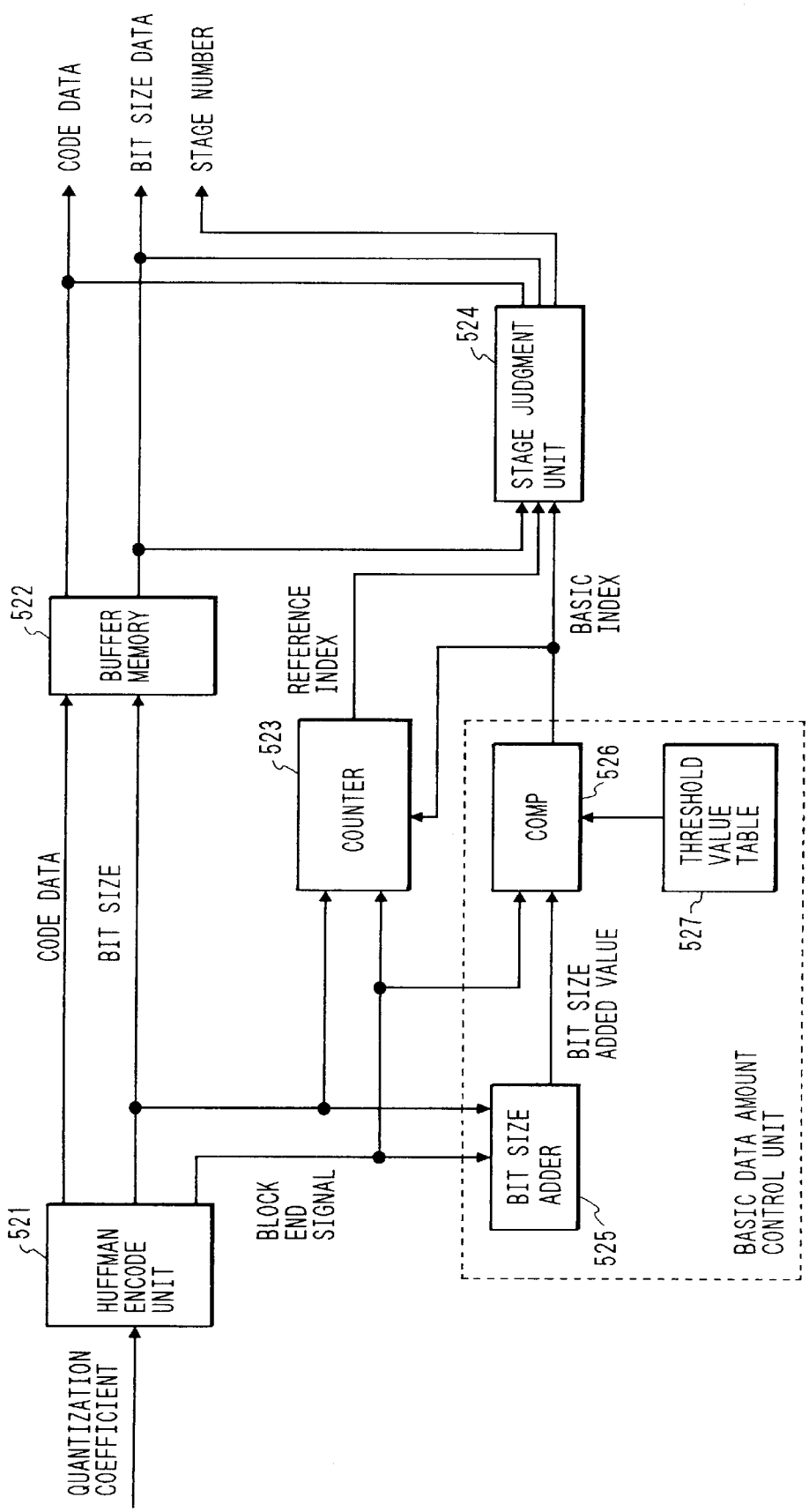
FIG. 25 is an illustration showing the detail of the construction of an adaptive Huffman decode unit based on index, in a thirteenth embodiment of the present invention.

A description will now be given of an eleventh embodiment in which an index-based adaptive Huffman decode unit shown in FIG. 25 is used as the adaptive Huffman encode unit 505.

In the Huffman encode unit 521, quantizing coefficients which are arrayed linearly are Huffman-encoded for every 64 coefficients, i.e., for each of Y, U and V components of each block composed of 8×8 pixels. The Huffman encode unit 521 then produces encoded data, bit size data and a block end signal which indicates the termination of each block. The encoded data, block size data and the block end signal are stored in the buffer memory 37 in the form shown in FIG. 37. In FIG. 37, each index indicates the serial number of encoded data obtained from one block. The number of valid bits in the encoded data is indicated by the bit-size data.

The bit-size adder 522 adds the bit size of the AC component of the successive blocks each time the block end signal is received, and delivers the result of the addition to the comparator 526. A comparator 526 then compares the added value with the values prepared for each of Y, U and V, e.g., the values in the threshold value table 527 shown in FIG. 18. When the threshold values are exceeded by the added value, the immediately preceding index is delivered to a counter 523 and a stage judgment unit 524 as a basic index.

In the case where the bit numbers as shown in FIG. 18 are employed while the data as shown in FIG. 37 is used, "3" is determined to be the basic index, so that the data under indices "0" to "3" are written in the first stage.

The counter 523 counts the indices from the input signal of the bit size of the first AC component of the 8×8 pixel block and, upon detection of the block end signal indicative of termination of one block, computes a reference index on the basis of the finally counted index and the basic index derived from the comparator 526. The counter 523 then delivers the result of the computation to the stage judgment unit.

In the case of the example shown in FIG. 37, the basic index is "3", while the finally counted index is "18", so that data of the indices from 4 to 18 are written in the second and further stages. Therefore, data of (18−3=15) is divided into equal three parts, and the results, i.e., "8" and "13" are delivered as the reference indices.

The block end signal from the Huffman encode unit 21 also serves to reset the bit size adder 525 and the comparator 526.

The stage judgment unit 524 counts indices on the basis of the bit size signals derived from the buffer memory 522 and outputs a stage number on the basis of the counted value, basic index and the reference index. In this case, the basic index is "3", while the reference indices are 8 and 13. Therefore, "1" is given as a stage number to the data which are under indices up to 3, similarly, "2" and "3" are given as the stage numbers to the data under indices 4 to 8 and to the data under indices 9 to 13, respectively. Then, stage number "4" is delivered until the process is completed with this block. An EOS (End Of Stage) signal is inserted each time the stage number is changed. This code is necessarily used when the data is expanded.

An adaptive Huffman decode unit 505 for expanding the data encoded by this encoding method can be realized in exactly the same way as that in the first embodiment.

<Twelfth Embodiment>

Figure 38:
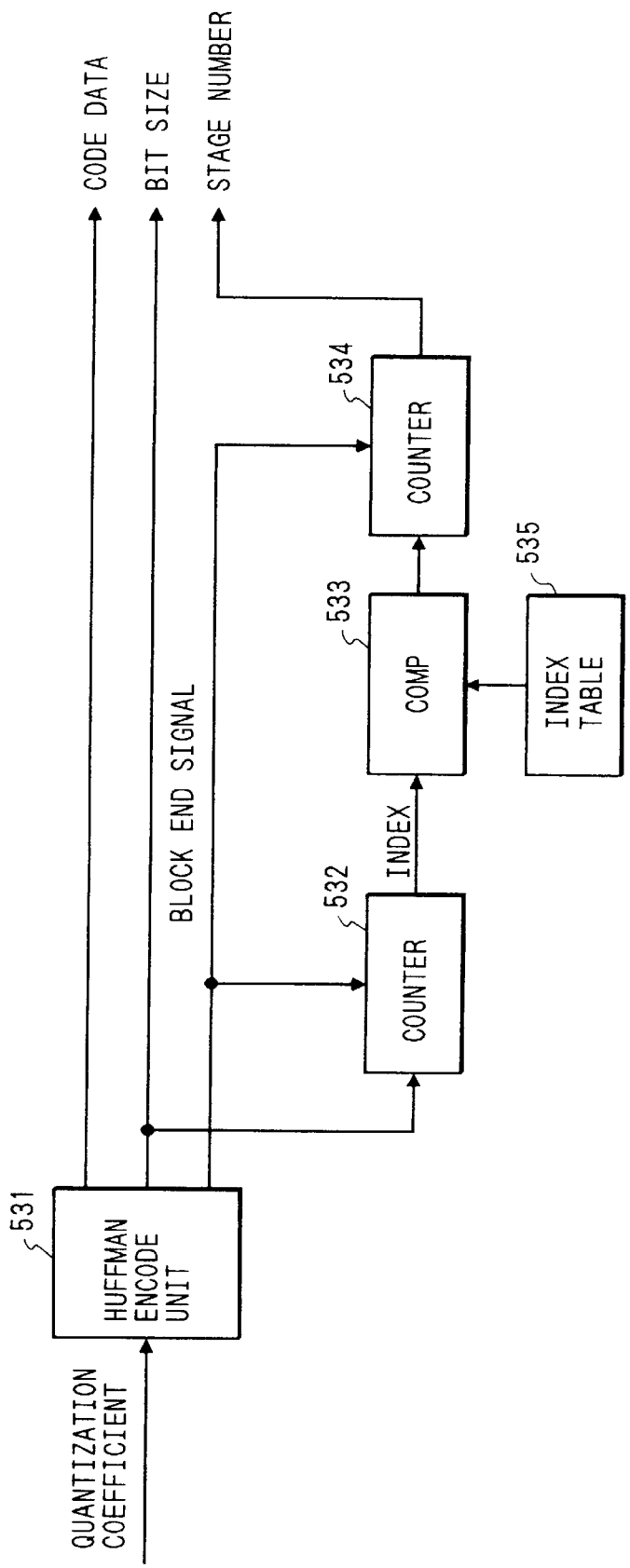
FIG. 38 is an illustration showing the details of the construction of an adaptive Huffman encode unit based on index.

A description will now be given of an embodiment which uses, as the adaptive Huffman encode unit 505, an index-based adaptive Huffman decode unit shown in FIG. 38.

A Huffman encode unit 531 performs Huffman encoding of linearly arrayed quantizing coefficients for every 64 coefficients (for each of Y, U and V components of each block consisting of 8×8 pixels), and delivers encoded data and bit sizes.

A counter 532 counts the bit size signals and transfers to a comparator 533 the result of the counting, i.e., the index. The comparator 533 compares the transferred value with values in an index table 535 shown in FIG. 39. When the index value exceeds the values in the table, the comparator delivers a signal to a counter 534. The output of the counter 534 (stage number) has an initial value of "1" and, is incremented each time the above-mentioned signal is received. That is, the stage number is incremented by 1.

Referring to the index table shown in FIG. 39, the output of the counter 534, i.e., the stage number, is "1" for the 8×8 pixel block of Y component up to the index "3". The stage number is "2" for the data under the indices "4" to "8", and the stage number is "3" for the data under indices "9" to "14". Thereafter, the stage number is set to "4" until the 8×8 block is terminated by the resetting of the counters 532, 534 in response to the block end signal.

When the data encoded by this encoding method is expanded, the adaptive Huffman decode unit 5 requests the segment controller 10 to provide the encoded data corresponding to the stage number "1". The segment controller 10 checks up with the content of the segment information table 11 and reads the encoded data of the first stage from the compression memory 12. The segment controller then transfers the thus read data to the adaptive Huffman decode unit 505.

The adaptive Huffman decode unit 505 decodes the encoded data and, by making reference to the index table, outputs the next stage number to be requested. Then, the operation for requesting the stage number and the decoding of the encoded data are repeated in the described manner, until 64 quantizing coefficients, corresponding to the number of the elements in the 8×8 pixel block, is decoded. After completion of decoding of 64 quantizing coefficients, a similar decoding operation is executed for the next 8×8 pixel block.

In the embodiment explained in connection with FIGS. 7 and 25, the adaptive Huffman encode unit 5 performs staging of the bit rate based upon the bit sizes. In contrast, when the method described in connection with FIG. 38 is used, although the level of accuracy may be somewhat reduced, the scale of the hardware can be reduced by virtue of the fact that the algorithm is simple, whereby a reduction in the cost can be realized. In addition, the method shown in FIG. 38 does not require the insertion of EOS code between the data of successive 8×8 pixel blocks, so that the total amount of the data can be reduced.

<Other Embodiments>

In the first, eleventh and twelfth embodiments, the compression data of the ADCT 4 is staged into four. This number of stages, however, is not exclusive and these embodiments may be modified to employ 2, 3, 5, 6 or more stages.

The target bit rate of the whole image, which is 2.4 (bits/pixel) in the first embodiment, can be changed as desired.

In the first and eleventh embodiments, the target bit rate of the first stage is set to 1.5 (bits/pixel), and the values in the threshold value table shown in FIG. 18 is determined on the basis of this target bit rate. This target bit rate, however, may be altered as desired. In these embodiments, the three stages starting from the second stage share equal parts of the encoded data, i.e., each these stages share approximately one third of the encoded data. This, however, is also illustrative and the arrangement may be such that the second, third and fourth stages share the encoded data at a ratio of, for example, 3:2:1, 5:3:1, and so forth.

The values of the index table shown in FIG. 39, used as the reference for staging in the third embodiment, are not exclusive and may be altered as desired.

In the first embodiment, when the multi-staged compression data is stored in the compression memory 12 which is segmented into a plurality of segments, invalidation is conducted such that the data of the greatest stage number (stage 4) is invalidated first and then the data of the smaller stage numbers are successively invalidated. This, however, is only illustrative and the sequence or order of invalidation may be selected and determined in an adaptive manner.

The segment information table shown in FIG. 20, employed in the embodiments described hereinbefore, is not exclusive and may be modified in various manners without departing from the scope of the present invention.

The present invention can equally be applied both to a system which is composed of a plurality of apparatuses or devices and an apparatus which includes a single device.

Obviously, the present invention can be applied also to the case where a system or an apparatus operates by being supplied with a program.

As will be understood from the foregoing description, according to the present invention, it is possible to compress a multi-value image formed by a computer or the like means, at a high compression ratio without any degradation of the image quality.

<Thirteenth Embodiment>

Figure 40B:
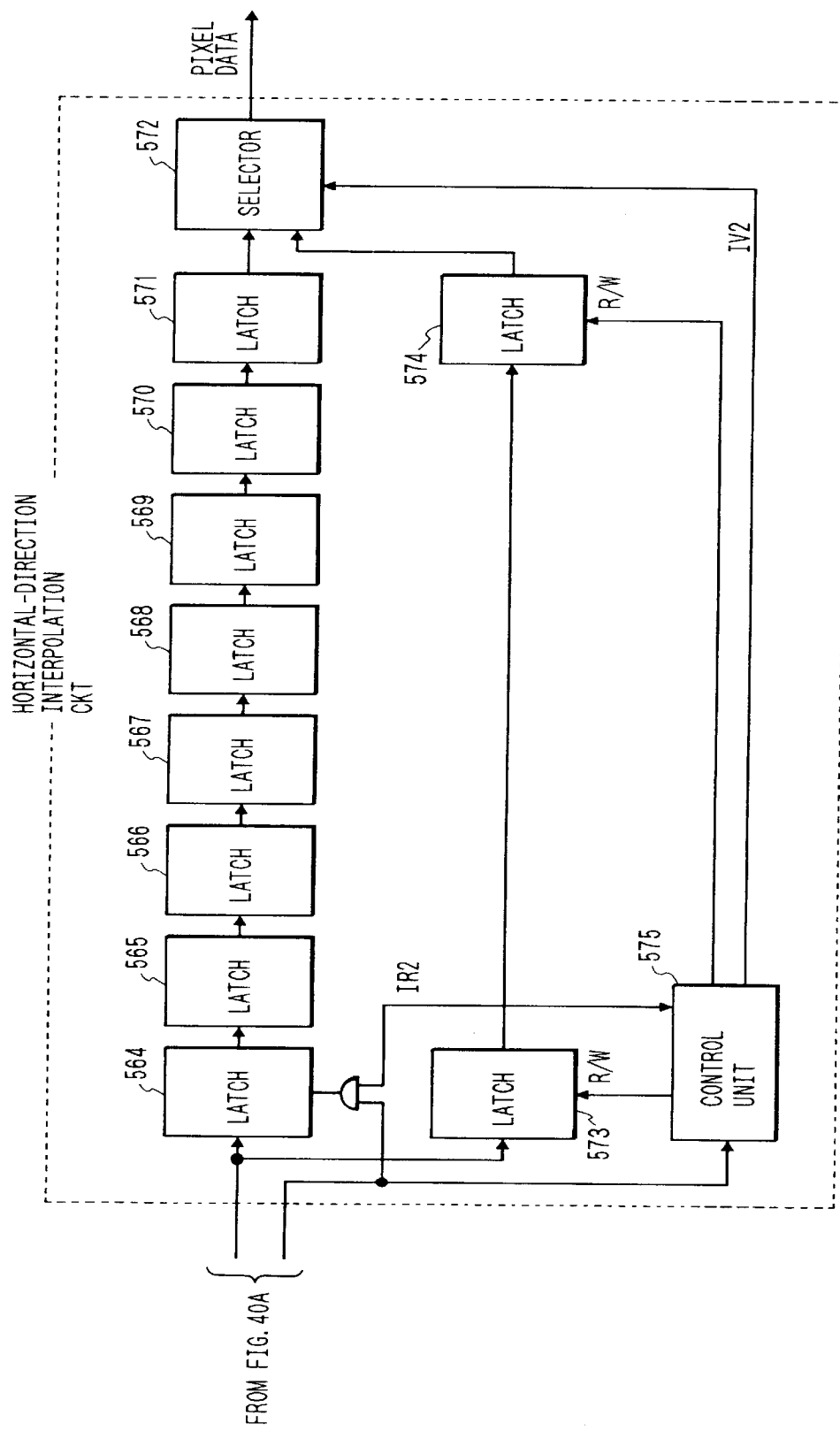
FIG. 40 consists of FIGS. 40A and 40B showing illustrations of an arrangement for realizing interpolation performed in the thirteenth embodiment.

FIGS. 40A and 40B illustrate interpolation units used in a thirteenth embodiment of the present invention. As will be seen from these Figures, the interpolation unit is composed of a vertical-direction interpolation circuit, a horizontal-direction interpolation circuit and a memory for converting the sequence of the image data. As stated before, this interpolation unit is used at the input side of the encoding unit of the first embodiment. A detailed description will be given of this interpolation unit as the component of the system including the encoding unit.

A reference is made here to a simple example for the purpose of explaining an algorithm for realizing the pixel data interpolation unit 3.

FIGS. 42A, 43A and 44A are illustrations of 8×8 pixel data of natural image input to the pixel data interpolation unit 3, while FIGS. 42B, 43B and 44B show attribute data input to the pixel data interpolation unit 3. More specifically, FIGS. 42A and 42B show the pixel data and attribute data as obtained when all the 8×8 pixels of the block are of natural image. In this case, therefore, the attribute data are "1" for all the pixels of the block. FIGS. 43A and 43B illustrate the pixel data and attribute data as obtained when all the pixels of the 8×8 pixel block are of CG image. In this case, therefore, the attribute data are "1" for all the pixels of the block. FIGS. 44A and 44B show the case where the natural image and the CG image co-exist. In this case, the attribute data is composed of "0" which indicates the CG region and "1" which indicates the natural image.

The pixel data interpolation unit 3 is operated only in a case of FIGS. 44A and 44B, while in other case the data is not processed (interpolated) but is directly transferred to the ADCT.

The interpolation of the pixel data is achieved by a couple of interpolating operations: namely, a horizontal-direction interpolation and a vertical-direction interpolation. FIGS. 45A to 47B show the manner in which such interpolation is performed. More specifically, FIGS. 45A and 45B show the case where a CG image and a natural image co-exist. More specifically, FIG. 45A shows one component data of pixels, wherein 120 to 180 represent the pixels of the natural image, while 30 represents the pixels formed by CG. FIG. 45B shows the attribute data in which the natural image region and the CG image region are distinctively determined by "0" and "1".

FIGS. 46A and 46B show one-component data obtained as a result of the vertical-direction interpolation. This interpolation is performed in each column from the top to the bottom. Thus, in the 0-th row, natural image pixel values 140 have been obtained in two pixels which contact the CG pixels. At the same time, a natural image pixel value 160 has been obtained as a result of the interpolation at the pixel which contacts the next CG pixel. Similarly, in the 1st row, natural image pixel values 130 have been obtained in two pixels contacting the CG pixels and also two natural image pixels 170 have been obtained in two pixels contacting the CG pixels. Similar interpolation has been effected on the 2nd row. In the 3rd and 4th rows, no interpolation is conducted because there is no natural image pixels in these rows. Interpolation is conducted vertically from the top to the bottom also in the 5th row. When there is no natural image pixel at the upper side, the natural image pixel 160 which contacts the CG pixel at the lower side are simply repeated. Similar interpolation is conducted also in the 6th and 7th rows. In FIG. 46B, the pixels on which interpolation has been effected have the value "1" indicative of the natural image, whereas the pixels which have not been interpolated remain to be "0".

Horizontal-direction interpolation is then conducted. FIG. 47A shows one-component data as a result of such horizontal-direction interpolation. In the 0-th column, natural image pixel 140 which horizontally contact with the CG image is simply repeated. Pixel value "140" also is obtained in the 1st and 2nd columns. In the third column, pixels 180 have been obtained as a result of the horizontal-direction interpolation and, in the 4th to 7th columns, pixels 190 have been obtained as a result of the horizontal-direction interpolation.

Overall interpolation has thus been obtained as shown in FIG. 47B.

Figure 48:
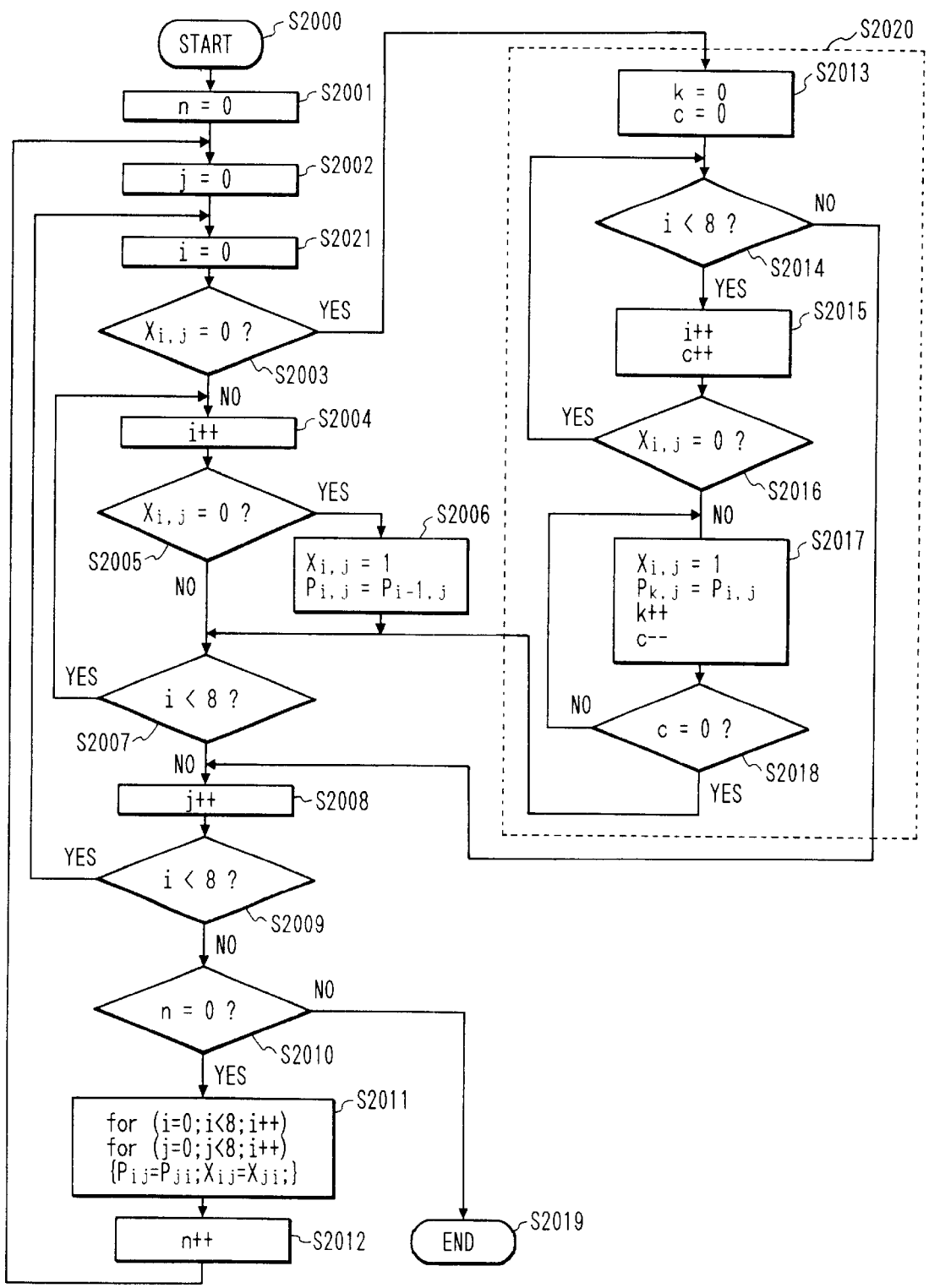
FIG. 48 is a flowchart of an algorithm employed in the thirteenth embodiment.

FIG. 48 is a flow chart showing the algorithm of the above-described interpolation.

The parameters appearing in the flow chart are as follows:

Pij (i:0 to 7, j:0 to 7): pixel data at i-th column, j-th row: and

Xij (i:0 to 7, j:0 to 7): X data at i-th column, j-th row.

Vertical-direction interpolation is represented by (n=0), while horizontal-direction interpolation is represented by (n=1).

A symbol "c" indicates the number of continuous CG pixels.

A description will be given of the major blocks of the flow chart.

S2001, S2002 and S2021 are steps for initial setting.

S2003 judges whether the initial pixel of each row is a CG pixel or a natural image pixel. When the initial pixel is a CG pixel, a specific routine is commenced at S2020.

S2004 executes increment of the objective pixel by one in the vertical direction.

S2005 determines whether the objective pixel is a CG pixel or a natural image pixel.

When the objective pixel is judged to be a CG pixel in S2005, the value of the preceding pixel is substituted for the objective pixel in S2006.

S2007 determines whether the interpolation has been completed for the objective row. If the interpolation has not been completed, S2004 to S2006 are repeatedly executed.

When the interpolation on the objective row has been completed, the process advances to the next row in S2008.

S2009 is for executing the above-mentioned steps including S2020 until the vertical-direction interpolation is completed in all the rows.

A description will now be given of the flow of the routine conducted in S2020.

Parameters are initialized in S2013. Then, S2014, S2015 and S2016 are repeated to count the number of continuous CG pixels until a natural pixel appears. When all the pixels of the objective row are CG pixels, the process proceeds to S2008 without performing interpolation.

In S2017 and S2018, the values of the natural image pixel which has appeared is substituted for the above-mentioned CG pixels. The process then proceeds to S2007.

If the condition (n=0) is met in step S2010, the process proceeds to S2011 in order to perform horizontal-direction interpolation, whereas, if this condition is not met, it is judged that the horizontal-direction interpolation has been finished, thus completing whole interpolation processing.

In S2011, conversion of column into row and vice versa is conducted to enable horizontal-direction interpolation.

S2012 performs increment of n by 1.

FIGS. 40A and 40B illustrate an example of the arrangement for realizing the interpolation algorithm described above.

Referring to FIGS. 40A and 40B, latches 551 to 558 are for effecting interpolation of image by means of a pipeline. Each of the latches 551 to 558 are adapted for storing image data of one line or one column of a 8×8 pixel block. Transfer of data to these latches is conducted in synchronization with a basic clock which is not shown in FIGS. 40A and 40B. The latch 551 is controlled by means of a signal 1f and by means of an OR signal of a signal IRI which is produced by a control unit 562. When the first pixel of each row is a CG pixel, the signal IRI is set to HIGH until a natural image pixel appears, otherwise it is maintained at LOW. That is to say, when all the pixels of an objective row is CG pixels, the signal IRI is HIGH for all these pixels. Therefore, data of 1a' is written in the latch 551 when the signal 1f is HIGH or when the signal IRI is HIGH, otherwise the data 1a' is not written in the latch 551.

When the first pixel in each row or column is a CG pixel, the latches 559 or 560 temporarily stores a natural image pixel which has appeared for the first time in such row or column. A selector 561 is used for selection between the data from the latch 558 and the data from the latch 560. The control unit 562 controls the latches 559, 560 and the selector 563 on the basis of the signal 1f so as to produce new attribute data of the pixel data.

A memory 563 temporarily stores the pixel data and the associated attribute data. More specifically, it receives data in a sequence as shown in FIG. 41 and converts the sequence into that shown in FIG. 49. Thus, data is outputted from the memory 563 in the sequence as shown in FIG. 49.

A horizontal-direction interpolation circuit has a construction similar to the vertical-direction interpolation circuit described above. Thus, the horizontal-direction interpolation circuit receives data in a sequence different from that for the vertical-direction interpolation circuit. Since the ADCT connected to the horizontal-direction interpolation circuit does not require any attribute data, no attribute data is generated in this case.

A description will now be given of the vertical-direction interpolation processing, with specific reference to FIGS. 45A, 45B, 46A and 46B. The first pixel "120" of 0-th row is a natural image pixel, so that the signal 1f is set to HIGH. Therefore, the pixel data "120" is written in the latch 551 in synchronization with the first clock. Then, in accordance with the second clock, the content "120" of the latch 551 is written in the latch 552 and, at the same time, the next natural pixel data "130" is written in the latch 551. Then, in synchronization with the third clock, the pixel data "140" is written in the latch 551, while the pixel data "130" which has been stored in the latch 551 is transferred to the latch 552. At the same time, the pixel data which has been stored in the latch 552 is transferred to the latch 553. At the timing of the fourth clock, since the pixel data "30" is a CG pixel data, the signal 1f is set to LOW. The pixel data "30", therefore, is not written in the latch 551. The data "140" which has been written in the latch 551 remains in this latch and this data "140" also is written in the latch 552 at the same time. Meanwhile, the data "130" which has been written in the latch 552 is written in the latch 553, and the data "120" which has been written in the latch 553 is written in the latch 554. In phase with the fifth clock, since the pixel data "30" is a CG pixel, writing of this data in the latch 551 is not conducted as in the case of the fourth clock. Thus, the data "140" remains in the latch 551 and the same data "140" also is written in the latch 552. Successive pixel data are thus transferred to successive latches. The next pixel data "150" read in phase with the sixth clock is a natural image pixel so that this data is written in the latch 551. Transfer of data is conducted at the same time in the manner described. The next pixel data "160" read in phase with the seventh clock is a natural image pixel so that this data is written in the latch 551. Transfer of data is conducted at the same time in the manner described. The final pixel of this row is read in phase with the eighth clock. Since this pixel data "30" is a CG pixel, no data is written in the latch 551. Instead, the pixel data "160" which has been held by the latch 551 is transferred in the manner described. Thus, the pixel data of the 0-th row after vertical-direction interpolation is stored in the latches 551 to 558. Then, simultaneously with the entry of the 1st row, data is sequentially outputted to the selector 561. Latches 559 and 560 are used when the first pixel of the objective row is a CG pixel. These pixels, therefore, are not used for the 1st row, so that the selector 561 naturally selects the data of the latch 558. The data thus selected is stored in the memory 563. Since vertical direction interpolation has been finished for the 0-th row, attribute data "1" are successively outputted from the control unit 562.

For the 1st and 2nd rows, pixel data and attribute data are entered subsequent to the entry of the data of the 0-th row so that vertical-direction interpolation is conducted in the same manner as the 0-th row.

Data of the 3rd row is then entered subsequent to the entry of the data of the 2nd row. Since this row contains no natural image pixel, no interpolation is conducted so that the pixel data and the attribute data are delivered to the memory 563 as they are. This applies also to the data of the 4-th row.

Referring now to the 5th column, since the first pixel of this row is a CG pixel, a signal of HIGH is obtained from the signal IRI so that the data "30" of the first pixel is written in the latch 551. The next pixel data "30" also is written in the same manner. The pixel data "30" is then successively transferred from the latch 551 to the latch 557. The final pixel of this row is a natural image pixel which bears a value "160". This data "160" is therefore written in the latch 551 and, at the same time, in the latch 559. The data "160" held by the latch 559 is written in the latch 560 before the next clock is generated. In phase with the next clock, the pixel data "30" of the 6th row is written in the latch 551 and, at the same time, data is transferred from one to the next of the successive latches 551 to 558. The selector 561 selects the data "160" of the latch 560 in accordance with the IVI signal from the control unit 562, so that interpolation is executed. In phase with the subsequent clock, new data is written in the latch 551 and data is transferred from one to the next of the successive latches 551 to 558. The selector 561 selects the data "160" held by the latch 560 in accordance with the signal IVI from the control unit 562. Then, interpolation is conducted for the 5th row by means of the data "160" of the latch 560.

Vertical interpolation processings are conducted on the 6th and 7th rows, in the same manner as the 5th row. The results are written in the memory 563. The data written in the memory 563 is delivered therefrom in the sequence as shown in FIG. 49, whereby horizontal-direction interpolation is performed. The operation of the horizontal-direction interpolation circuit is substantially the same as that of the vertical-direction interpolation circuit, except for the fact that the data entry is conducted in a different sequence and that attribute data are not produced.

Although the embodiment shown in FIGS. 40A and 40B employs separate circuits for the vertical-direction interpolation and the horizontal-direction interpolation, the embodiment may be modified to use a single interpolation circuit 580 which performs both these two types of interpolation processings as shown in FIG. 50. Since the construction of two interpolation circuits shown in FIGS. 40A and 40B are substantially the same.

The memory 563 can be realized by a single memory as shown in FIGS. 40A and 40B. However, when a pipeline processing is conducted or when a single interpolation circuit is used as in FIG. 50, the memory may be realized in the form of a double memory 582, 583 by using selectors 581, 584, as shown in FIG. 51.

Although in the described embodiment the interpolation is conducted first in the vertical direction and then in the horizontal direction, this order may be reversed such that the horizontal-direction interpolation is conducted first followed by the vertical-direction interpolation. The number of the latches also may be varied in accordance with a variety of block sizes. For instance, a block size of 1×10 pixels can be dealt with by the use of ten latches, although eight latches 551 to 558 are used in the vertical-direction interpolation circuit of the described embodiment.

<Fourteenth Embodiment>

A fourteenth embodiment of the present invention will be described with reference to the drawings.

Figure 52:
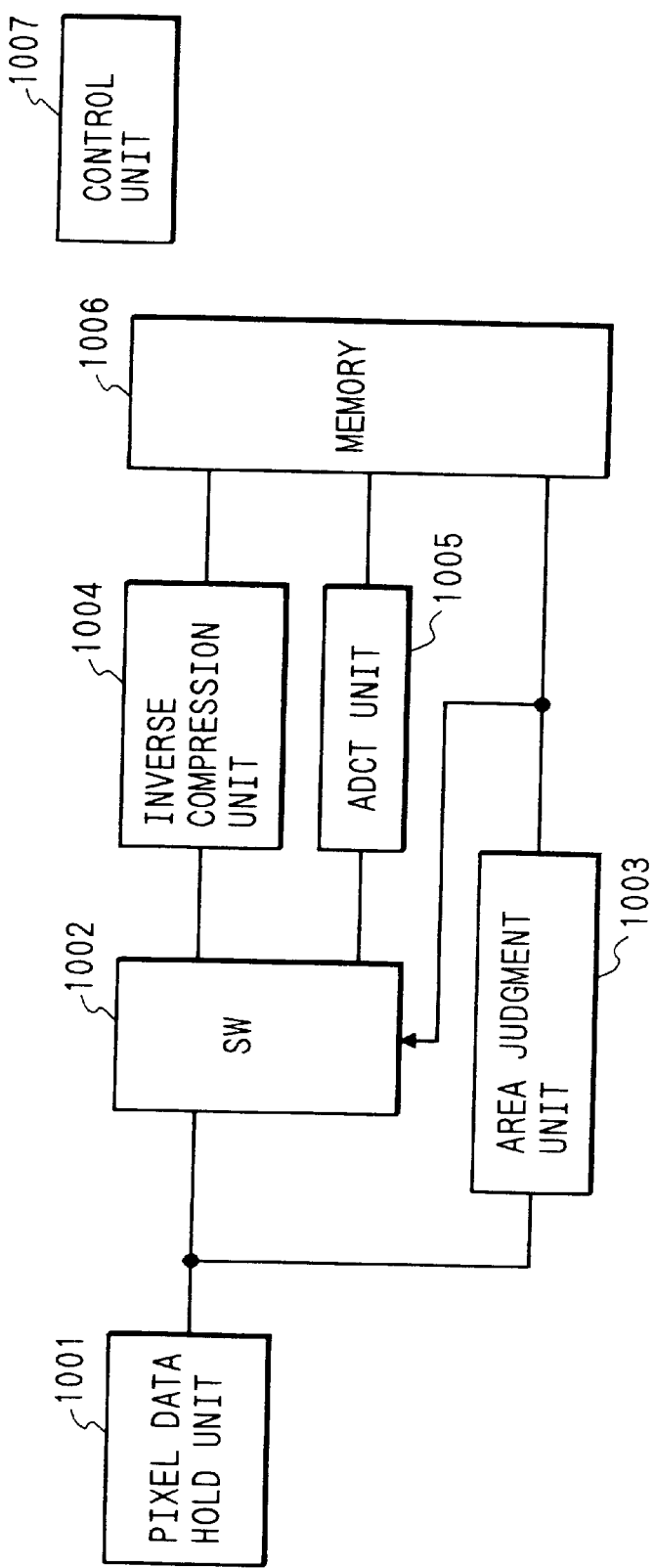
FIG. 52 is a block diagram schematically showing the construction of a data compression apparatus as a fourteenth embodiment of the present invention.

FIG. 52 is a block diagram schematically showing the construction and function of the data compression apparatus of this embodiment. Referring to this Figure, numeral 1001 denotes a pixel data hold unit which hold a pixel block composed of 8 pixels in horizontal direction and 8 pixels in vertical direction, data of each pixel being composed of 24 bits. Numeral 1002 denotes a switch which distributes the entered pixel data of the 8×8 pixel block in accordance with a control signal which will be described later. An area judgment unit 1003 judges the area based on the data entered from the pixel data hold unit 1001, and outputs a control signal. A reversible compression unit 1004 converts the entered data into compression data and delivers the compression data. An ADCT unit 1005 performs ADCT compression processing on the entered data and outputs the compression results. A memory 1006 stores the compression data derived from the reversible compression unit 1004 and the ADCT unit 1005, as well as the above-mentioned control signal, at addresses which are appointed by a control unit 1007. The control unit 1007 conducts controls of operation timings of various components mentioned above. In the described embodiment, the pixel data hold unit 1001 holds data of 8 pixels in vertical direction and 8 pixels in horizontal direction. This size of the block of pixels, however, is only illustrative and may be varied as required.

Figure 54:
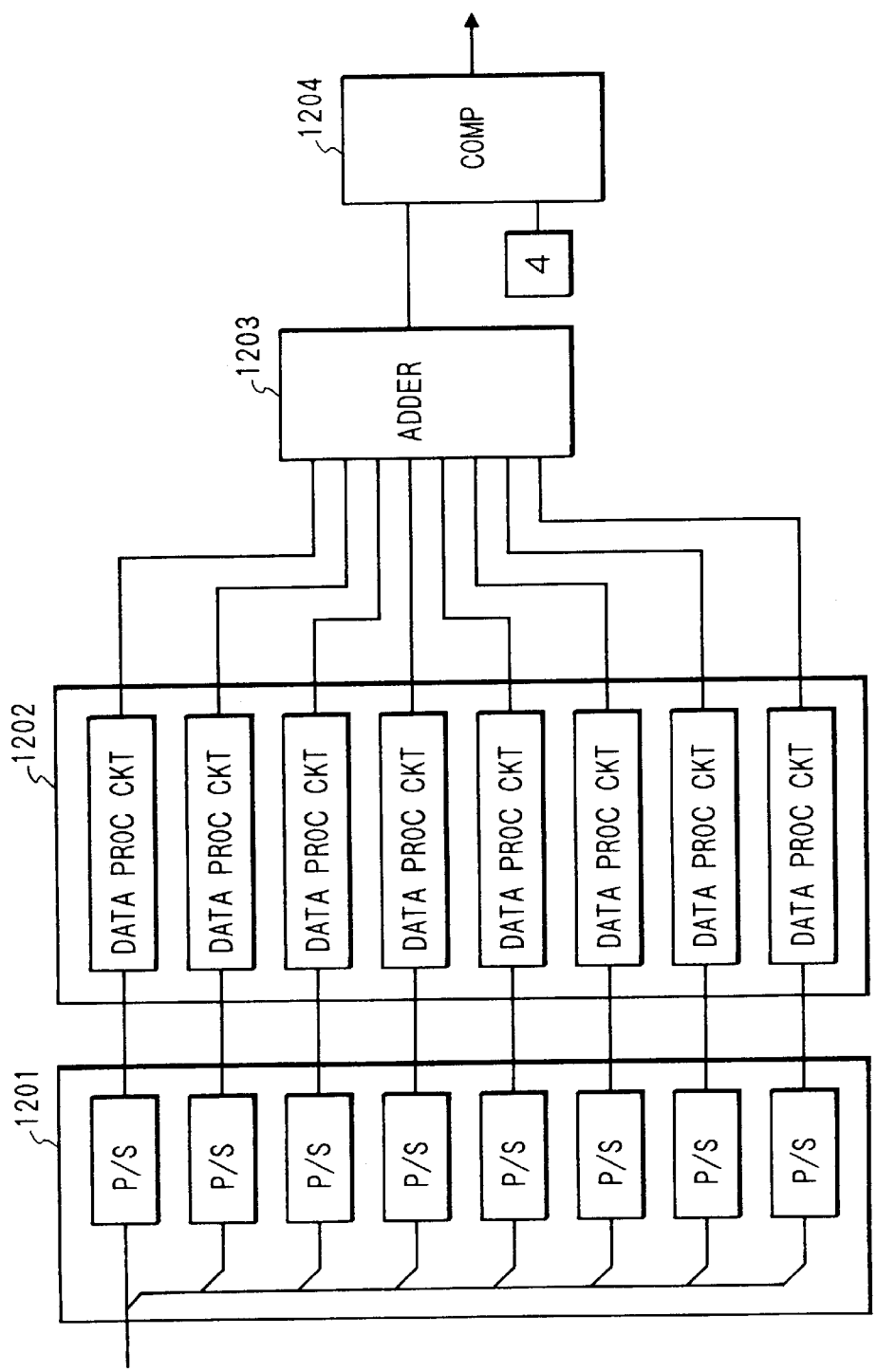
FIG. 54 is a block diagram showing the detail of the construction of a data processing circuit in the unit shown in FIG. 53.

FIG. 54 is a block diagram showing the detail of the area judgment unit 1003 shown in FIG. 52. Referring to this Figure, a parallel/serial converter 1201 receives the parallel pixel data output from the pixel data hold unit 1001 on 9-pixel basis and outputs the data after conversion into serial signal. Each of eight data processing circuits 1202 outputs "1" when four or more different color data exist among the 8 pixel data entered. Numeral 1203 designates an adder which sums the output values from the eight data processing circuits 1202. A comparator 1204 compares the output value of the adder 1203 with a predetermined number which is "4" in the illustrated embodiment. If the output value of the adder 1203 is below a predetermined value, the comparator 1204 produces an output "0", whereas, when the output value is equal to or greater than the predetermined value, the comparator 1204 produces an output "1".

Figure 53:
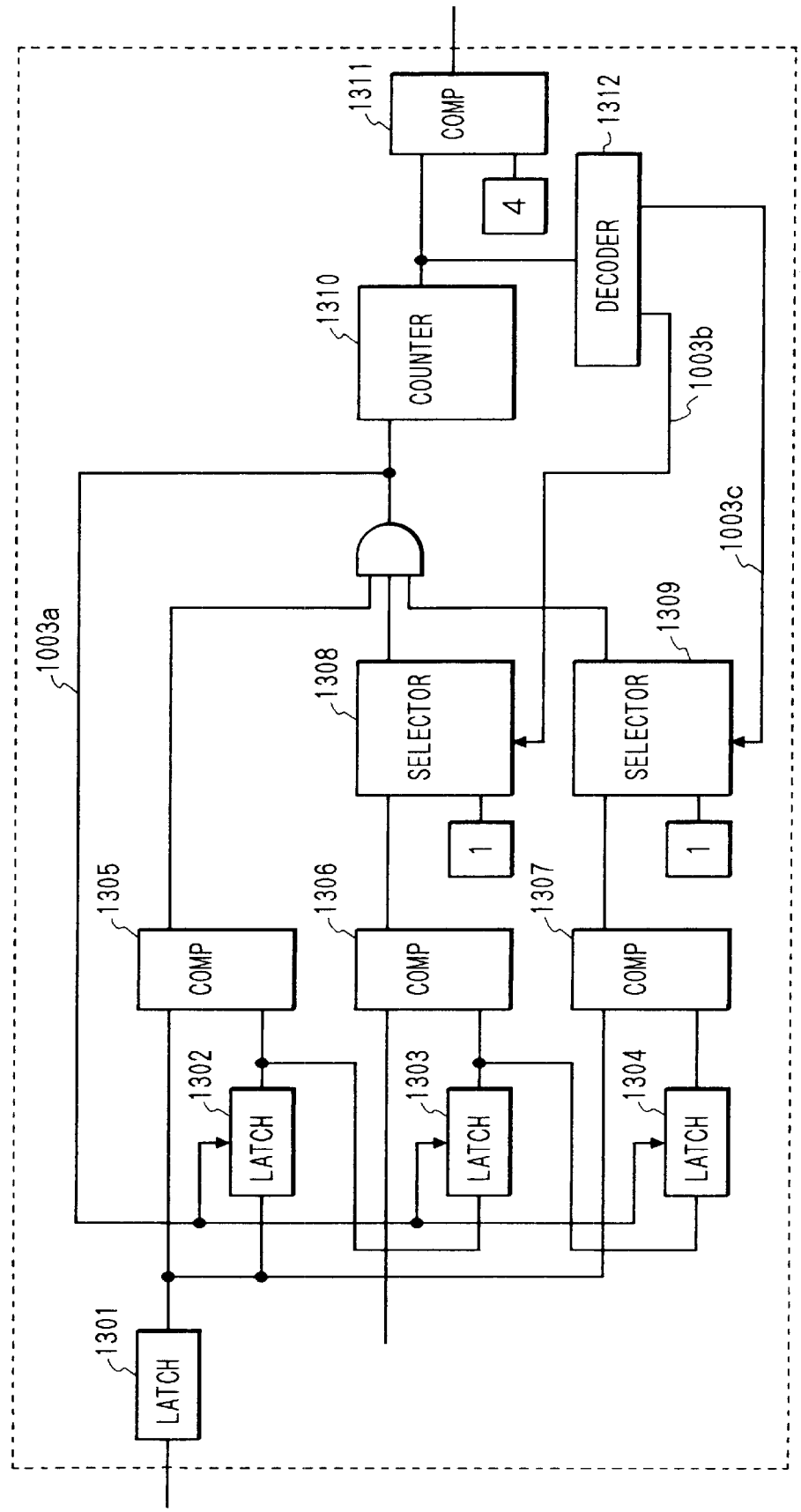
FIG. 53 is a block diagram showing the detail of the construction of an area judgment unit in the embodiment shown in FIG. 52.

FIG. 53 is a block diagram showing the detail of the construction of each of the data processing circuits 1201 shown in FIG. 54. A latch 1301 successively stores the entered pixel data. Numerals 1302 to 1304 are latches which successively store the pixel data in synchronization with a control signal 1043a which will be mentioned later. Comparators 1305 to 1307 respectively compare the pixel data held by the latches 1302 to 1304 with the pixel data held by the latch 1301. Each of these comparators produces an output "0" when the data of the associated latch coincides with the data of the latch 1301, otherwise it produces an out "1". Numerals 1308 and 1309 denote selectors which selectively output either the outputs from the comparators 1306 and 1307, respectively, or "1", in accordance with control signals 1003b and 1003c which will be mentioned later. A counter 1310 counts the control signals 1003a produced when the output from the comparator 1305 and the outputs from the selectors 1308 and 1309 are all "1", and outputs the result of the counting. A comparator 1311 compares the output of the counter 1310 with a predetermined value which is "4" in this embodiment. If the counter output is below the predetermined value, the comparator 1311 produces an output "0" whereas, if the counter output is equal to or greater than the predetermined value, it produces an output "1". Numeral 1312 represents a decoder which decodes the output of the counter 1301 thereby producing the control signals 1003b and 1003c for the selectors 1308 and 1309.

Figure 55:
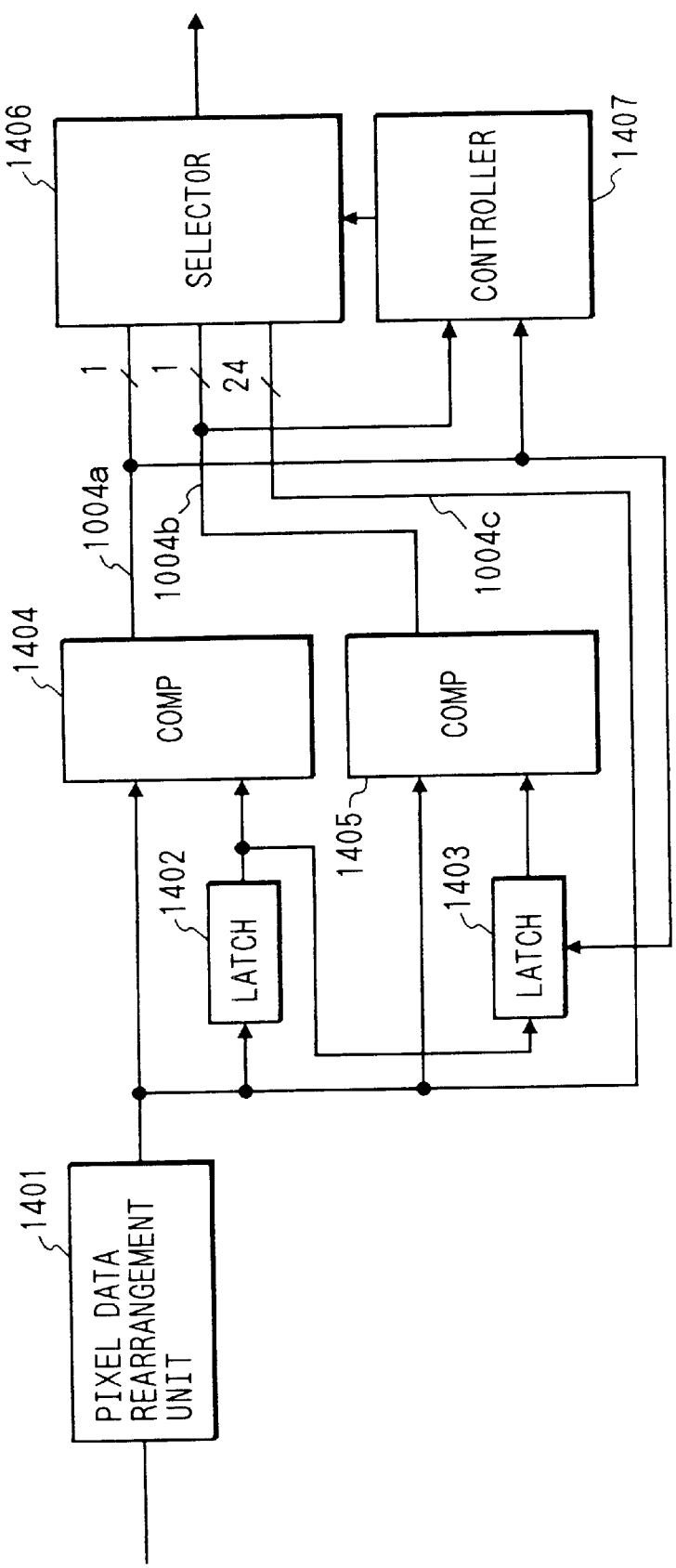
FIG. 55 is a block diagram showing the detail of the reversible compression unit in the data compression apparatus shown in FIG. 52.

FIG. 55 is a block diagram showing the detail of the construction of the reversible compression unit 1004 shown in FIG. 52. The reversible compression unit 1004 has a pixel data rearrangement unit 1401 which rearranges the parallel data received from the pixel data hold unit 1001 of FIG. 53 into serial signals and delivers such signals sequentially. A latch 1402 stores the output of the pixel data rearrangement unit 1401 after a delay by one pixel. A latch 1403 stores the output from the latch 1402 in accordance with a signal 1004a. Numeral 1404 denotes a comparator which compares the pixel data output from the pixel data rearrangement unit 1401 with the pixel data derived from the latch 1402. When these pixel data are the same, the comparator 1404 produces "0", otherwise it produces an output "1". Numeral 1405 denotes a comparator which compares the pixel data derived from the pixel data rearrangement unit 1401 with the pixel data held in the latch 1403 and produces "0" when these data coincide with each other, otherwise it produces "1", as in the case of the comparator 1404. A selector 1406 receives signals 1004a, 1004b from the comparators 1404, 1405, as well as the output from the pixel data rearrangement unit 1401, and selects one of these data and outputs it under the control of a control unit 1407. The control unit 1407 controls the selector 1406 upon receipt of the signals 1004a, 1004b.

Figure 56:
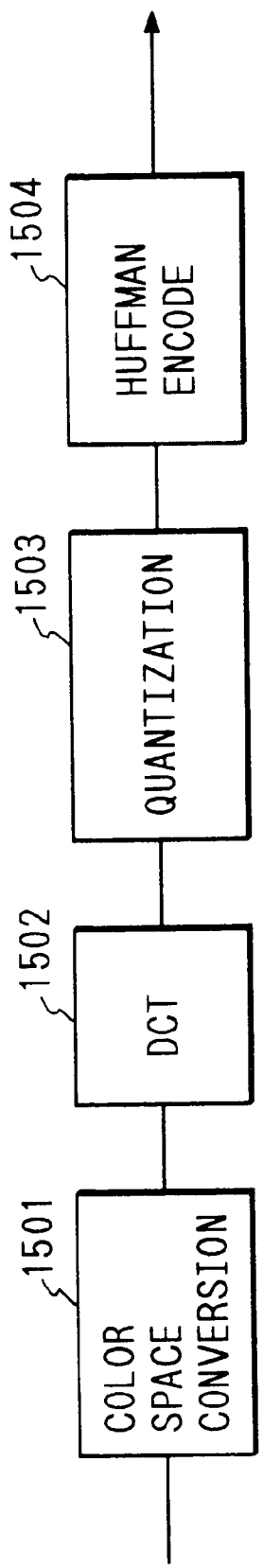
FIG. 56 is a block diagram showing the details of the construction of an ADCT processing unit in the data compression apparatus shown in FIG. 52.

FIG. 56 is a block diagram shown the detail of the construction of the ADCT unit 1005 shown in FIG. 52. The ADCT unit has a color space conversion unit 1501 which, in the illustrated embodiment, converts NTSC-RGB pixel data into YCrCb pixel data. Numeral a DCT unit 1502 effects a DCT conversion on the output of the color space conversion unit 1501 on 8×9 pixel block basis. A quantization unit 1503 quantizes the 64 pieces (8×8=64) of DCT coefficient data with coefficients of different weights so as to reduce the amount of the data. Numeral 1504 designates a Huffman encode unit which divides the data quantized by the quantization unit 1503 into one DC portion and three AC portions. The DC portion is Huffman-encoded after determination of the difference from the DC portion of the preceding 8×8 pixel block. As to the AC portion, the data is rearranged in zig-zag scan manner, and run-length of "0" and the appeared data are subjected to two-dimensional Hufffman encoding.

The operation of the data compression apparatus having the construct ion explained above will be described with reference to FIGS. 57 to 61. In the following description, X[i-1] means the color data of the immediately preceding pixel held by the latch 1402 of FIG. 55, while "PRE" shows the color data held by the latch 1403 shown in FIG. 55. At the same time, the pixel data output from the pixel data rearrangement unit 1401 is indicated by X[i]. The data X[i], X[i-1] and PRE are data of NTSC-RGB type, and have 1×3 arrangement structure containing each of R, G and B data.

FIGS. 57 to 61 are flow charts illustrative of the process performed by the data compression apparatus. Initialization of the latches 1402 and 1403 are conducted in step S60. Namely, initial values are set for X[i-1] and PRE. More specifically, on an assumption that ordinary images are black against white background, the initial values are set as X[i-1]=[255, 255, 255] (white) and PRE=(0, 0, 0) (black). In the next step S61, an 8×8 pixel block is cut out of the whole image, and pixel data of the block are held. In step S62, one-block data is entered and subjected to an area judgment processing which will be described later, and "0" or "1" is outputted as a result of the judgment.

Step S63 determines whether the result of the judgment is "1" or "0". If the result of the judgment is "1", the process proceeds to step S64 which executes a reversible compression processing as will be detailed later. Conversely, of the result of the judgment is "0", the process proceeds to step S65 which conducts ADCT which is known per se. Then, after completion of each of the compression processings described above, the process proceeds to step S66 in which the compression result is stored in the memory 1006 at an address appointed by the control unit 7. Step S67 determines whether the process has been completed on all the blocks. If there is any block which has not been processed yet, the process returns to step S61 to repeat the above-described operation. This process is then completed when processing is finished on all the blocks.

Figure 57:
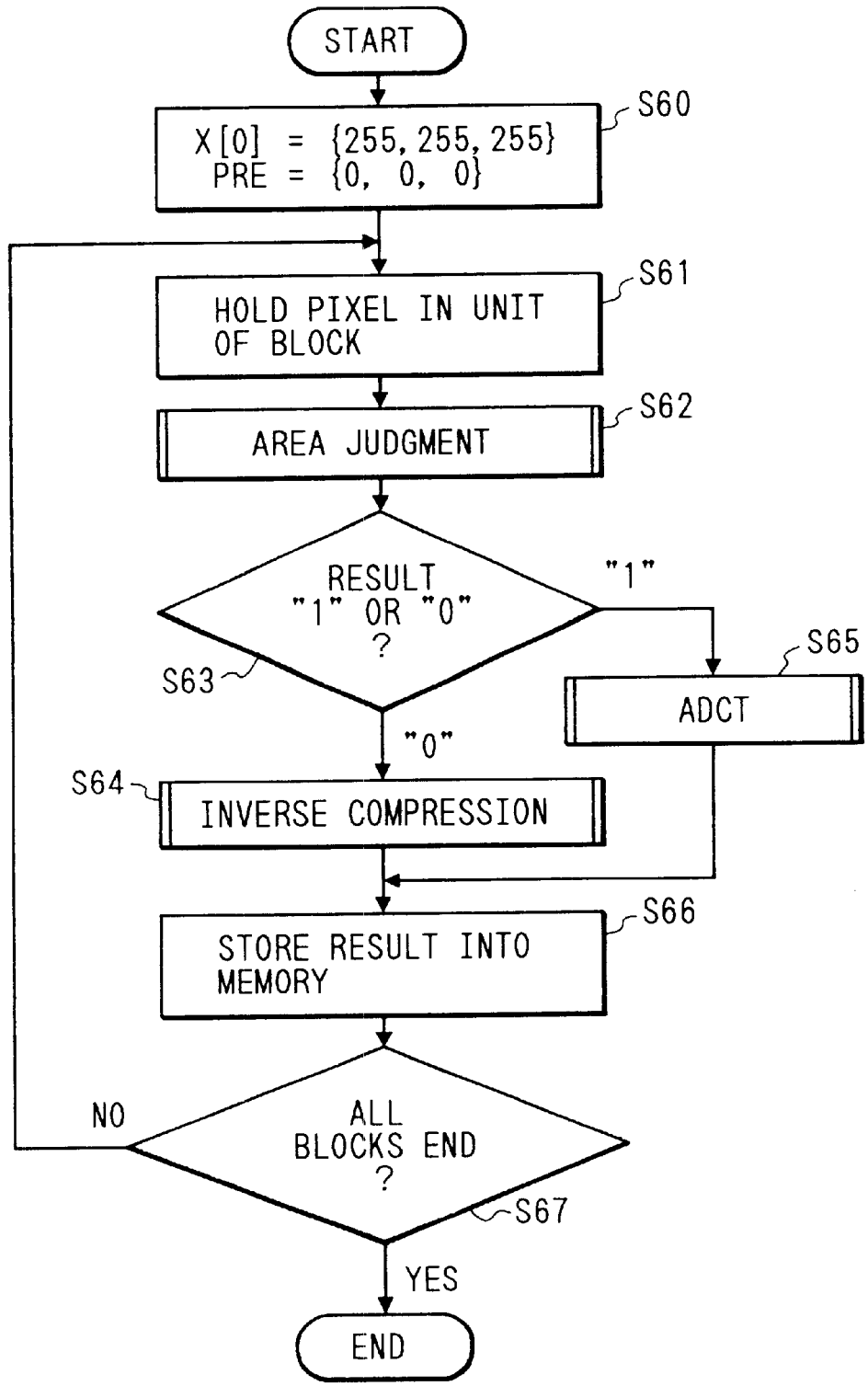
FIG. 57 is a flow chart illustrative of the whole process performed by the fourteenth embodiment.
Figure 58:
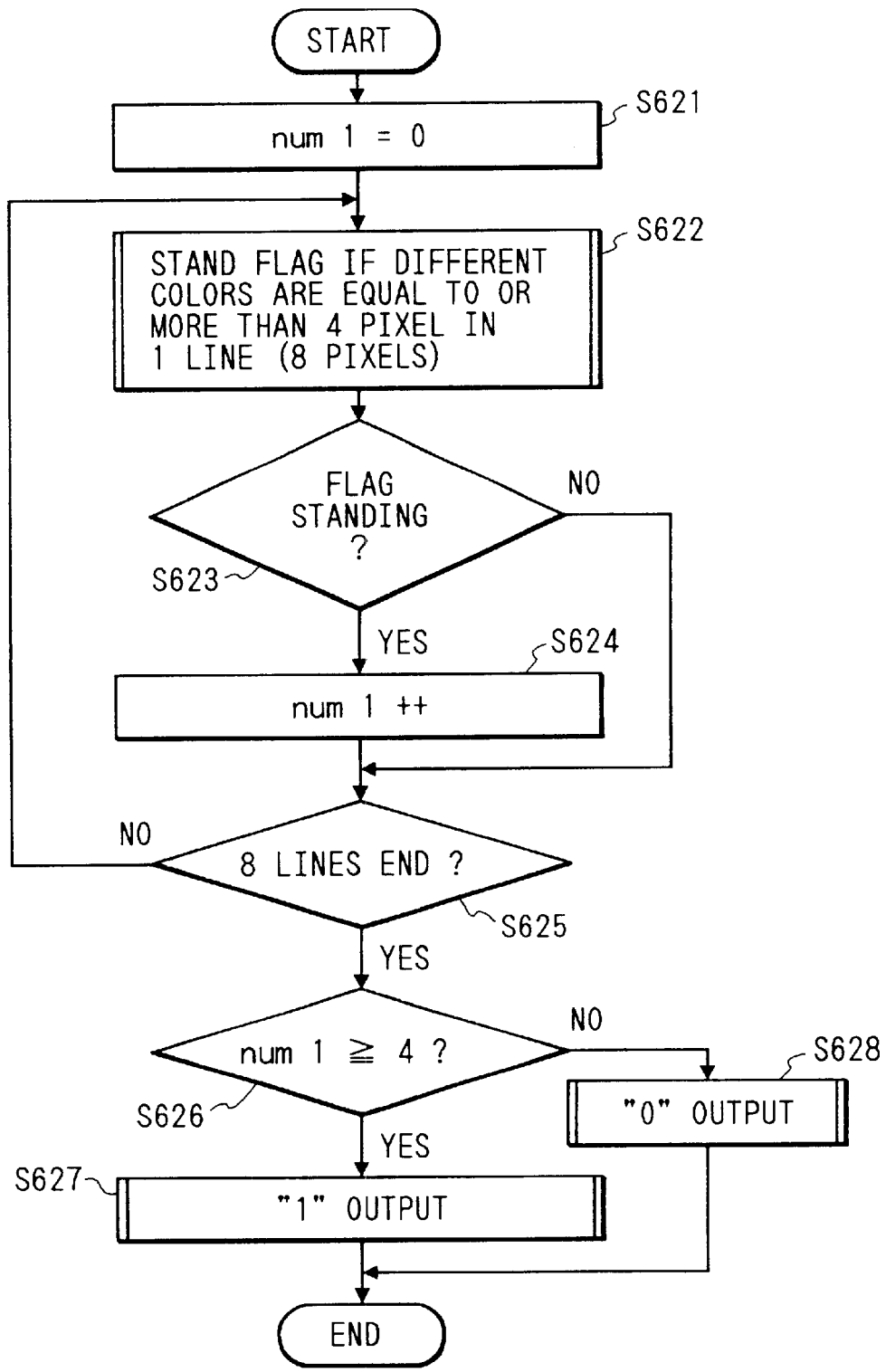
FIG. 58 is a flow chart showing the process of area judgment in the flow shown in FIG. 57.
Figure 59:
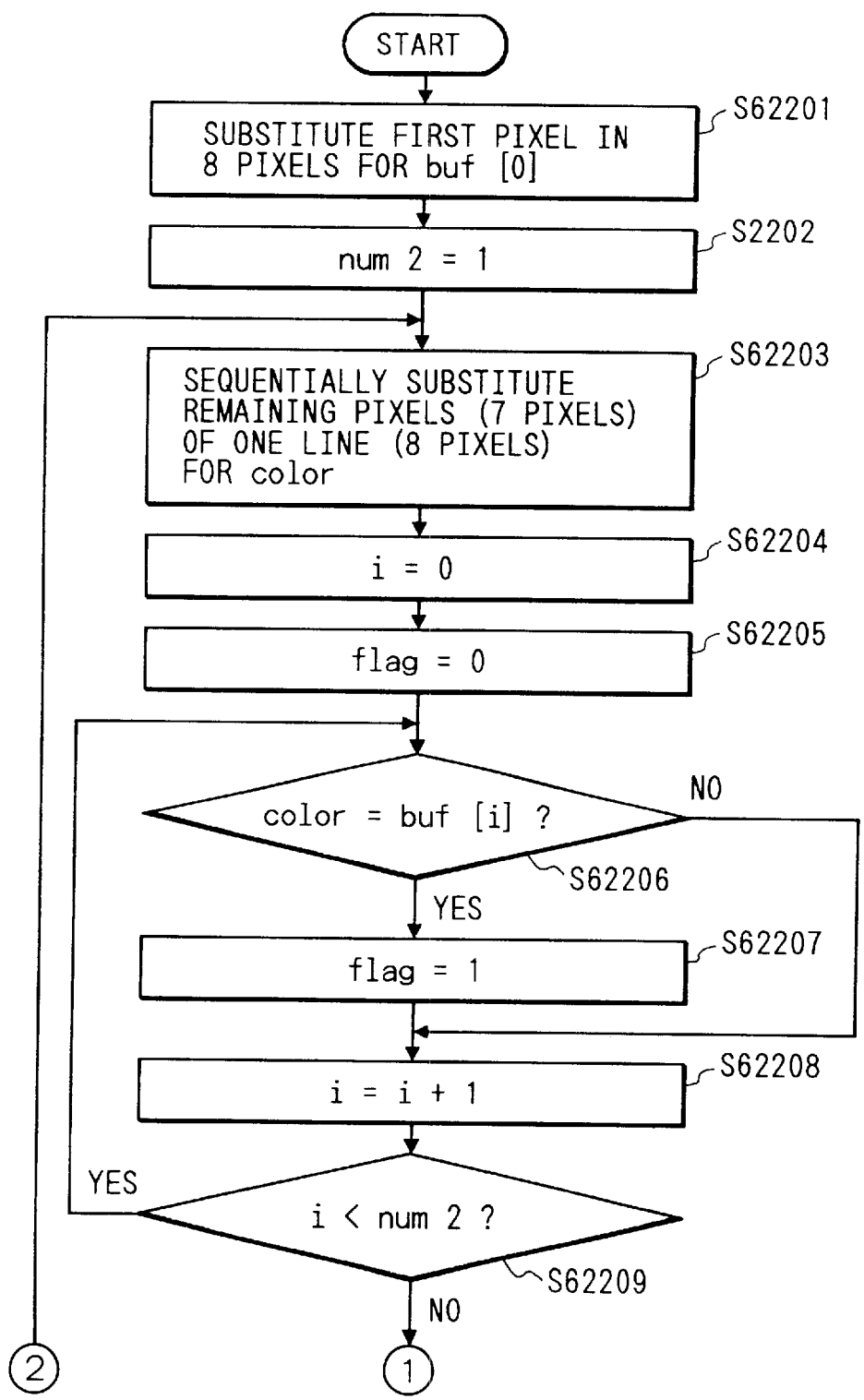
FIG. 59 is a flow chart showing the details of the checking processing in the flow shown in FIG. 58.
Figure 60:
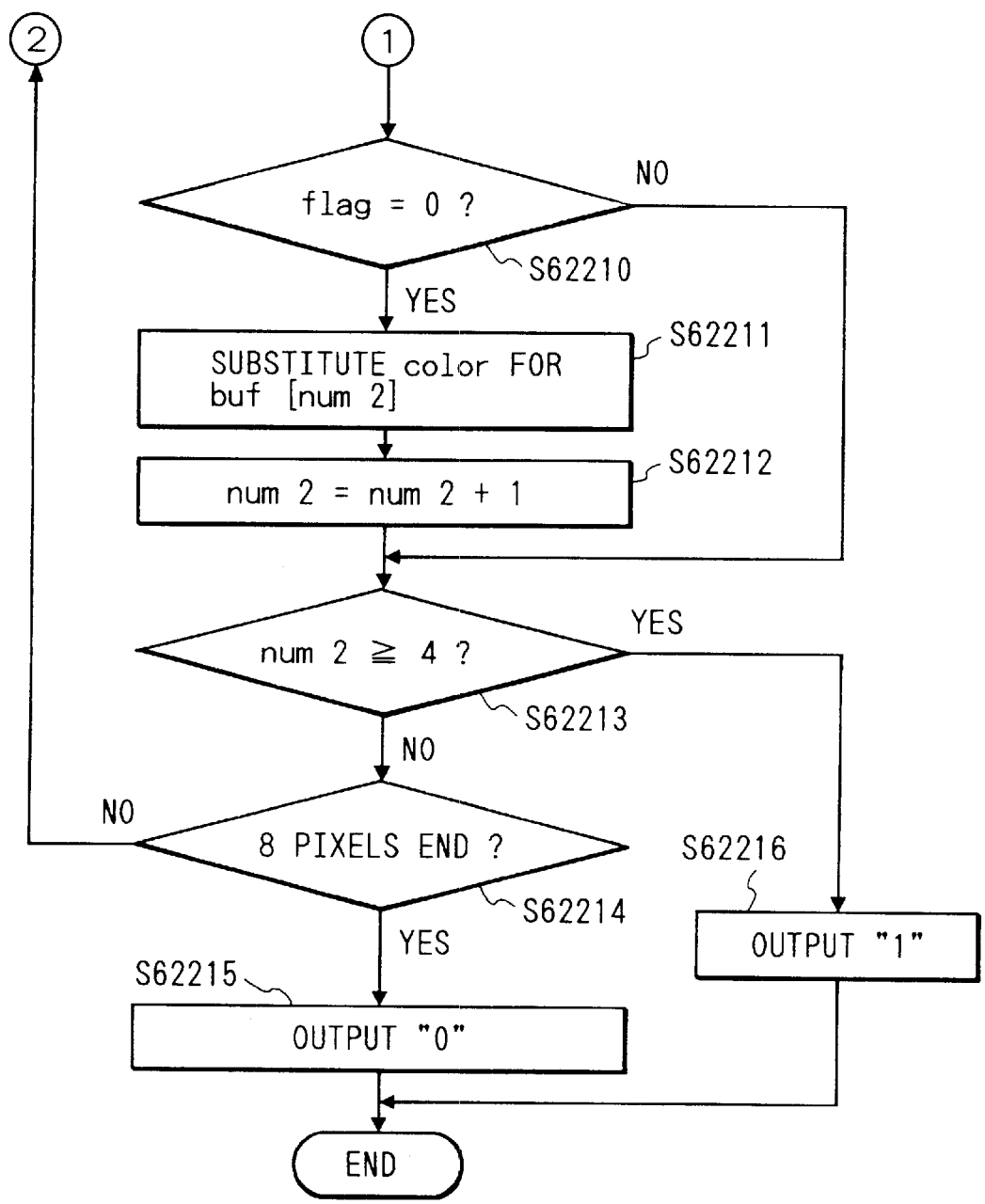
FIG. 60 is a flow chart showing the details of the checking processing in the flow shown in FIG. 58.

FIG. 58 shows the detail of the processing performed by the area judgment processing performed in step S62 of the flow shown in FIG. 57. In step S621, a counter num1 is reset to "0". In the next step S622, a check is conducted as to whether four or more pixels of different colors exist in a line composed of 8 pixels, in accordance with a procedure which will be explained later in connection with FIG. 59, and a flag is set or reset in accordance with the result of the check. In step S623, the result of the check is examined based on the state of the flag. If the flag has been set, the process advances to step S624 in which the counter num1 is incremented. Conversely, 1f the flag has not been set, the process proceeds to step S625 which determines whether the processing has been finished on all the 8 lines in the block. If the answer is NO, the process returns to step S622, whereas, 1f the answer is YES, the process gets out of this loop and advances to step S626 in which whether the content of the counter num1 is not less than the threshold value "4" after examination of the eight lines of the block. If the answer is YES, the process proceeds to step S627 to produce an output "1", whereas, 1f the answer is NO, the process proceeds to step S628 to produce an output "0" FIGS. 59 and 60 are flow charts which show the detail of the routine executed in step S622 of the flow shown in FIG. 58. In step S62201, the first pixel of each line (8 pixels) is substituted in a buffer buf[0] for storing the color data. In step S62202, a counter num2 is initialized to "1". The reason why the initial value is set to "1" rather than "0" is that each line contains at least one color. Then, in step S62203, other seven pixels of the line are sequentially substituted in a color data buffer "color". In step S62204, the counter "i" is reset and in the next step S62205, the flag "flag". is reset. Step S62206 compares the content of the buffer "color" with the color data in the buf (i). If the color data are the same, the process proceeds to step S62207 in which the flag is set as the data of the "color" exists in the group of buffers. If the data are different from each other, the process proceeds to step S62208 which increments the counter "i".

In the subsequent step S62209, a judgment is conducted as to whether the content of the counter "i" is below the content of num2, i.e., whether the check up with the color data substituted in the buffer group has been completed. If the answer is YES, the process returns to the above-mentioned step S62210, whereas, 1f the answer is NO, the process gets out of the loop and advances to step S62210 which determines whether or not the flag. "flag" is "0" (this means that the same data does not exists in the buffer group). If the same data exists, i.e., when the answer is NO, the process proceeds to step S62213, whereas, 1f the same data does not exist, i.e., when the answer is YES, the process proceeds to step S62211 in which the data of "color" is substituted into the buf [num2]. In a subsequent step S62212, the counter num2 is incremented. In step S62213, a judgment is conducted as to whether or not the content of the num2 is not less than the threshold value. If the answer is YES, there is no need for processing of further pixels, so that the process gets out of the loop and advances to step S62216 to produce an output "1". Conversely, when the answer is NO, the process proceeds to step S62214 which determines whether or not the processings has been finished on all of the eight pixels of the line. If the answer is NO, the process returns to the above-mentioned step S62203, whereas, 1f the answer is YES, the process gets out of the loop to step S62215 which produces an output "0" indicating that the number of different colors in the line does not exceed the threshold value.

Figure 61:
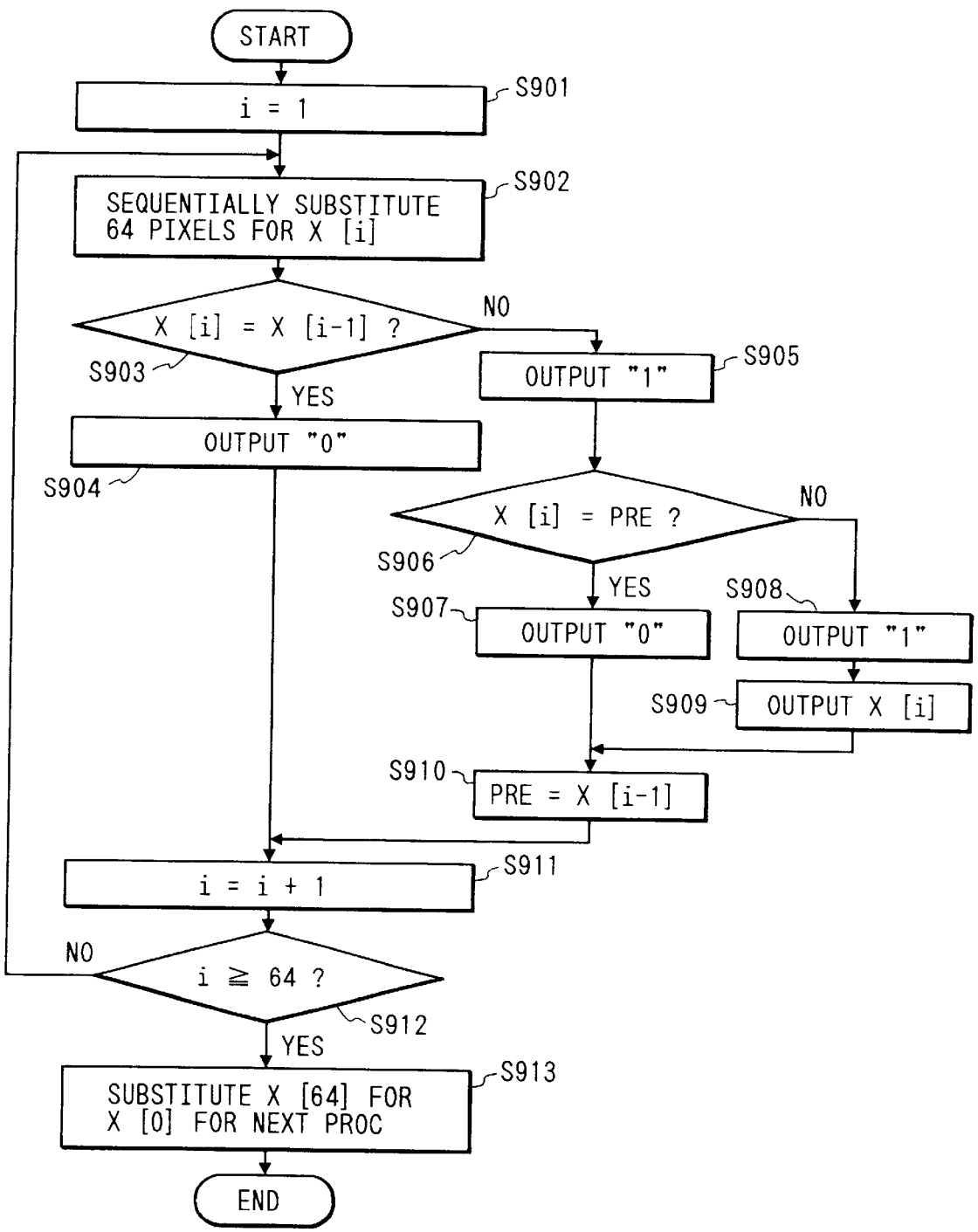
FIG. 61 is a flow chart showing the details of the reversible compression processing in the flow shown in FIG. 57.
Figure 62C:
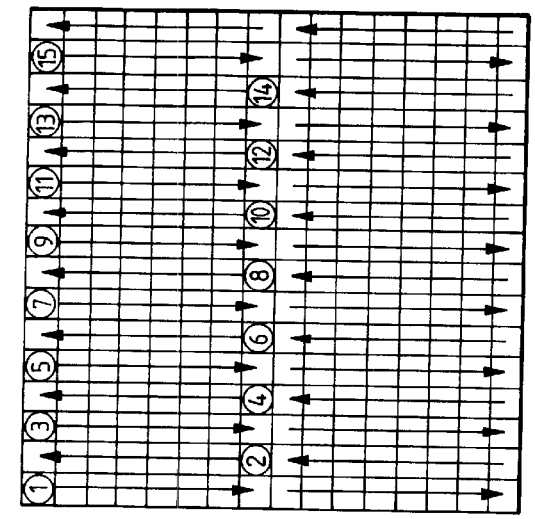
FIGS. 62A to 62C are illustrations of the method of reversible compression and rearrangement performed in the fourteenth embodiment.
Figure 62B:
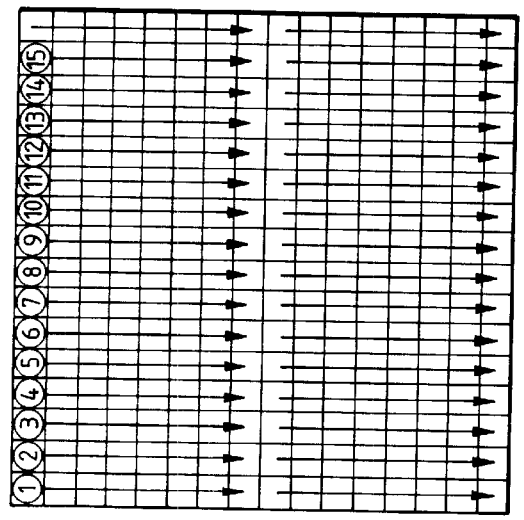

FIG. 61 is a flow chart showing the detail of the reversible compression processing performed in step S64 of the flow shown in FIG. 57. Step S901 initializes the counter "i" and Step S902 rearranges the pixels in the block and successively processes these pixels. The method of rearrangement may be such one as that shown in FIGS. 62A, 62B or 62C. An experimental simulation showed a result that the rearrangement method shown in FIG. 62C provides the greatest compression ratio. Namely, according to the rearrangement methods shown in FIGS. 62A and 62B, processings of pixels which are not adjacent to each other is necessitated for every eight pixels, so that the number of points at which the color data changes is increased to reduce the compression efficiency. From the view point of improvement in the efficiency, it is preferred that the line of the area judgment unit coincides with the line processed in the reversible processing unit, for the following reason. Namely, in processing the block having pixel values as shown in FIG. 63, the result of the area judgment is "0" if the processing by the area judgment unit is conducted on eight lines determined in a manner shown in FIG. 64A. Therefore, if the rearrangement method as shown in FIG. 62B is adopted in the reversible compression unit, the data after the processing is increased because the color data is changed time by time.

Figure 62A:
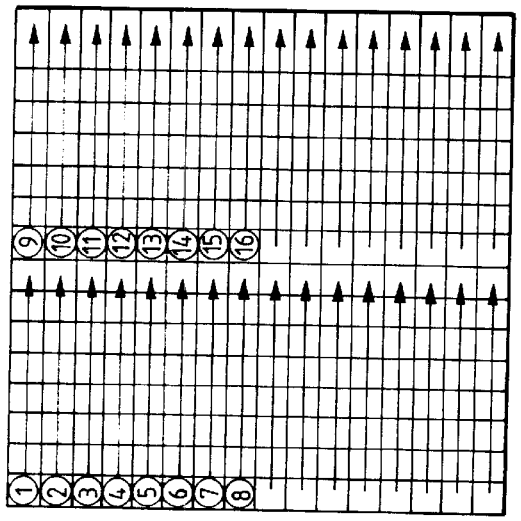
Figure 63:
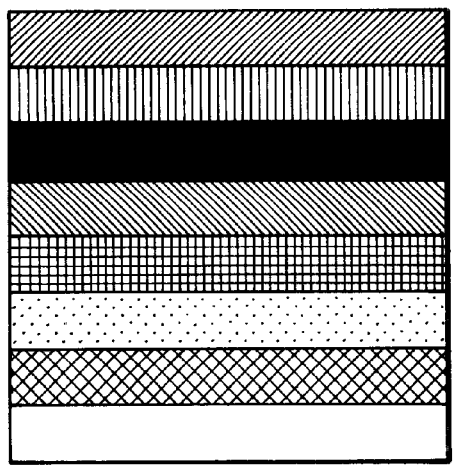
FIG. 63 is an illustration of the pixel data handled in this embodiment of the present invention.
Figure 64A:
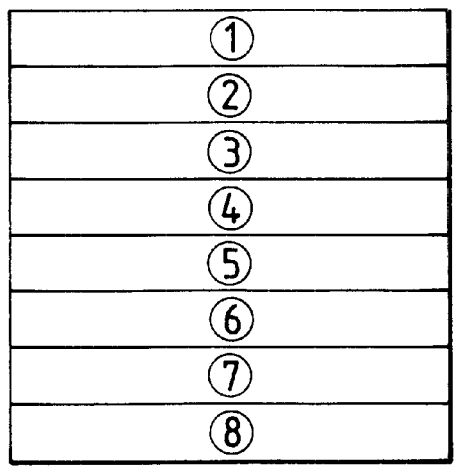
FIGS. 64A and 64B are illustrations of a method of dividing the area judgment unit into rows.
Figure 64B:
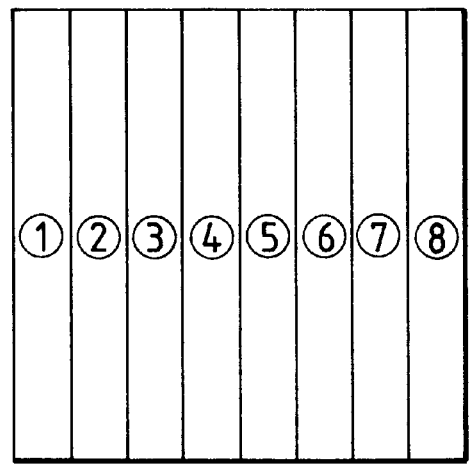

However, the number of points at which the color data is changed is reduced to 8 (eight) if the rearrangement method as shown in FIG. 62A is adopted, so that a high efficiency is obtained. Therefore, when the eight lines processed by the area judgment unit are determined as shown in FIG. 64B, it is preferred that the reversible compression unit employs a rearrangement method as shown in FIG. 62B or 62C. Similarly, when the eight lines are determined as shown in FIG. 64A, the reversible compression unit preferably adopts a rearrangement method as shown in FIG. 62A. In the. illustrated embodiment, since the rearrangement method shown in FIG. 62C which maximizes the compression efficiency is used, the area judgment unit adopts the area determination as shown in FIG. 64B.

In the next step S903, X[i] is compared with [i−1]. If X[i] and X[i−1] are the same, the process proceeds to step S904 to produce an output "0". However, if they do not coincide with each other, the process proceeds to step S905 to output "1". In the next step S906, X[i] is compared with PRE. If X[i] and PRE are equal to each other, the process proceeds to step S907 to produce an output "0", whereas, if not, the process proceeds to step S907 to produce an output "1". In step S909, since X[i] is out equal to [i−1] nor to PRE, X[i] is delivered as the output. Then, in step S910, X[i−1] is substituted for PRE. Then, in step 911, the content of the counter "i" is incremented and, in the next step S912, is determined whether or not the processing has been finished on all the pixels. If the processing has been finished on all the pixels, the process proceeds to step S913 in which X[64] is substituted for the X[0] corresponding to the X[i−1] of the pixel which is to be processed first in the next block, thus enabling processing of the next block.

As will be understood from the foregoing description, according to the present invention, an image data compression apparatus of the present invention comprises a holding means in which the pixel data input from an original image are held on block basis, each block having m pixels in horizontal direction and n pixels in the vertical direction, area judging means for receiving the m×n pixel data and for outputting a control code based on a parameter which is obtained in accordance with the number of different colors contained in the m×n pixels, at least two compression means, and selecting means for selecting one out of the two compression means in accordance with the control code delivered by the area judging means. It is therefore possible to effect an adequate data compression on each area of the image. In particular, images formed by a computer, having high frequency components, are reversibly compressed, whereas low-frequency images such as gradation or natural images, which cannot be reversibly compressed at high frequency and which do not cause noticeable degradation of image by a change in the image data, are compressed in an irreversible manner. It is therefore possible to achieve image data compression by a manner in which high image quality and high compression efficiency are compatible, i.e., in such a manner that, while the outline and the color unity of the image formed by a computer are maintained, gradation images are compressed with a high compression efficiency.

Judgment of the area is conducted by counting the number of different colors appearing in the m×n pixel block and comparing the count value with a threshold value, thus providing distinction between the high-frequency image portion produced by a computer and low-frequency image portion such as gradation and natural image. The area judging means may have counting means for counting the number of pixels in each row of the m×n pixel block, counting means for counting the number of the rows in which the count value derived from the first-mentioned counting means is not less than a value "k" (k<m), and means which outputs a signal 1 when the result of the counting performed by the second-mentioned counting means is 1 (1<n) and a signal 2 when the counting result is below 1. With this arrangement, it is possible to minimize the scale of the hardware of the area judgment circuit and to separate the areas with such a high degree of accuracy as that of the counting of all colors in the m×n pixel block. By setting the direction of rearrangement of the pixel data from parallel into serial in the reversible compression in conformity with the direction of the row as used in the separation of the areas, it is possible to enhance the compression efficiency. Furthermore, by effecting the rearrangement in a zig-zag manner, it is possible to reduce the number of the points where the color is changed, thus attaining a further improvement in the compression efficiency.

<Modifications>

In the fourteenth embodiment as described, the area judgment unit 3 divides each block into eight lines and number of pixels is counted for each of such lines. This, however, is only illustrative and the arrangement is such that the number of the color data is counted throughout all of the 64 pixels and the counting result is compared with a threshold value which is set for these 64 pixels. In such a case, it is possible to obtain a judgment result which has no dependency on the direction of the gradation.

Figure 65:
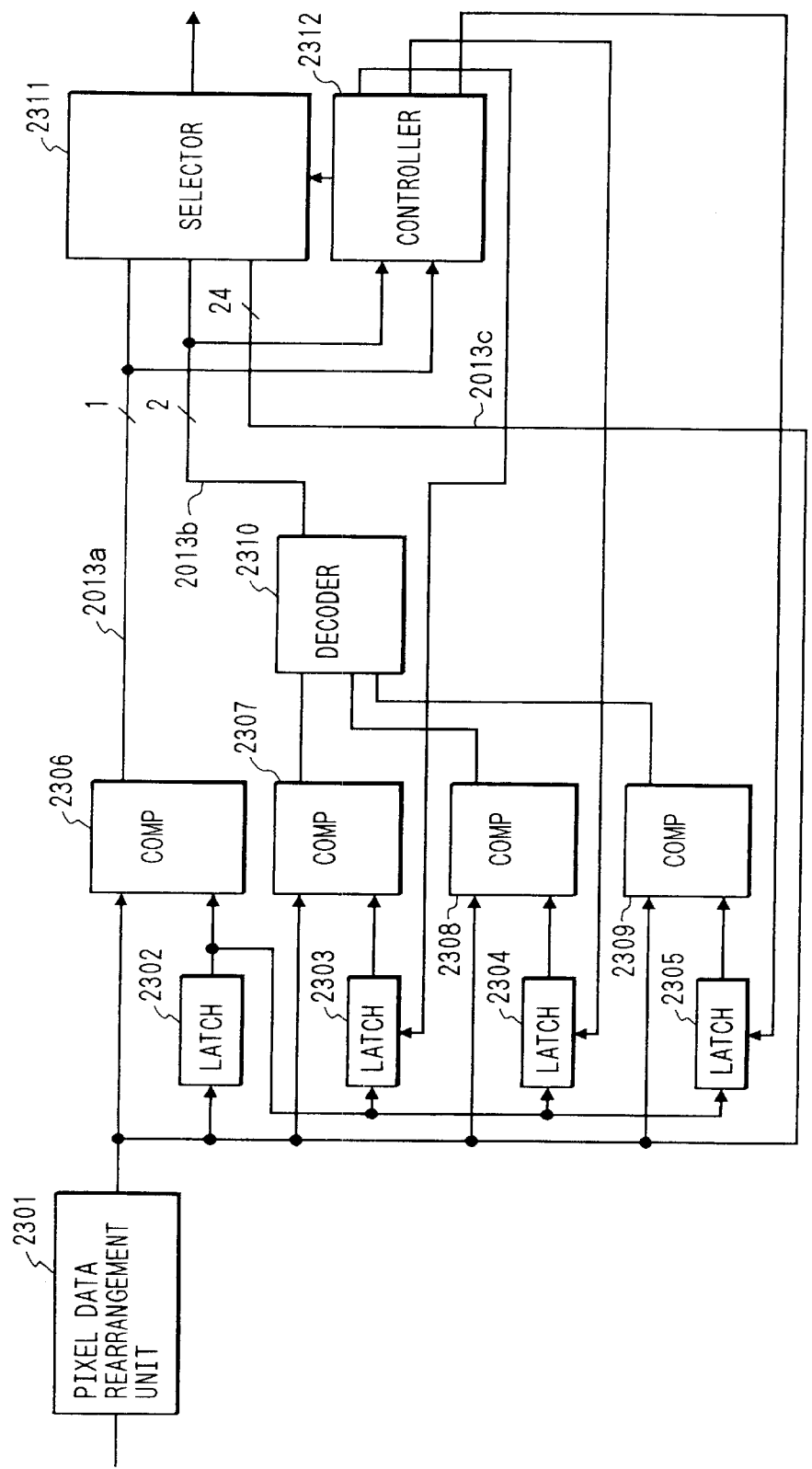
FIG. 65 is a block diagram showing the construction of a reversible compression unit in a modification of this embodiment.

Although in the fourteenth embodiment the reversible compression unit 100 is composed of two latches as shown in FIG. 55, this is not exclusive and three or more latches may be used as shown in FIG. 65. In such a case, the signal 1004b shown in FIG. 55 has 2 bits. Nevertheless, the final compression ratio is increased because the output of the color data 2013c shown in FIG. 65 is reduced.

Furthermore, although in the fourteenth embodiment the RGB 24-bit data is outputted as they are as the color data from the reversible compression unit 1004, the arrangement may be such that a pallete memory is prepared separately so as to enable identification of the appearing data successively by means of the pallete or addresses. For instance, by using a pallete address of 8 bits, the number of bits necessary for representing a color is reduced from 24 to 8, thus attaining an improvement in the compression efficiency.

The invention may be applied to a system composed of a plurality of apparatuses or devices or to an apparatus having a single device.

Obviously, the invention can equally be applied to such a case that a system or apparatus functions by a program supplied thereto.

As will be understood from the foregoing description, according to the present invention, it is possible to select a suitable compression mode in accordance with the nature of the input image, thus attaining a high quality of compressed image while improving the compression efficiency.

Although the invention has been described through its specific forms, it is to be understood that the described embodiments are only illustrative and various changes and modifications may be imparted thereto without departing from the scope of the invention which is limited solely by the appended claims.

What is claimed is:

1. An image data compression apparatus comprising:
   an input unit adapted to input multilevel image data of an image;
   a judgment unit adapted to judge a type of an image area of the inputted multilevel image data;
   a non-reversible compression unit adapted to non-reversibly compress the inputted multilevel image data; and
   a reversible compression unit adapted to reversibly compress the inputted multilevel image data,
   wherein said apparatus compresses areas comprising the image according to a result obtained by said judgment unit, such that:
      when said judgment unit judges an area to be a first type of image area, final compressed data is generated and outputted by non-reversibly compressing data of the first type of image area, and
      when said judgment unit judges an area to be a second type of image area, reversibly compressed data is generated by reversibly compressing data of the second type of image area using said reversible compression unit, the reversibly compressed data being output as final compressed data when an amount of the reversibly compressed data is not more than a predetermined value, and non-reversibly compressed data is generated by non-reversibly compressing data of the second type of image area using said non-reversible compression unit, the non-reversibly compressed data being output as final compressed data when an amount of the reversibly compressed data is more than the predetermined value, and
   wherein said apparatus compresses a third type of image area comprised of a natural image and another image according to a result obtained by said judgment unit, generates reversibly compressed data by reversibly compressing data of the third type of image area where a part of the natural image is replaced with the other image in the third type of image area, and, when an amount of the reversibly compressed data is not more than the predetermined value, outputs as final compressed data the reversibly compressed data and compressed data obtained by non-reversibly compressing the part of the natural image of the third type of image area and an interpolation value, and, when the amount of the reversibly compressed data is more than the predetermined value, outputs as final compressed data compressed data obtained by non-reversibly compressing the data of the third type of image area.

2. An apparatus according to claim 1, wherein the first type of image area is comprised of a natural image and the second type of image area is comprised of an image other than a natural image.

3. An apparatus according to claim 2, wherein said judgment unit executes judgment in units of blocks comprising m×n pixels, and
   wherein an operation control of said non-reversible compression unit and said reversible compression unit is executed in a block unit.

4. An apparatus according to claim 1, wherein said non-reversible compression unit executes ADCT compression.

5. An image data compression method comprising:
   an input step of inputting multilevel image data of an image;
   a judgment step of judging a type of an image area of the inputted multilevel image data;
   a non-reversible compression step of non-reversibly compressing the inputted multilevel image data; and
   a reversible compression step of reversibly compressing the inputted multilevel image data,
   wherein said method compresses areas comprising the image according to a result obtained in said judgment step, such that:
      when said judgment step judges an area to be a first type of image area, final compressed data is generated and outputted by non-reversibly compressing data of the first type of image area, and
      when said judgment step judges an area to be a second type of image area, reversibly compressed data is generated by reversibly compressing data of the second type of image area, the reversibly compressed data being output as final compressed data when an amount of the reversibly compressed data is not more than a predetermined value, and non-reversibly compressed data is generated by non-reversibly compressing data of the second type of image area, the non-reversibly compressed data being output as final compressed data when an amount of the reversibly compressed data is more than the predetermined value, and wherein said method compresses a third type of image area comprised of a natural image and another image according to a result obtained in said judgment step, generates reversibly compressed data by reversibly compressing data of the third type of image area where a part of the natural image is replaced with the other image in the third type of image area, and, when an amount of the reversibly compressed data is not more than the predetermined value, outputs as final compressed data the reversibly compressed data and compressed data obtained by non-reversibly compressing the part of the natural image of the third type of image area and an interpolation value, and, when the amount of the reversibly compressed data is more than the predetermined value, outputs as final compressed data compressed data obtained by non-reversibly compressing the data of the third type of image area.

* * * * *

UNITED STATES PATENT AND TRADEMARK OFFICE
CERTIFICATE OF CORRECTION

PATENT NO. : 6,427,025 B1
DATED : July 30, 2002
INVENTOR(S) : Yukari Shimomura et al.

It is certified that error appears in the above-identified patent and that said Letters Patent is hereby corrected as shown below:

<u>Column 10,</u>
Line 58, "pixel" should read -- pixel of --.

<u>Column 11,</u>
Line 10, "not" should read -- be --.

<u>Column 13,</u>
Line 66, ""11"" should read -- "1" --; and ""1"" should read -- "11" --.

<u>Column 14,</u>
Line 60, "has" should read -- have --.
Line 61, "another" should read -- other --.

<u>Column 36,</u>
Line 19, "of" should read -- if --.
Line 49, "1f" should read -- if --.
Line 51, "output "0" FIGS. 59" should read -- output "0". ¶ FIGS. 59 --.
Line 61, ""flag"." should read -- "flag" --.

<u>Column 37,</u>
Lines 6 and 10, "1f" should read -- if --.
Line 8, "flag." should read -- flag --.
Line 38, "is" should read -- are --.

<u>Column 38,</u>
Line 7, "out" should read -- not --.

UNITED STATES PATENT AND TRADEMARK OFFICE
CERTIFICATE OF CORRECTION

PATENT NO.     : 6,427,025 B1
DATED          : July 30, 2002
INVENTOR(S)    : Yukari Shimomura et al.

It is certified that error appears in the above-identified patent and that said Letters Patent is hereby corrected as shown below:

Column 39,
Line 19, "is" should read -- are --.
Lines 21, 23 and 24, "pallete" should read -- palette --.

Signed and Sealed this

Twenty-eighth Day of January, 2003

JAMES E. ROGAN
*Director of the United States Patent and Trademark Office*